United States Patent
Ashourian et al.

(10) Patent No.: US 11,118,835 B2
(45) Date of Patent: Sep. 14, 2021

(54) METHOD AND APPARATUS FOR THE CONTROLLED CONVEYANCE OF A WORKPIECE THROUGH A FLUIDIZED BED DRYER

(71) Applicant: JimmyAsh LLC, Santa Monica, CA (US)

(72) Inventors: Jamshid Ashourian, Santa Monica, CA (US); David Phelps, Beaverton, OR (US); Christopher Imdieke, Woodburn, OR (US)

(73) Assignee: JimmyAsh LLC, Santa Monica, CA (US)

( * ) Notice: Subject to any disclaimer, the term of this patent is extended or adjusted under 35 U.S.C. 154(b) by 229 days.

(21) Appl. No.: 15/295,394

(22) Filed: Oct. 17, 2016

(65) Prior Publication Data

US 2017/0115060 A1 Apr. 27, 2017

Related U.S. Application Data

(60) Provisional application No. 62/241,973, filed on Oct. 15, 2015, provisional application No. 62/265,473, filed on Dec. 10, 2015.

(51) Int. Cl.
*F26B 3/34* (2006.01)
*F26B 17/04* (2006.01)
(Continued)

(52) U.S. Cl.
CPC ............ *F26B 17/045* (2013.01); *B65G 19/10* (2013.01); *B65G 19/22* (2013.01); *B65G 19/28* (2013.01);
(Continued)

(58) Field of Classification Search
CPC ...... F26B 17/045; F26B 17/10; F26B 17/107; F26B 17/108; F26B 3/08; F26B 3/082;
(Continued)

(56) References Cited

U.S. PATENT DOCUMENTS 2,295,732 A 9/1942 Hess
3,012,331 A 12/1961 Oholm et al.
(Continued)

FOREIGN PATENT DOCUMENTS

GB 1136395 12/1968

OTHER PUBLICATIONS

International Search Report and Written Opinion for PCT/US2016/057342 dated Mar. 17, 2017.
Extended European Search Report dated Sep. 10, 2019.

*Primary Examiner* — John P McCormack
(74) *Attorney, Agent, or Firm* — Taft Stettinius & Hollister LLP; Daniel A. Rosenberg

(57) ABSTRACT

The present invention relates to the use of a mechanical apparatus to convey a workpiece through a fluidized bed dryer. In particular, the invention relates to a single or multiple stage vibrating fluidized drag conveyor having spaced apart conveyor paddles attached to a continuous chain or a similar device, and driven by a variable frequency motor drive. The invention is of particular applicability in the case of low-density workpieces where chaotic motion of air may disrupt or reverse the orderly flow of workpieces through the dryer.

12 Claims, 55 Drawing Sheets

CLOSED HOOD POSITION (direction of product flow right to left)

PRODUCT FLOW

(51) Int. Cl.
  *F26B 17/02* (2006.01)
  *F26B 3/092* (2006.01)
  *B65G 19/10* (2006.01)
  *B65G 19/22* (2006.01)
  *B65G 19/28* (2006.01)
  *B65G 27/04* (2006.01)
  *F26B 21/00* (2006.01)
  *F26B 25/00* (2006.01)

(52) U.S. Cl.
  CPC ............ *B65G 27/04* (2013.01); *F26B 3/0923* (2013.01); *F26B 17/02* (2013.01); *F26B 21/004* (2013.01); *F26B 25/002* (2013.01); *Y02P 70/10* (2015.11)

(58) Field of Classification Search
  CPC ........ F26B 3/084; F26B 3/092; F26B 3/0923; F26B 3/09026
  USPC .................................................... 34/249, 401
  See application file for complete search history.

(56) References Cited

U.S. PATENT DOCUMENTS

| | | | |
|---|---|---|---|
| 4,082,532 A | 4/1978 | Imhof | |
| 4,148,933 A * | 4/1979 | Janovtchik | A23L 3/10 426/402 |
| 4,194,971 A | 3/1980 | Beeckmans | |
| 4,419,834 A * | 12/1983 | Scott | A23L 3/185 34/181 |
| 4,505,211 A | 3/1985 | Lamare | |
| 4,543,736 A * | 10/1985 | Brooks | F26B 21/10 34/164 |
| 4,940,040 A | 7/1990 | Randall et al. | |
| 5,133,137 A * | 7/1992 | Petersen | B01J 8/36 34/576 |
| 5,161,315 A | 11/1992 | Long | |
| 5,279,046 A * | 1/1994 | Vincent | B01J 8/36 34/164 |
| 5,723,160 A * | 3/1998 | Nora | B01D 46/38 23/313 FB |
| 5,947,261 A | 9/1999 | Baker | |
| 5,950,325 A * | 9/1999 | Mehdizadeh | F26B 17/04 219/701 |
| 6,142,291 A | 11/2000 | Schulze et al. | |
| 6,163,981 A * | 12/2000 | Nilsson | F26B 17/04 34/207 |
| 6,237,248 B1 * | 5/2001 | Mayer | D21F 5/18 34/117 |
| RE37,472 E | 12/2001 | Baker | |
| 6,471,763 B1 * | 10/2002 | Karl | C09C 1/54 106/478 |
| 8,590,695 B2 | 11/2013 | Moreno Rueda | |
| 2007/0227417 A1* | 10/2007 | Aguayo | C10B 7/06 110/246 |
| 2010/0146814 A1 | 6/2010 | Baker et al. | |
| 2012/0144690 A1* | 6/2012 | Abramov | F26B 5/04 34/412 |
| 2013/0086950 A1* | 4/2013 | Huber | C03B 5/167 65/134.5 |
| 2014/0208606 A1* | 7/2014 | Mathis, Jr. | F26B 3/0923 34/164 |
| 2017/0115060 A1 | 4/2017 | Ashourian et al. | |

* cited by examiner

CLOSED HOOD POSITION (direction of product flow right to left)

RAISED HOOD POSITION

FIG. 23
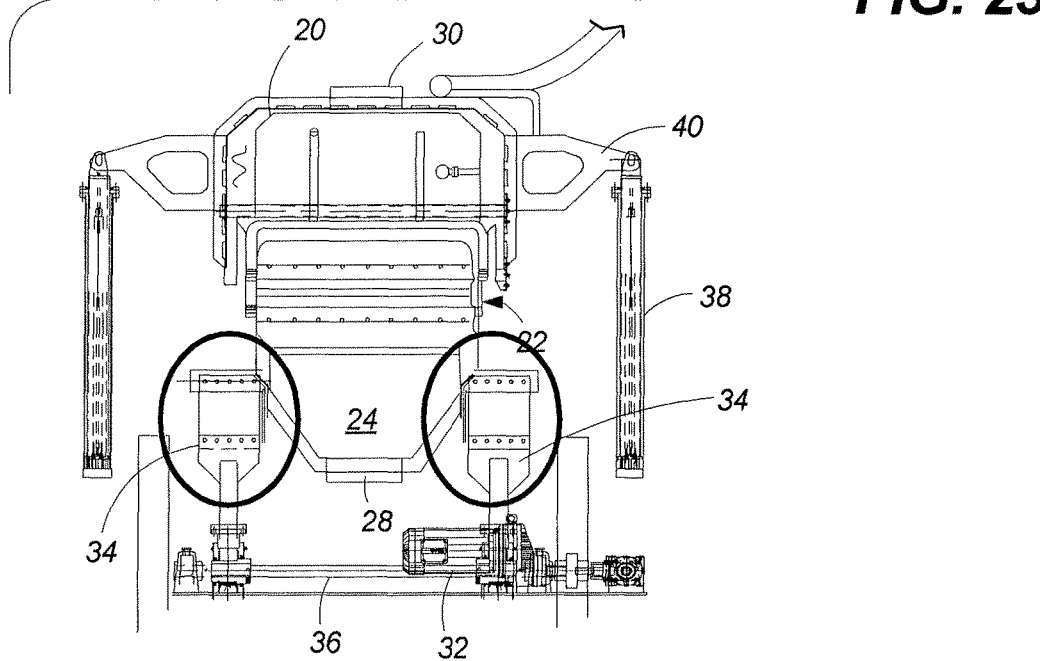
Drive arms moving the bed forward ←
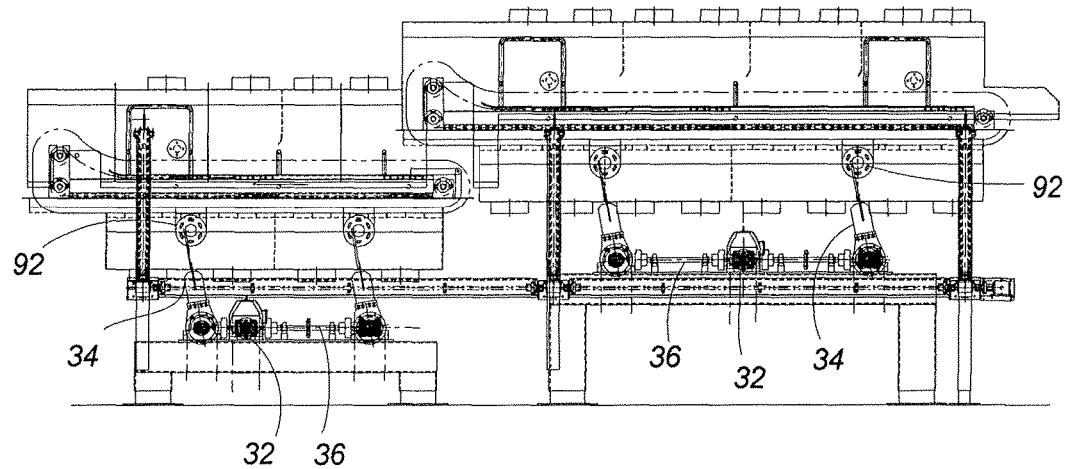
CLOSED HOOD POSITION (Direction of prodcut flow right to left)
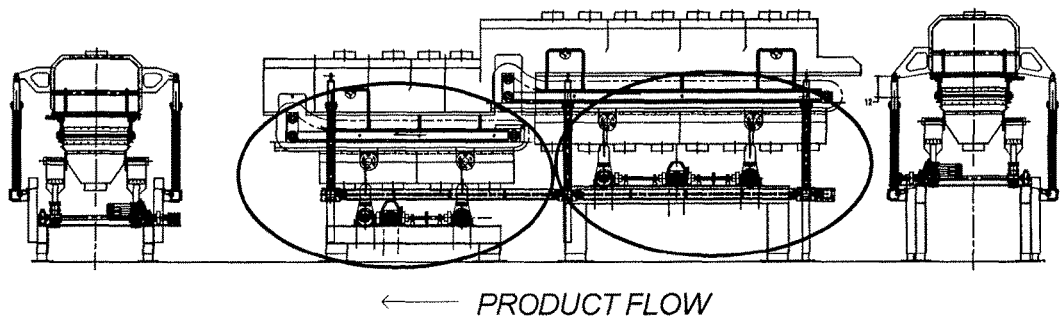
← PRODUCT FLOW

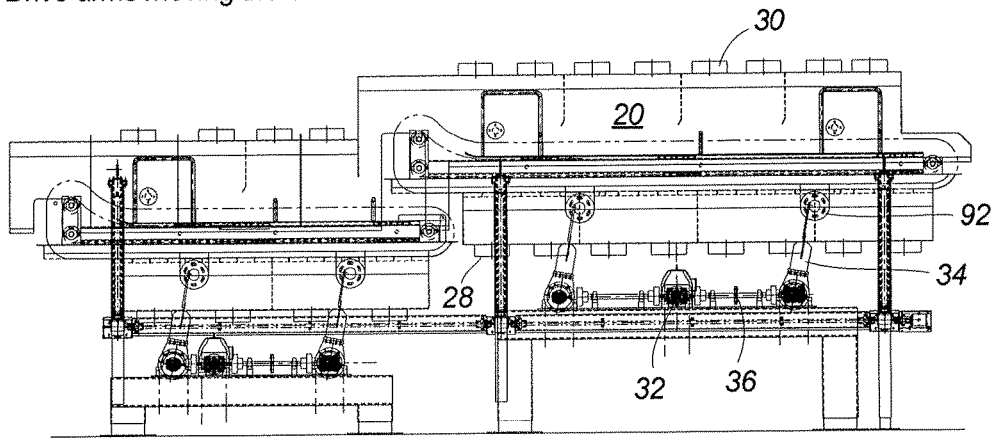
FIG. 24
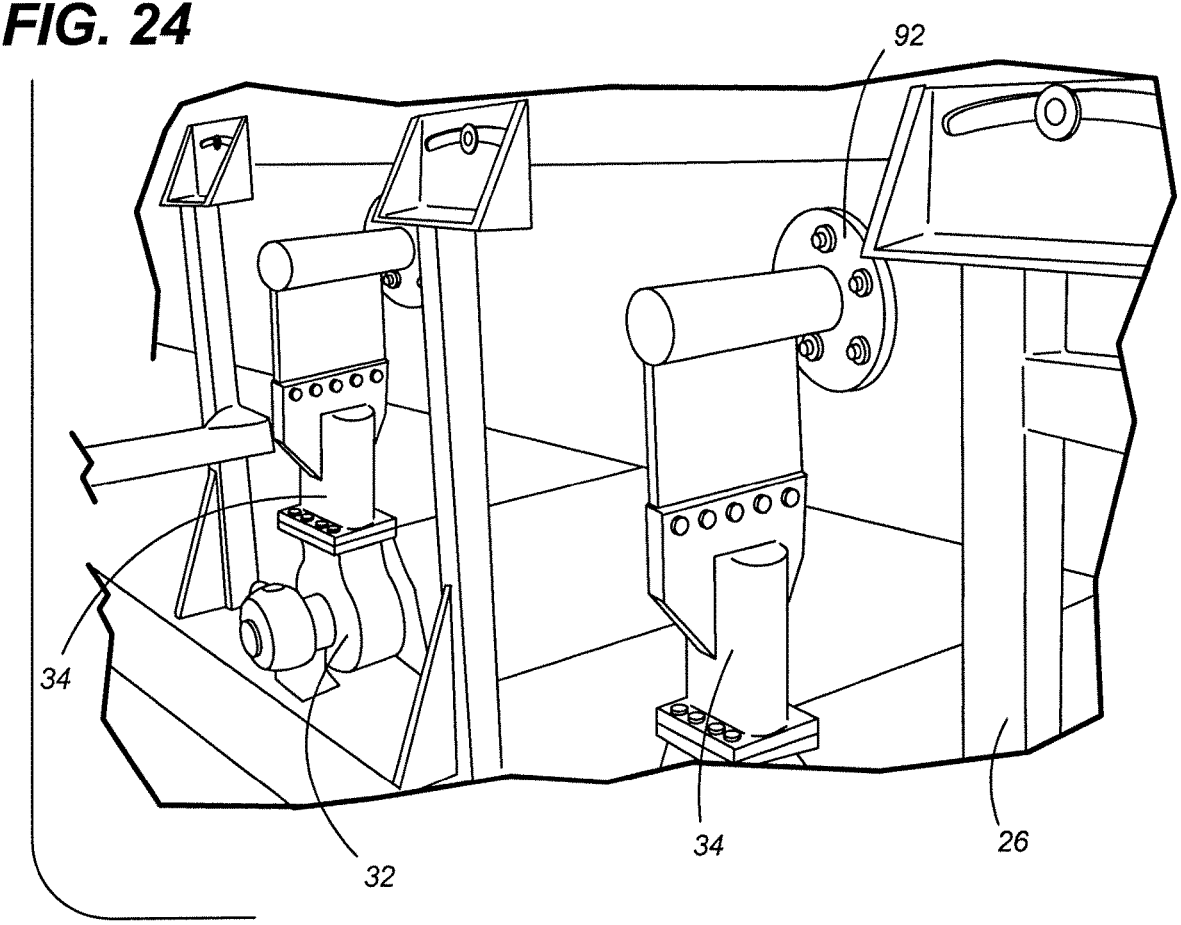

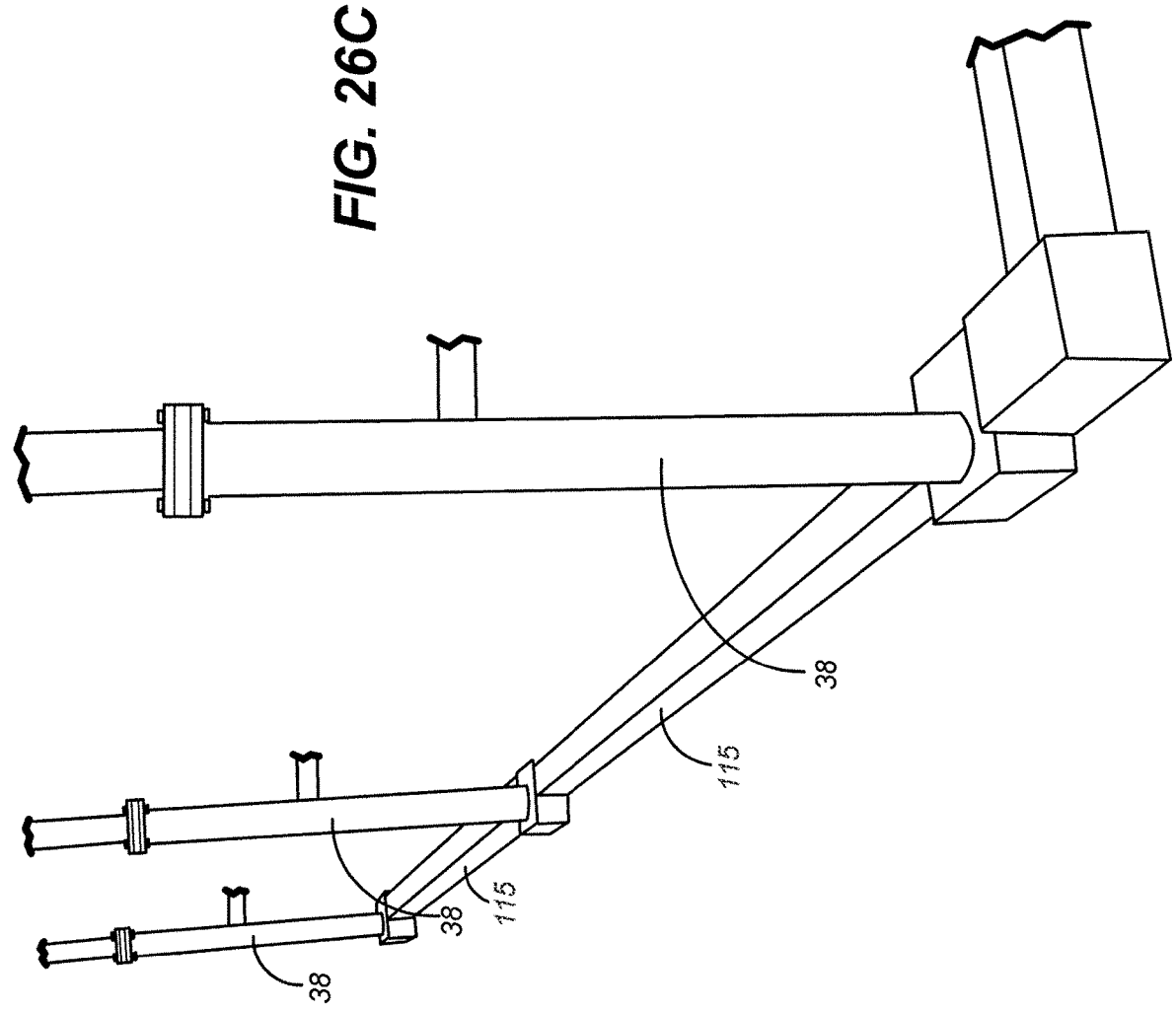

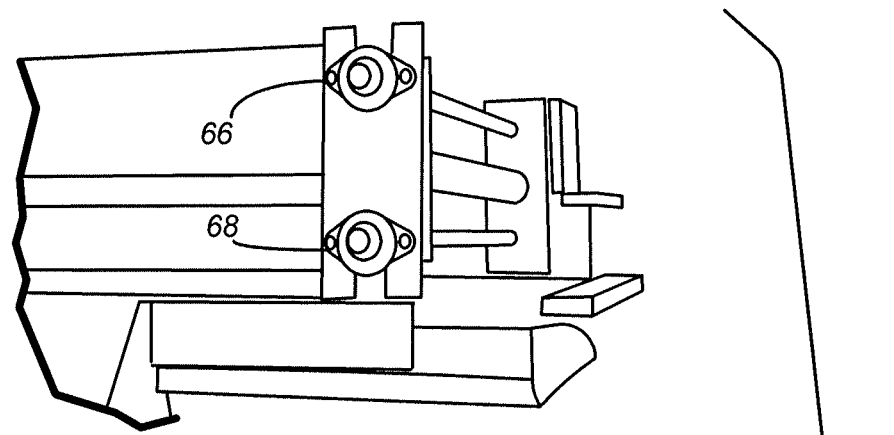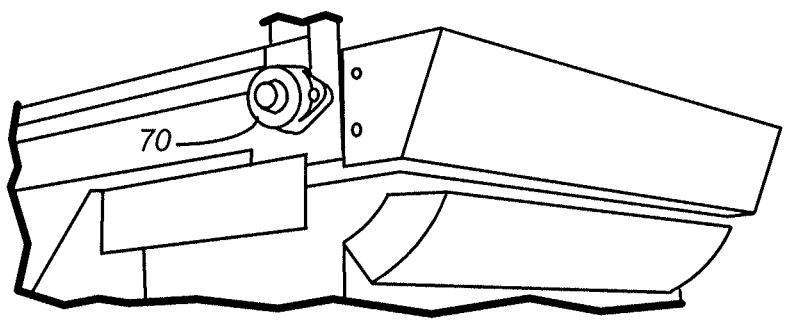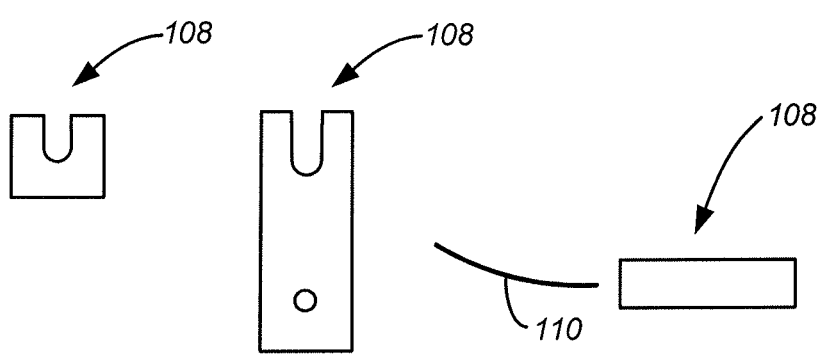
FIG. 50

METHOD AND APPARATUS FOR THE CONTROLLED CONVEYANCE OF A WORKPIECE THROUGH A FLUIDIZED BED DRYER

RELATED APPLICATIONS

The present application claims priority to, and incorporates by reference hereto, United State Provisional Patent Application Nos. 62/265,473 filed Dec. 10, 2015 and 62/241,973 filed Oct. 15, 2015.

BACKGROUND

Field of the Invention

The present invention relates to the use of a mechanical apparatus to convey a workpiece through a fluidized bed dryer. In particular, the invention relates to a single or multiple stage vibrating fluidized drag conveyor having spaced apart conveyor paddles attached to a continuous chain or a similar device, and driven by a variable frequency motor drive. The invention is of particular applicability in the case of low-density workpieces where chaotic motion of air may disrupt or reverse the orderly flow of workpieces through the dryer.

Background of the Invention

Fluidized bed dryers are known in the art, as disclosed in the references referenced below, the devices include a variety of different configurations and components, however, the prior art suffers from a number of drawbacks that make them unsuitable or ineffective in a wide variety of circumstances and settings.

Fluidized bed dryers ("fluid" portion of a fluidized bed dryer refers not to liquid, but to fluidized motion) have been used when drying particulate products that require even exposure to heat across the surface of the product. Problems arise in conveyance of the fluidized products where the products tend to clump together. Some means of separating the product is required to achieve even and consistent drying. Vibrating beds have been used in the past, but they suffer from a number of drawbacks.

For example, in cases where the density of the product is low, particularly towards the end of the drying cycle, contact of the product with the vibrating bed may be infrequent enough that conveyance through vibratory motion alone is ineffective to guarantee passage through the dryer on a first-in, first-out basis, as required by certain heat-sensitive products thereby creating an inconsistent result. In particular, uneven airflow within the dryer may set up eddy currents that cause the product to reverse direction and circulate in the wrong direction going deeper into the dryer.

One approach to drying low-density product is to use a combination of pulsed vibratory motion and multiply controlled gates within the dryer, but this is complicated in a vibrating environment and requires on-the-fly adjustment of the vibrational angle creating inefficiencies in the production method.

A need exists, then, to find a novel way to convey workpieces through a fluidized bed dryer in cases where the workpieces are sensitive to temperature, tend to clump or aggregate, and the passage through the dryer must be executed within a tightly controlled time frame. Accordingly, a need exists for an improved fluidized bed dryer that substantially to completely eliminates the drawbacks in the art.

Information Disclosure—the following references are disclosed herein by reference hereto: US Patent Publication No. 2007/0227417—Aguayo; U.S. Pat. No. 6,163,981—Nilsson; U.S. Pat. No. 3,012,331—Oholm; U.S. Pat. No. 4,082,532—Imhof; U.S. Pat. No. 4,194,971—Beeckmans; U.S. Pat. No. 4,419,834—Scott; U.S. Pat. No. 5,947,261—Baker; U.S. Pat. No. 6,142,291—Schulze; U.S. Pat. Nos. 6,163,981, 8,590,695—Moreno Rueda; U.S. Pat. No. 6,024,210—Carrier. The disclosure of the foregoing references is not an admission of, and shall not be deemed as conceding in any manner, the relevance of any of the references or any portion thereof.

BRIEF DESCRIPTION OF THE FIGURES

FIG. 23 is shows end and side view of the dryer.
FIG. 24 is a side view of the dryer and a close up view of the drive arms.
FIG. 26*c* is a view of the frame members and drive members of lift mechanism.

FIG. 50 is view of the end of the dyer and of connecting brackets.

DETAILED DESCRIPTION OF THE INVENTION

Figure 1A:
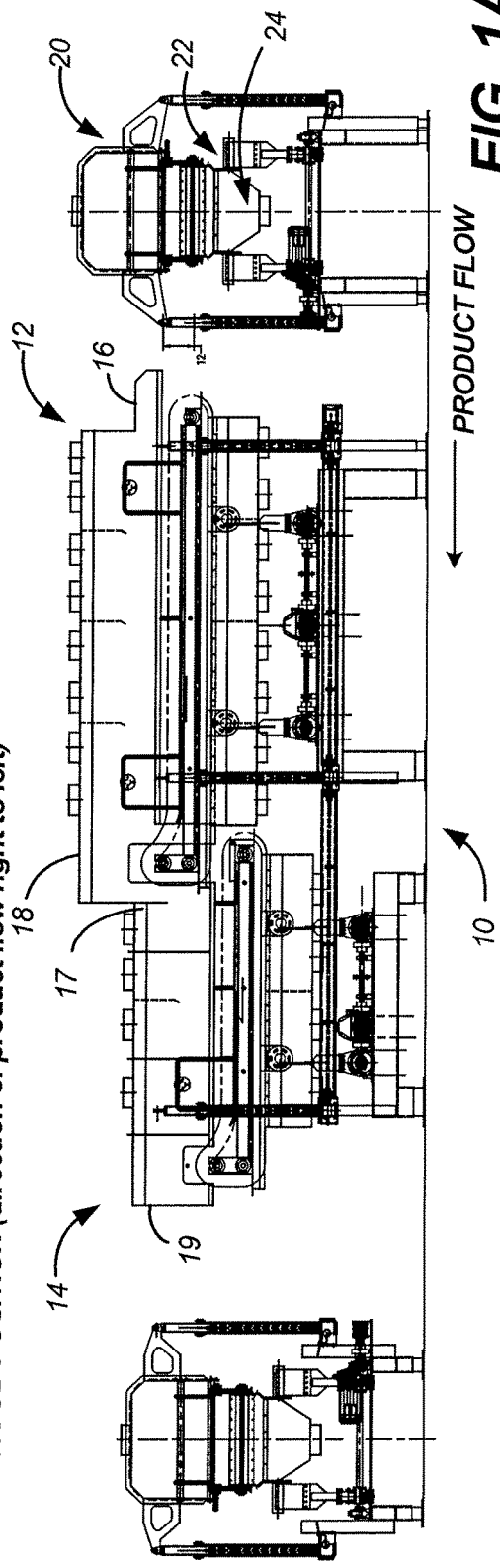
FIGS. 1*a* and *b* show side and end views of a dryer.
Figure 1B:
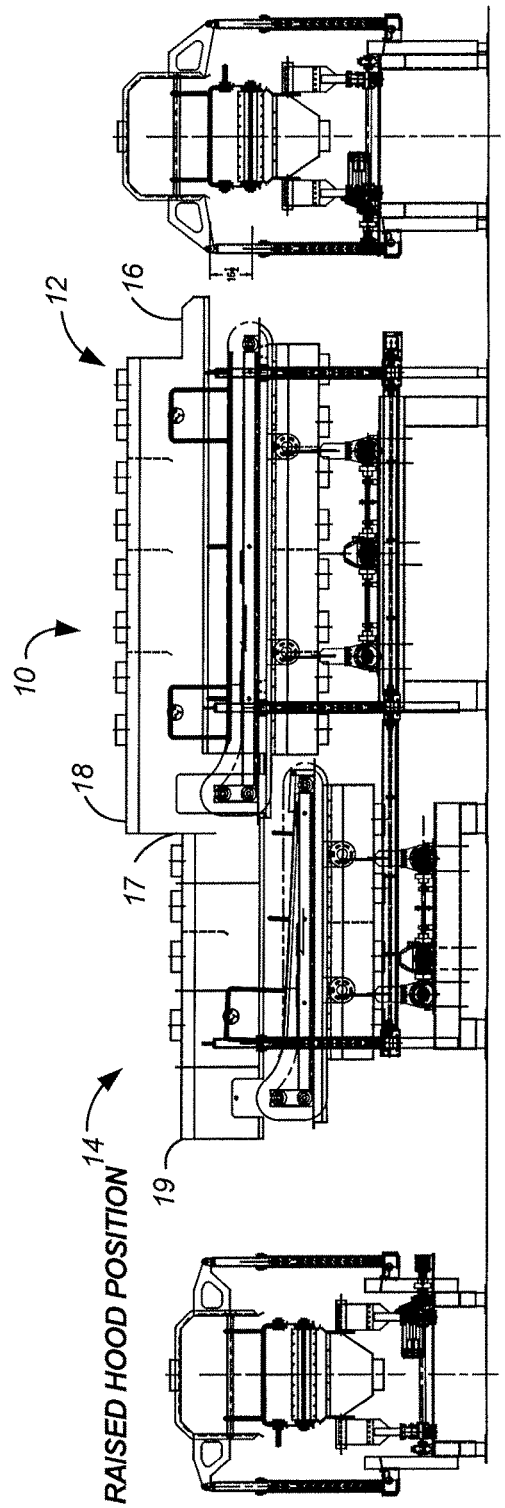

In the Figures, is shown a fluidized bed dryer 10 in various levels of detail. As shown in FIG. 1, and in more detail in FIGS. 2 and 3, the dryer 10 is divided into two main inter-operative sections, a Stage A dryer 12, and a Stage B dryer 14. The dryers 12, 14 have input ends 16/17, and output ends 18/19 (respectively), wherein the output end 18 of the Stage A dryer 12 is proximate to and above the input end 17 of Stage B dryer 14. As shown by the product flow arrow in FIG. 1, the general flow of the product is from right to left, or from the input end 16 of dryer 12 to the output end 19 of the dryer 14.

Figure 2:
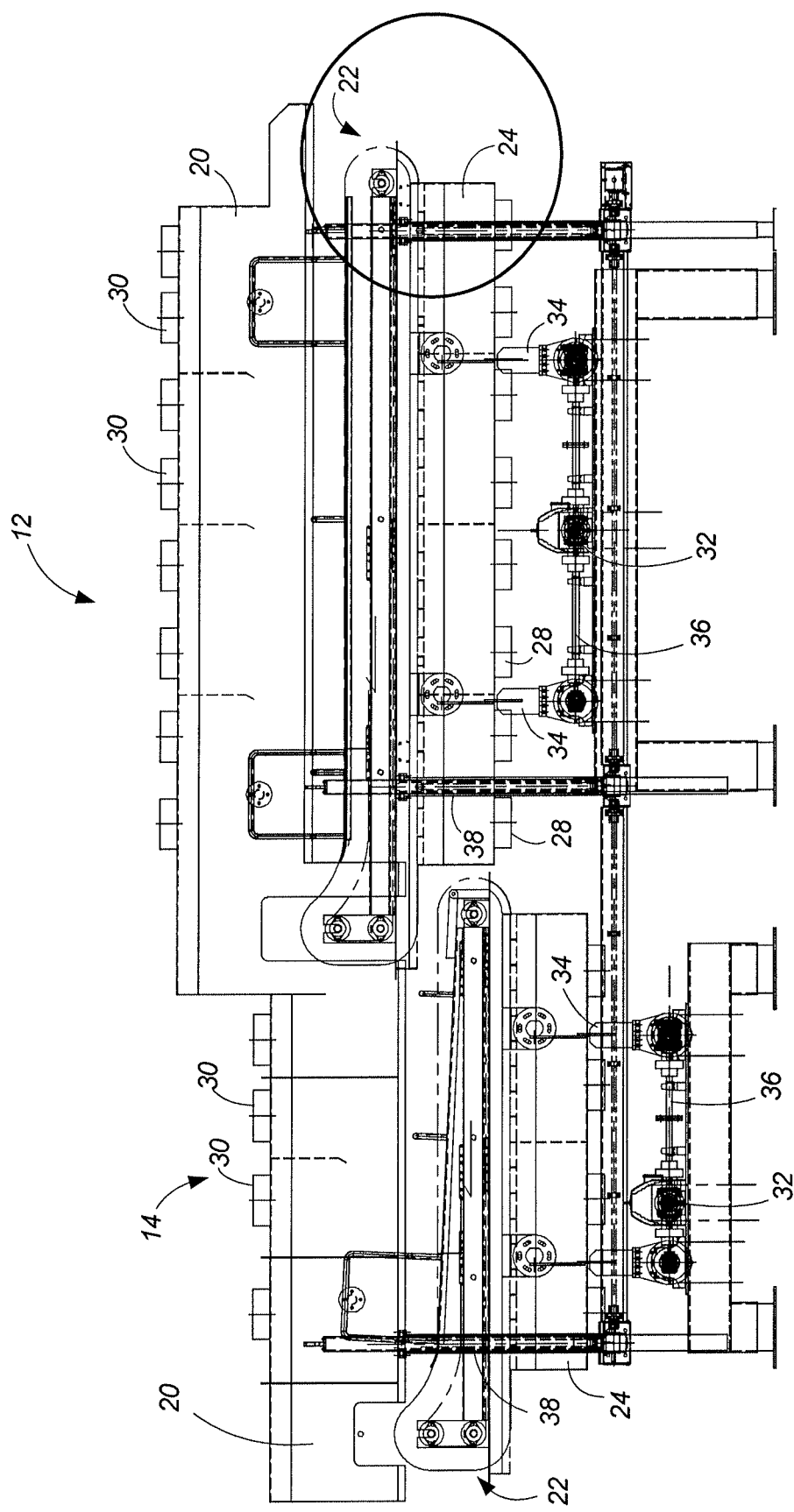
FIG. 2 shows multiple view of the dryer.
Figure 3:
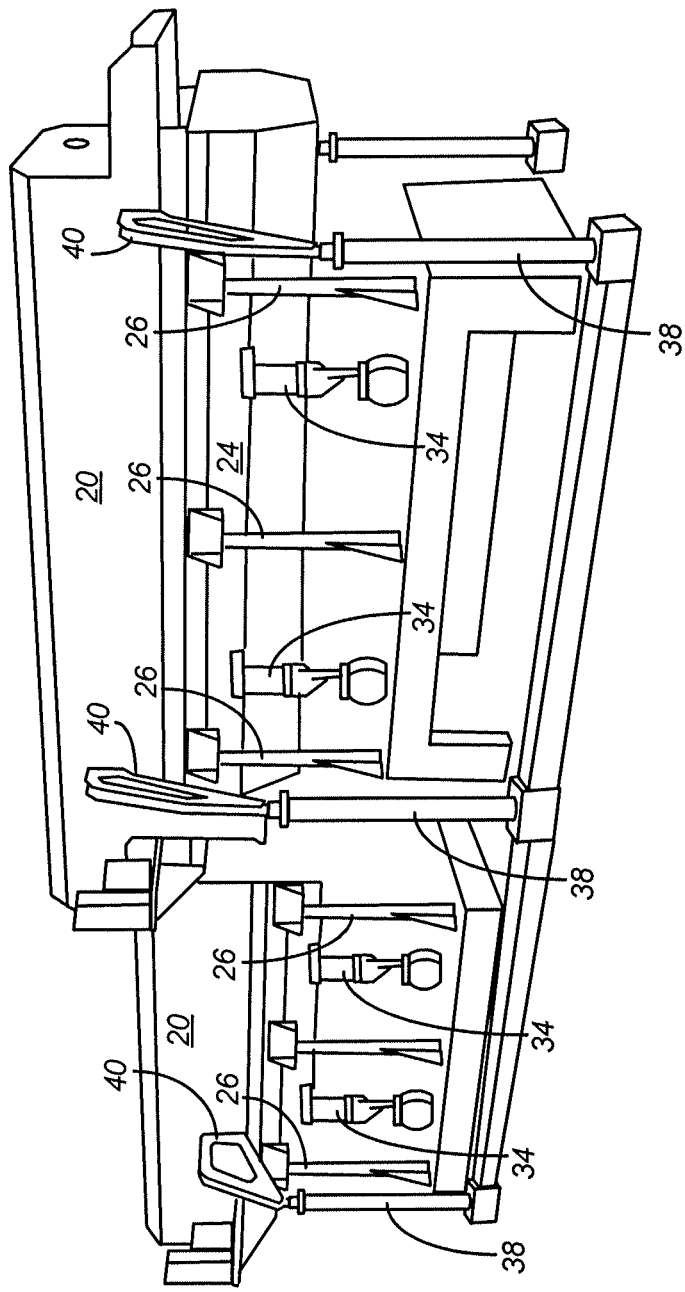
FIG. 3 shows a side view of the dryer.

Referring principally to FIGS. 2 and 3, each dryer 12, 14 generally include three sections, namely, a hood 20, a bed 22, and a pan 24 (each described in detail below). Various frame members 26 support the dryers 12, 14, such that the Stage A dryer 12 is higher than the Stage B dryer 14 for the purpose of maintaining product delivery from dryer 12 to dryer 14. The dryers 12, 14 are fluidized by air/gas through a plurality of lower ports 28, and aligned upper ports 30 (as described herein below) the orientation of air flow is configurable, preferably the air flow moving from the lower ports 28 through the interior of the dryers 12, 14 and out the upper ports 30. This creates a plurality of fluidized zones within the dryers 12, 14 that, as described below, can be independently controlled based on the circumstances of production.

Further in FIG. 2, the beds 22 include vibrating conveyors (described in detail hereinbelow), which are controlled by drive motors 32 and drive arms 34, where a shaft 36 couples the motor 32 to the drive arms 34, and which are located on both sides of each dryer section 12/14. Thus, there are four drive arms 34 for each dryer section 12/14 (two on each side), for a total of eight drive arms 34.

Telescoping arms (5-ton screw jacks) 38 extend from the dryer frame base to brackets 40 connected to the hoods 20. The arms (screw jacks) 38 are interconnected to form a jack drive assembly with jack rotational controls used to mechanically raise and lower the hoods 20 between a closed position and a raised position. The dryer 10 can be operated in the closed position, where the hoods 20 are in close proximity to the beds 22, or an open position (or in between) depending on the desired airflow characteristics, which are described in detail below.

Figure 4:
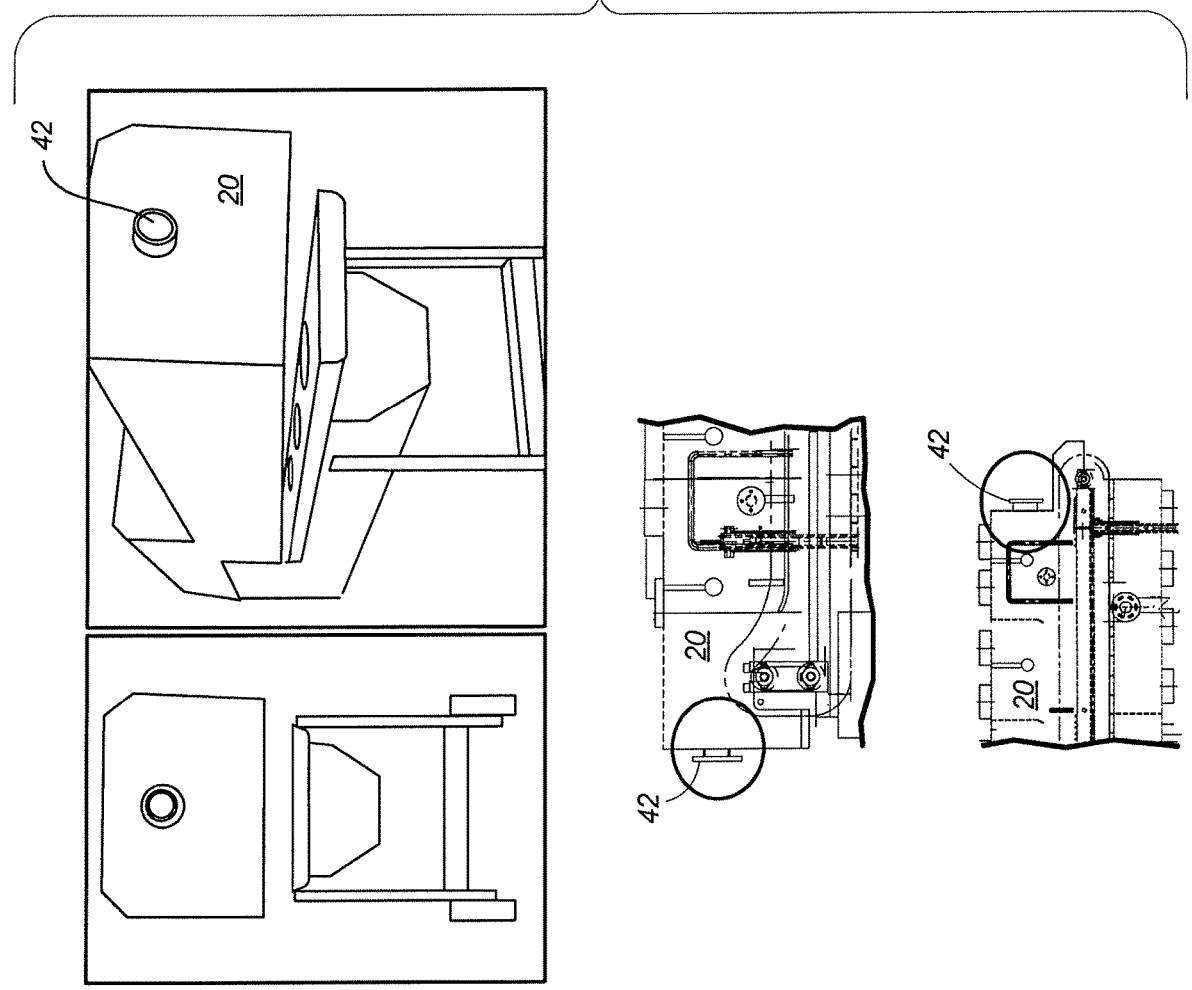
FIG. 4 shows an end view of the dryer.
Figure 5:
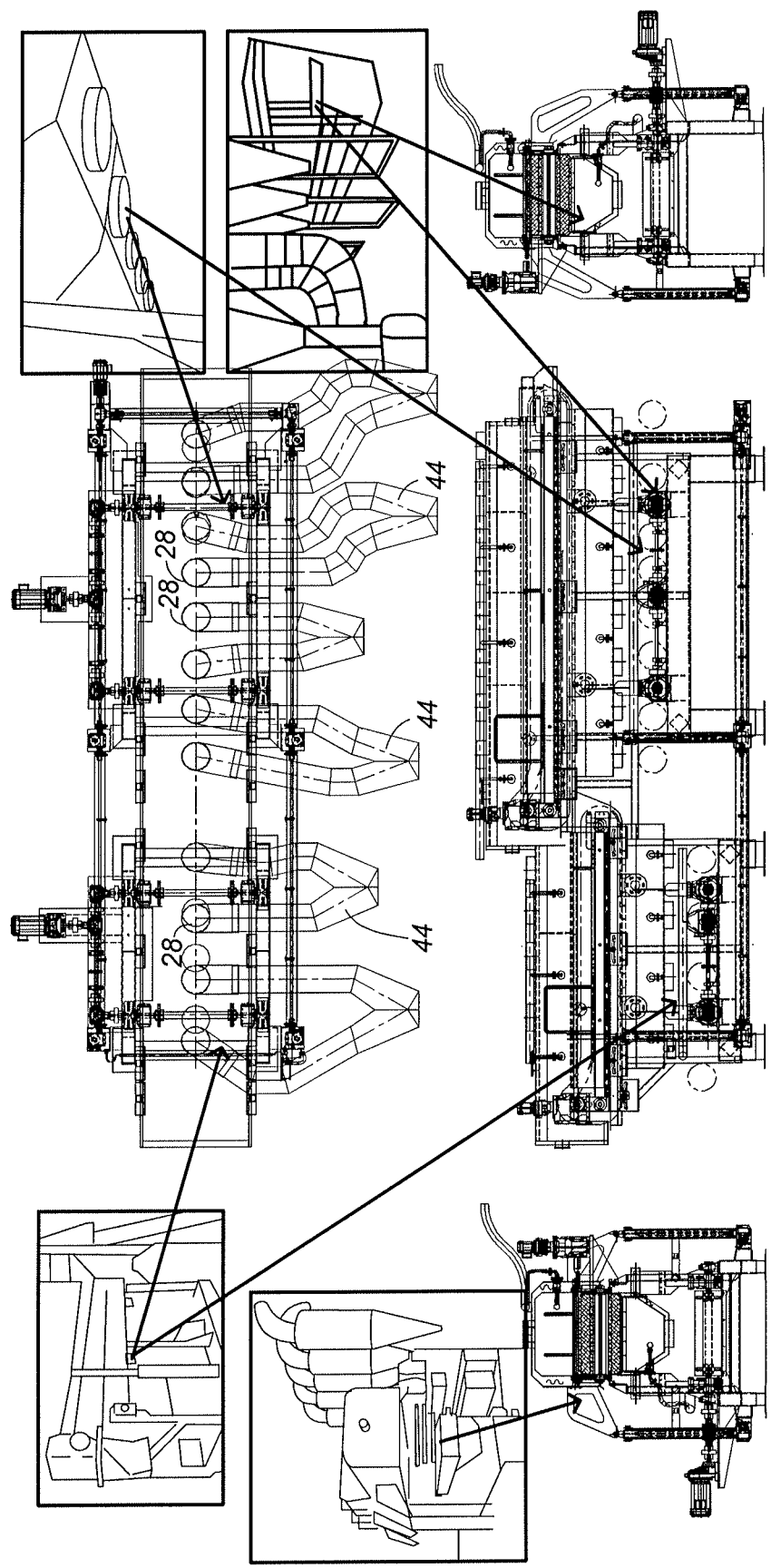
FIG. 5 shows side view of the dryer with expanded view of portions thereof.

FIG. 4 shows an end view of the dryer 10, and in particular of a port 42 used for viewing the interior especially during operation. The port 42 can be covered with a clear material such as Lexan, and ports can be located on the input end 16 or output ends 18/19 of the dryers 12/14 9 (or elsewhere).

As mentioned, the dryer 10 is a fluidized bed dryer. FIGS. 5-11 show the components of the invention relating thereto. The dryers 12/14 include a plurality of lower ports 28 for receiving air, which are located on the underside of the pans 24. As show in FIG. 5, input ductwork 44 connects to the appropriate ports 28, 30 and air flows from input to output ports 28, 30 and thereby through the interior of the dryers 12/14.

Figure 6:
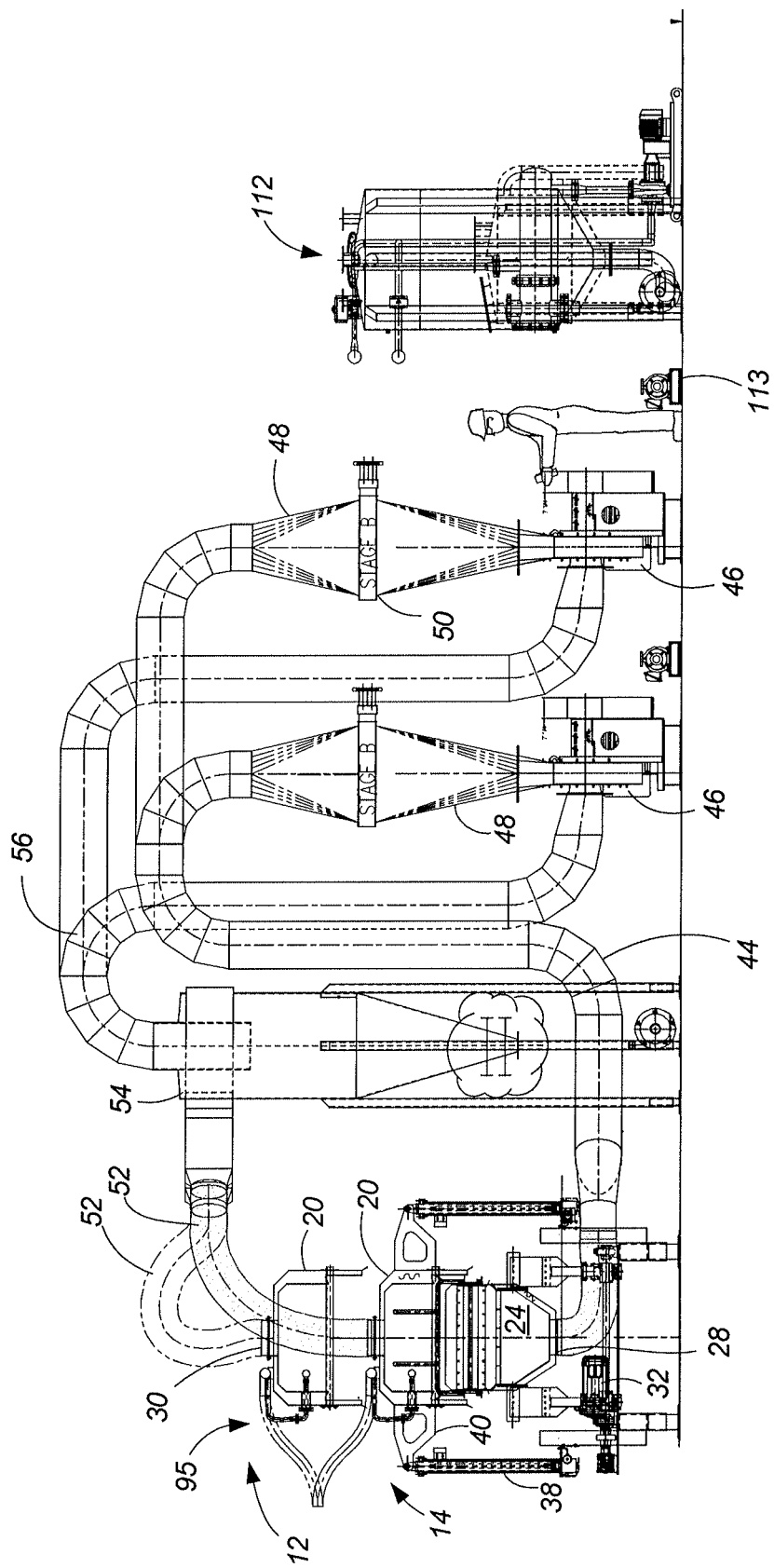
FIG. 6 shows the dryer, and supporting components, ductwork, blower, and heating system.

FIG. 6 shows an embodiment of the invention where air flows into the lower ports 28 and out the upper ports 30. As shown in FIG. 6, the air is produced from air blowers 46 into the input ductwork 44.

Furthermore, dampers can be located inside the duct work feeding the lower ports 28 or upper ports 39 to provide additional control over the incoming and/or exiting air flow, and in particular to individualize the flow into each input port 28 or output port 30 and the dryer segment serviced thereby. The dampers can be manually set, or can be electronically controlled as well. Yet more control over the air flow into the input ports 28 can be achieved by changing the length of ductwork feeding the air into the ports. For example, adding additional ducting and covered or angle duct work at acute angles can be used to tailor the air flow as needed.

Still further, the duct work can be modified to accommodate the vibrational components of the dryer 10. In particular, as described herein the dryer includes a vibrating bed 22, which results in vibrational movement of the lower part of the dryer 10; however, by making rigid connections to the bed 22 the entire dyer 10 can vibrate. In either case, the duct work that connects to the lower and upper ports 28, 30 needs to be movably attached thereto. In particular, flexible housing can secured to the ports 28, 30 to allow for the movement of the dyer 10 to not impact rigid ductwork.

Figure 54:
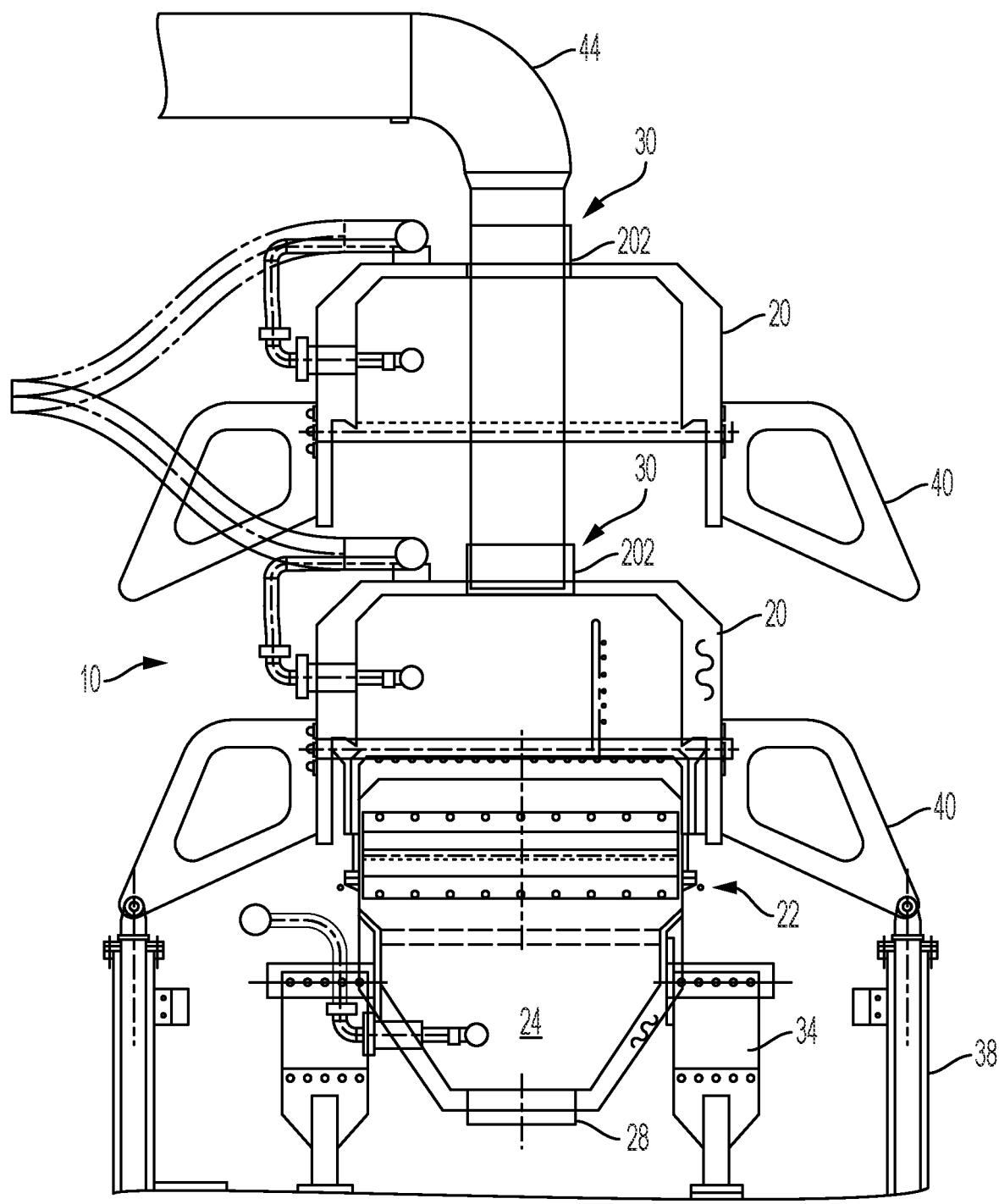
FIG. 54 is an end view of the dryer with the hood in a raised and lowered position.
Figure 55:
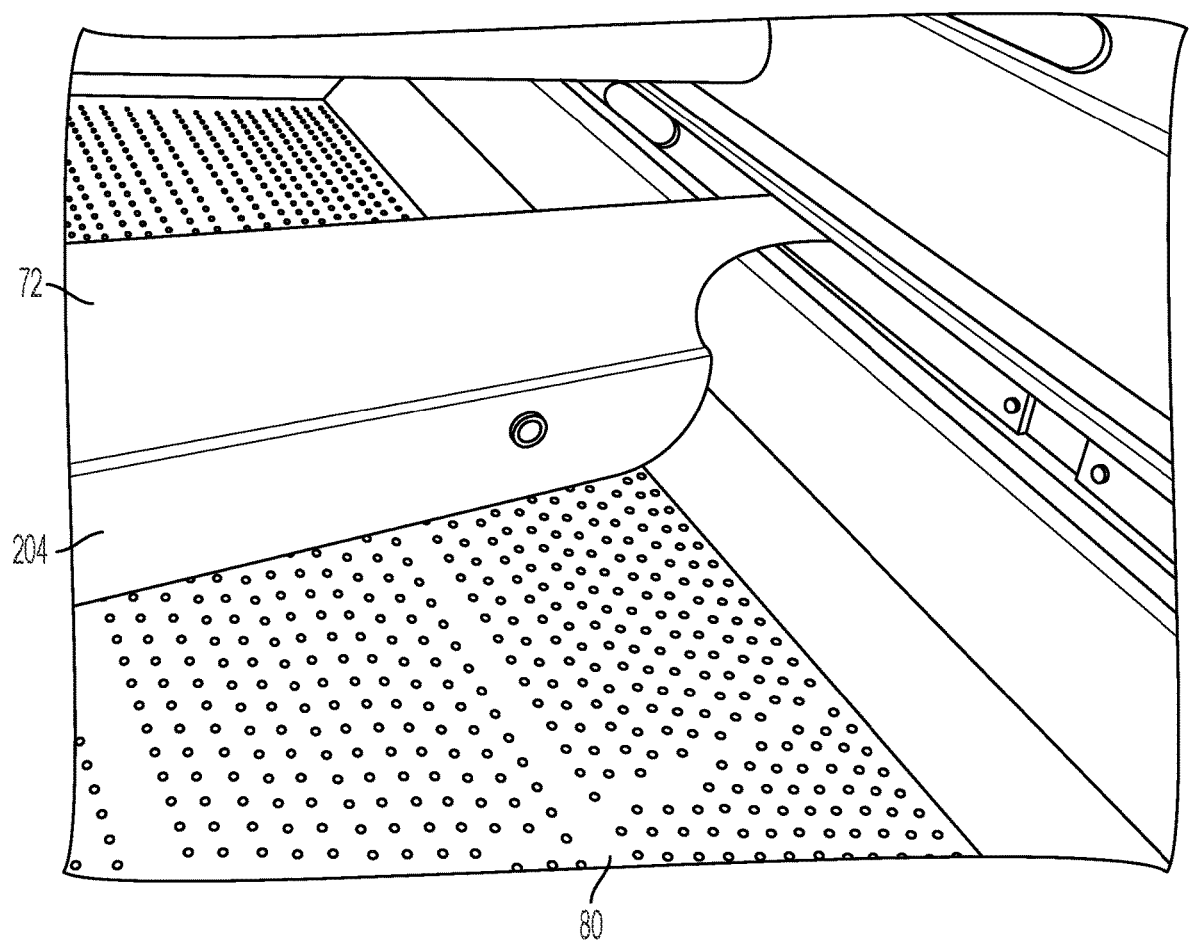
FIG. 55 is a view of the inside of the dryer showing a paddle.

Alternatively, a ring 202 can be inserted into the ports 28, 30 and the housing inserted into the ring 202 (see FIG. 54—which shows the hood 20 in the open and closed position whereby the ring 202 moves along the ductwork as needed). In this manner, rigid ductwork can be inserted into the rings 202 and the vibrational components would cause the rings 202 to move over the ducting. Even if the upper part of the dryer 10 does not vibrate, the rings 202 can be used to allow the hood 20 to move up and down, where the ring 202 would move over the rigid ductwork. The ring 202 is most suitable comprised of a material such as plastic, fiberglass, Teflon, Peek, Viton, or any alternative material that would facilitate smooth movement over the ductwork which can be comprised of metal such as stainless steel, or high temperature resin or fiberglass, and the like.

FIG. 6 shows in more particular the mechanical components of the fluidized aspects of the invention. In particular, the air blowers 46 generate a stream of air that leads into a heating unit (heat exchangers) 48. The heated air can then be used to heat the product for the purpose of cooking, dehydrating, drying, pasteurizing, sterilization, or pathogen elimination. The air travels across heating coils 50 located in the middle of the ductwork of the heating unit 48. The air then travels through input ductwork 44 into the lower ports 28. The input ductwork 44 splits in two parts (see FIG. 5 or 7) such that one air blower 46 feeds two lower ports 28. In this manner, as shown in more detail in FIG. 7, six air blowers 46 can feed twelve lower ports 28 in the dryers 12/14 (eight ports are located at the bottom of the pan 24 of the Stage A dryer 12 and four ports at the bottom of the pan 24 of the Stage B dryer).

Return air ductwork 52 is attached to the upper ports 30 of the dryer, and leads to a cyclonic separator 54. The cyclonic separators 54 use high speed rotating air to separate particulate matter in the air stream coming from the dryers 10. Air flows in a helical pattern, beginning at the top (wide end) of the cyclone 54 and ending at the bottom (narrow) end. The air then exits the cyclone 54 in a straight stream through the center of the cyclone 54 and out the top. Larger or denser particles in the rotating stream have too much inertia to follow the tight curve of the stream as it rotates about the inside of the cyclone 54, and strike the wall of the cyclone 54, then fall to the bottom of the cyclone 54 where they can be removed. Further, as the rotating flow moves towards the narrow bottom end of the cyclone 54, the rotational radius of the stream is reduced, thus separating smaller and smaller particles. Return air ductwork 52 returns air from two upper ports 30 to each air cyclone 54. From there additional ductwork 56 returns air from the top of the cyclones 54 to the suction inlet of the blower 46 to cycle back into the dryer 10 as just described above. Also shown in FIGS. 6 and 7 is a heat exchanger 112 for the CIP system described below.

Figure 7:
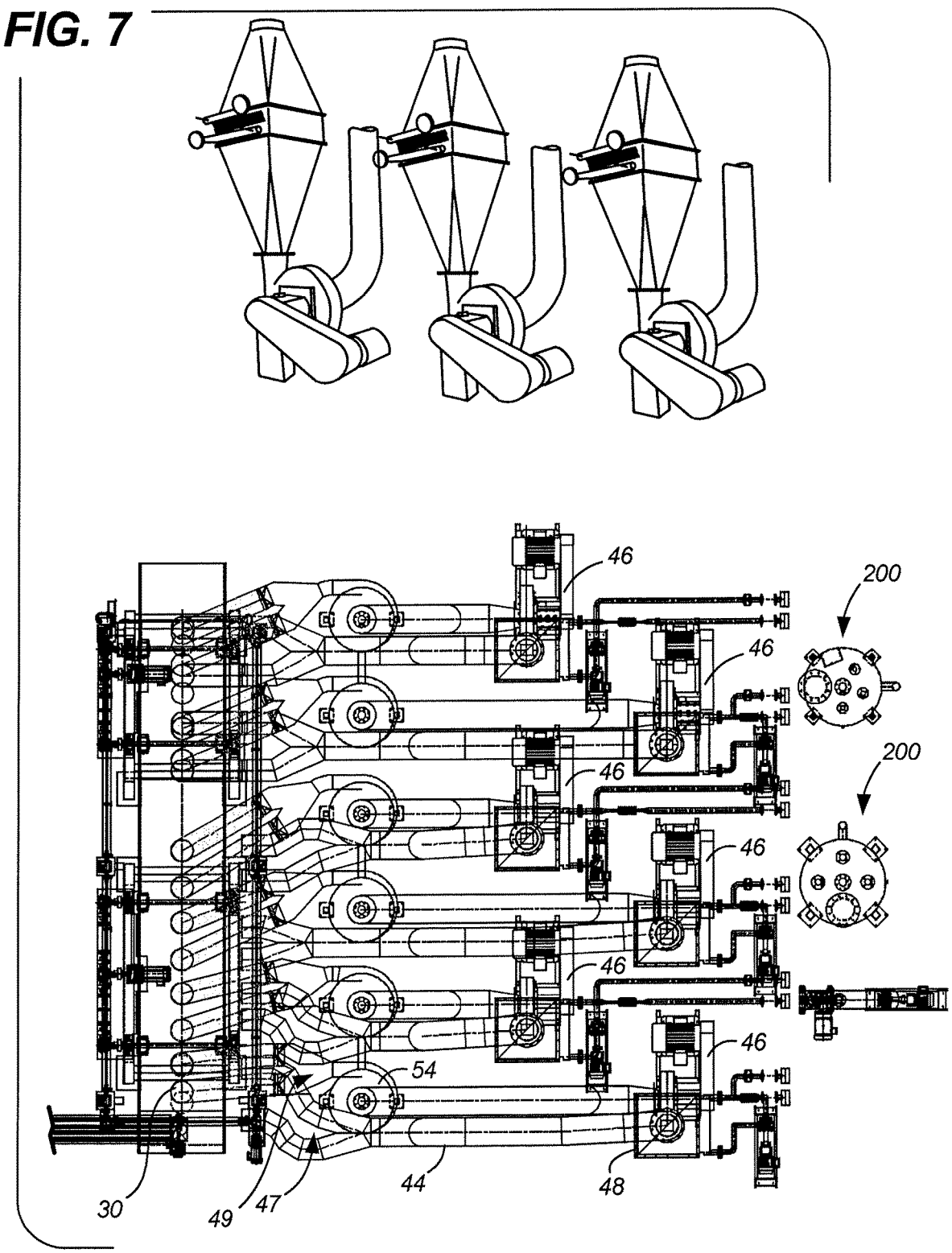
FIG. 7 is a view of ductwork components.
Figure 8:
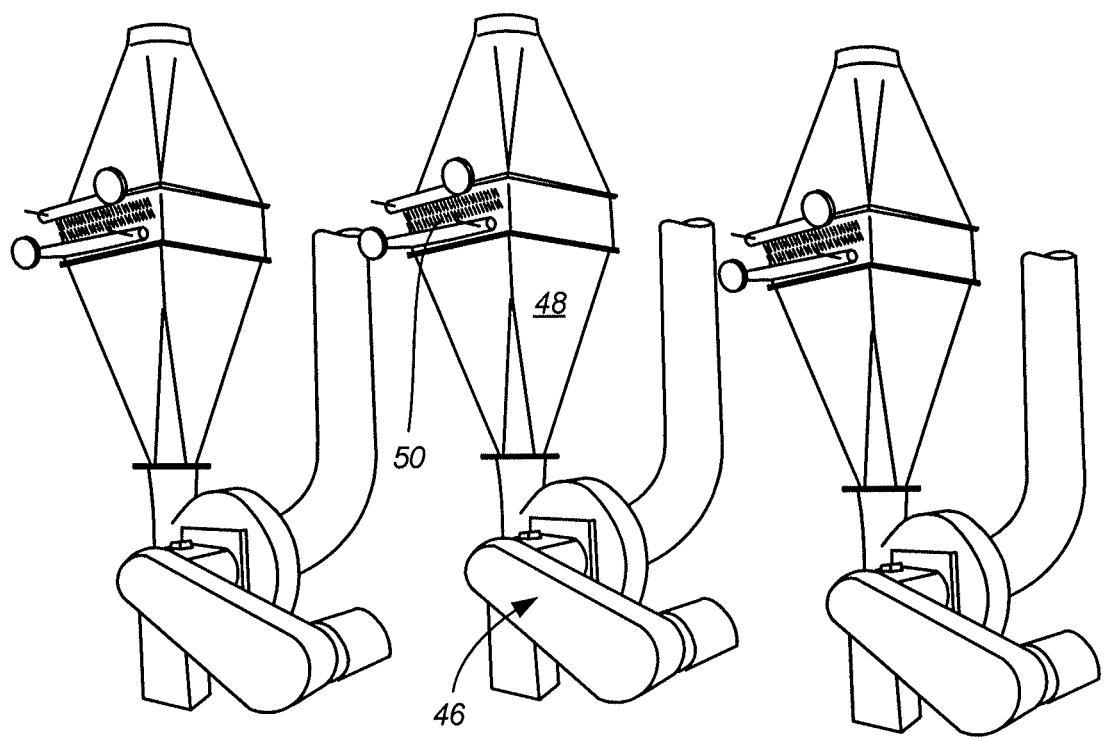
FIG. 8 is an enlarged view of FIG. 7.
Figure 9:
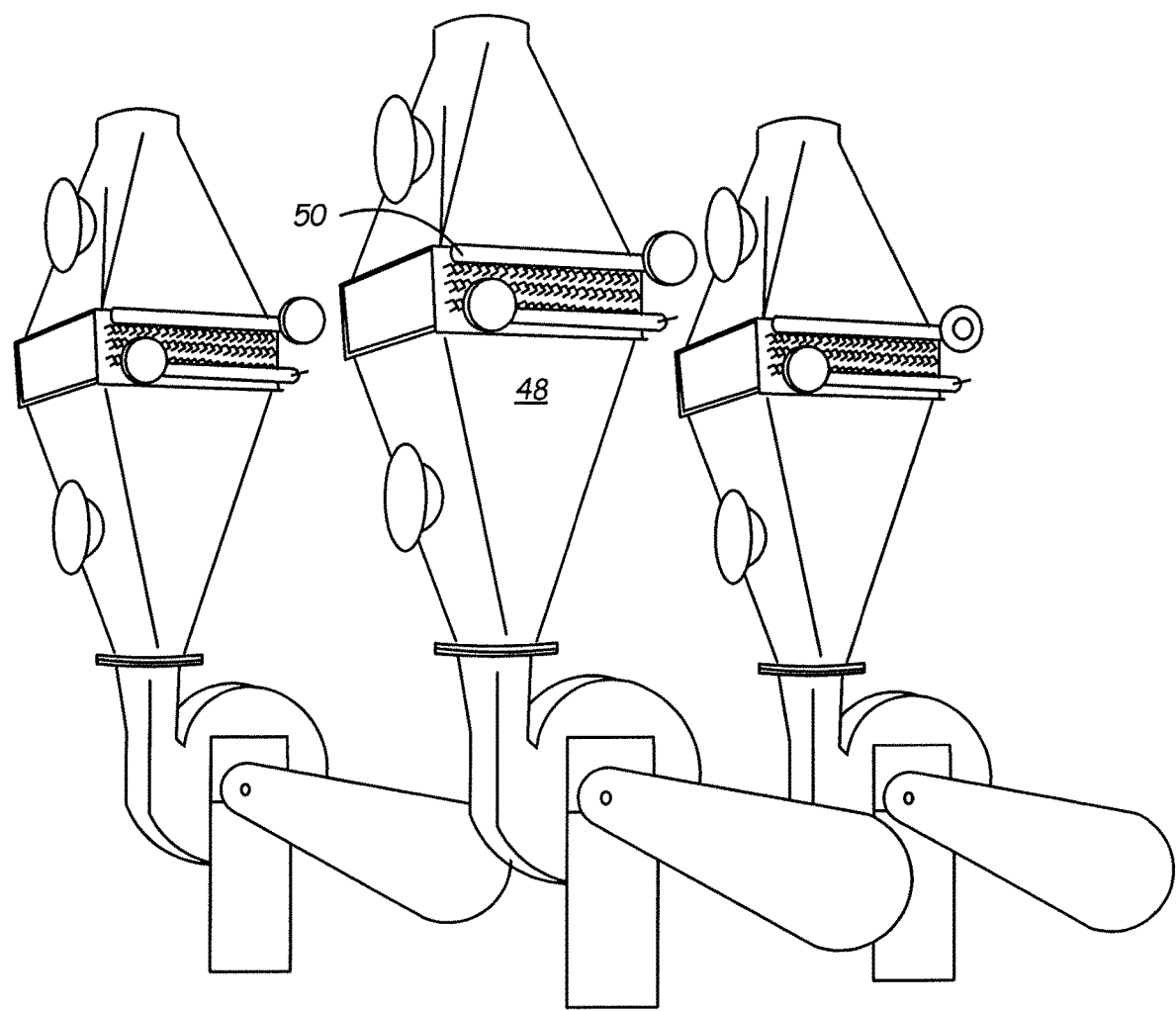
FIG. 9 is a view of ductwork components.
Figure 10:
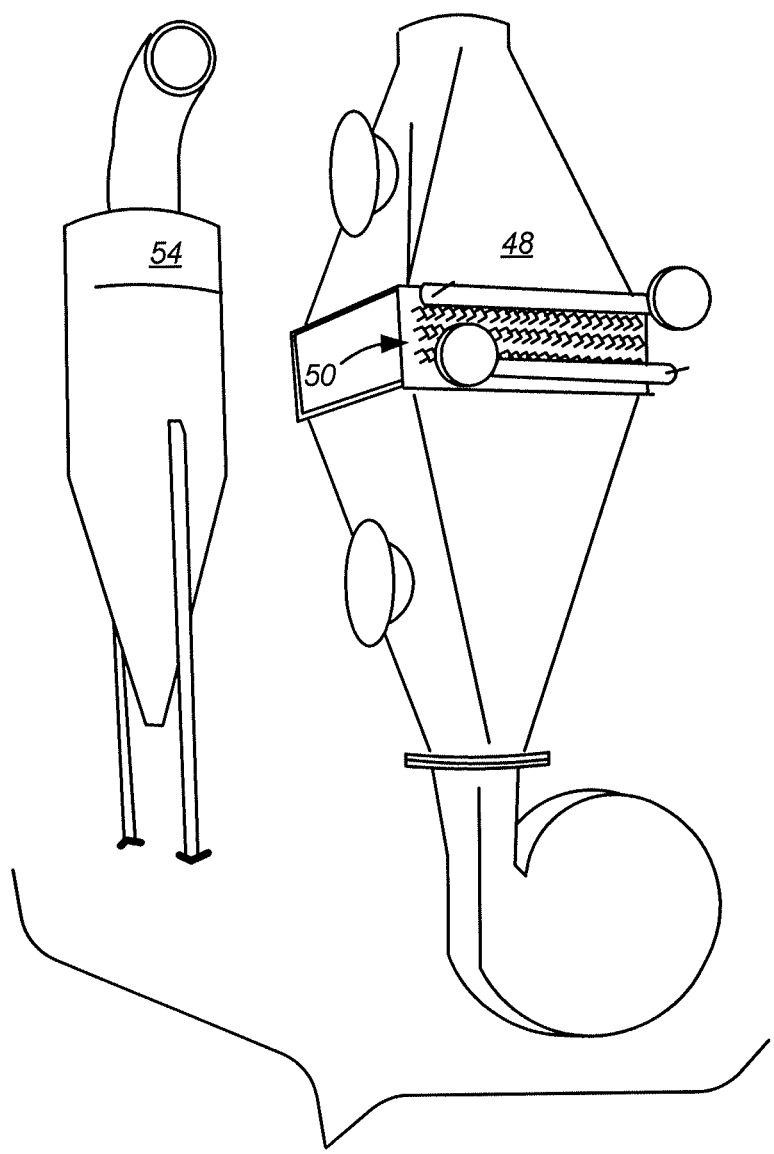
FIG. 10 is a view of ductwork components.
Figure 11:
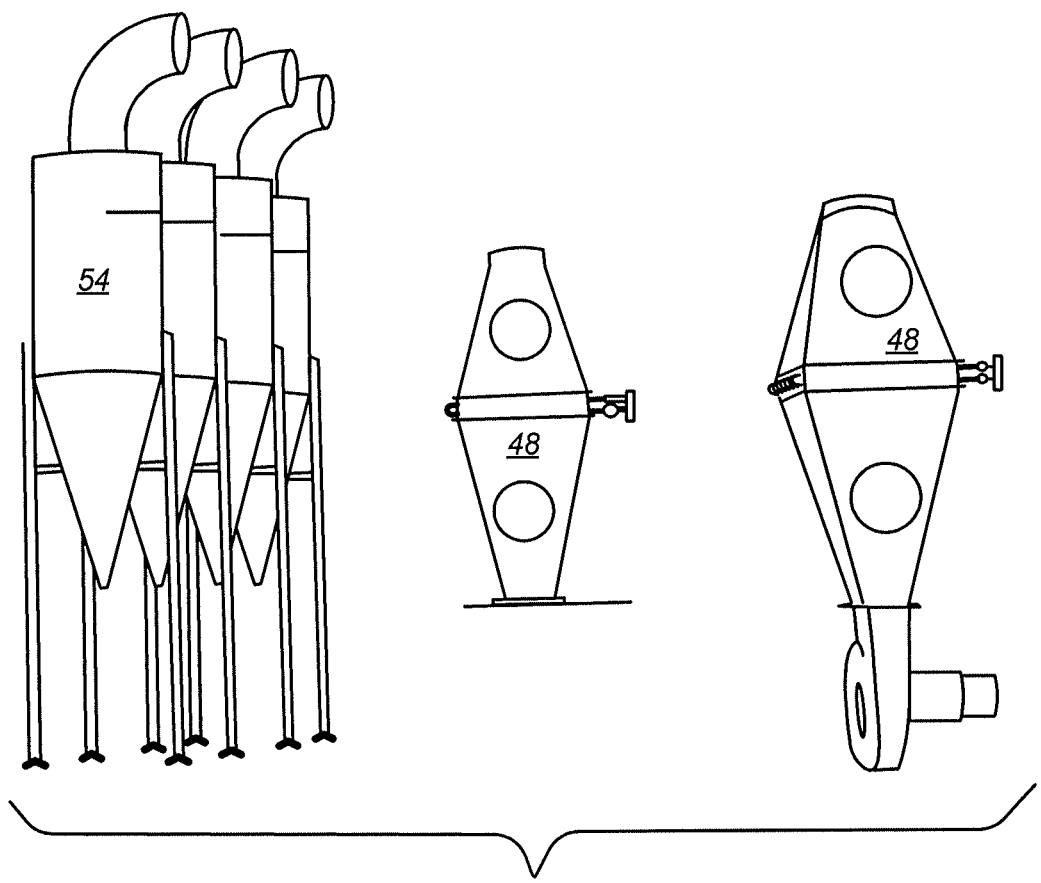
FIG. 11 is a view of the dryer and ductwork components.

FIG. 7 shows the plan view arrangement for the entire dryer 10, wherein six blowers 46 and six cyclones 54 connect to all twelve input and upper ports 28/30. FIGS. 8-11 show additional views of the dryer ancillary equipment shown in FIG. 6-7. In particular, the input ductwork 44 splits at the point indicated by arrow 47 (see FIG. 7), which then feeds two lower ports 28. Similarly the cyclones 54 receive air from two upper ports 30 which are joined together at the point indicated by arrow 49 (see FIG. 7). FIGS. 8-11 show additional views of the air handling components for further reference.

Figure 12:
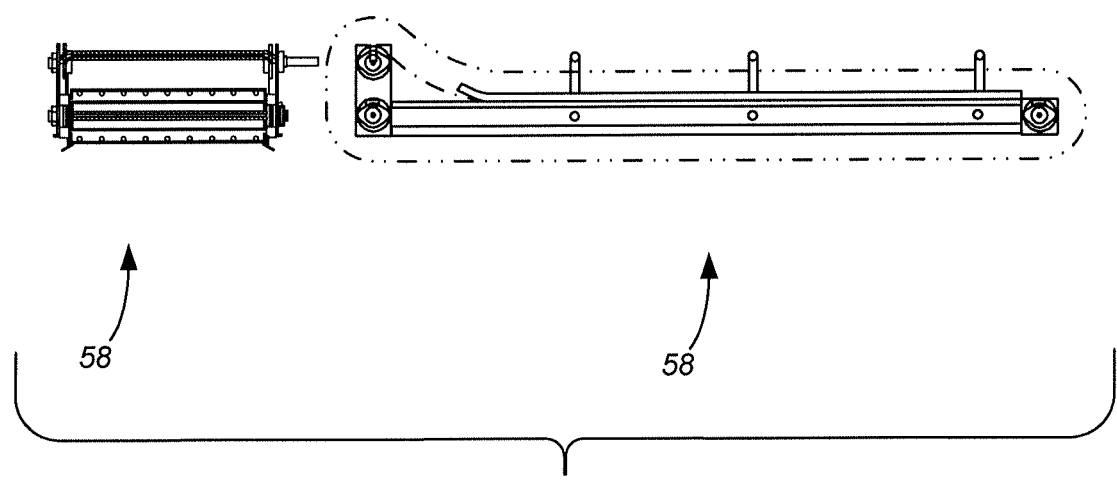
FIG. 12 is a side and end view of a conveyor.

FIG. 12 shows the drag conveyor 58 of the Stage B dryer 14 where discharge end of the conveyor 58 is shown on the left side image, and the right side image shows a cross-sectional view of the conveyor (the Stage A conveyor being identical except in length). FIG. 12 includes an arrow above, the cross sectional view, to show the drag conveyor 58 belt direction as it moves product, which is from right to left as viewed in FIG. 12.

Figure 13:
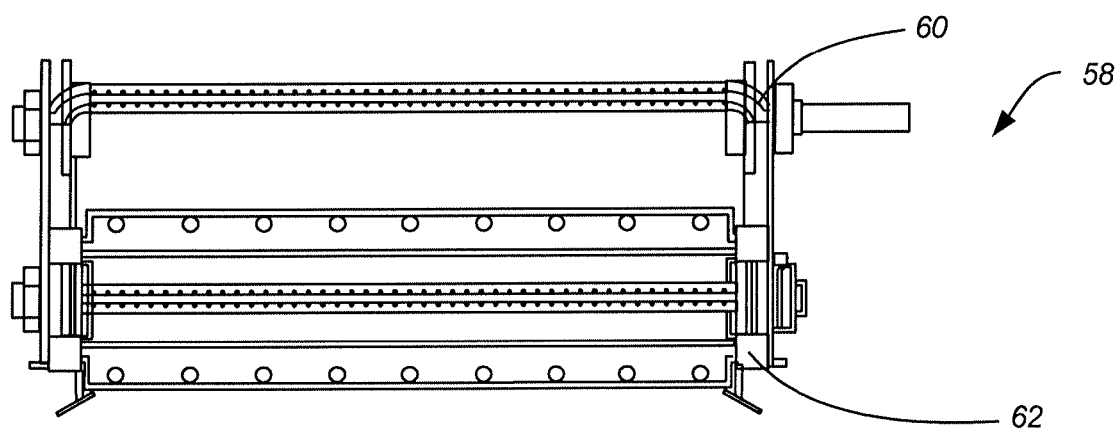
FIG. 13 is an end view of the conveyor.
Figure 14:
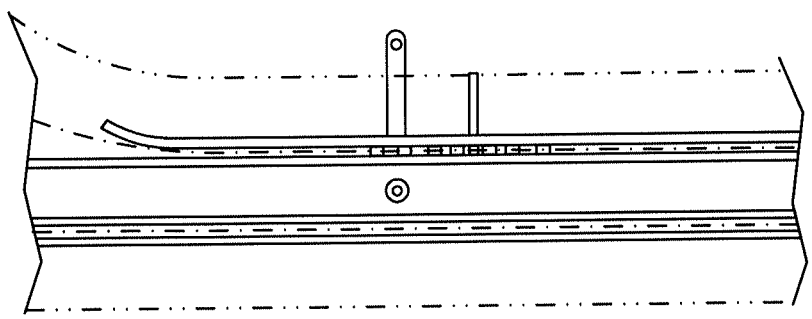
FIG. 14 is a side view of the conveyor and paddles.
Figure 15:
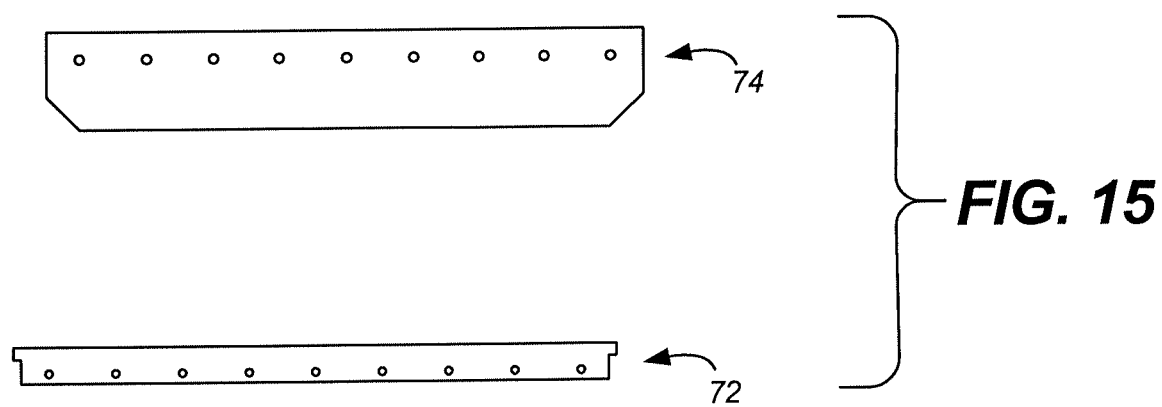
FIG. 15 is a view of the paddles.
Figure 16:
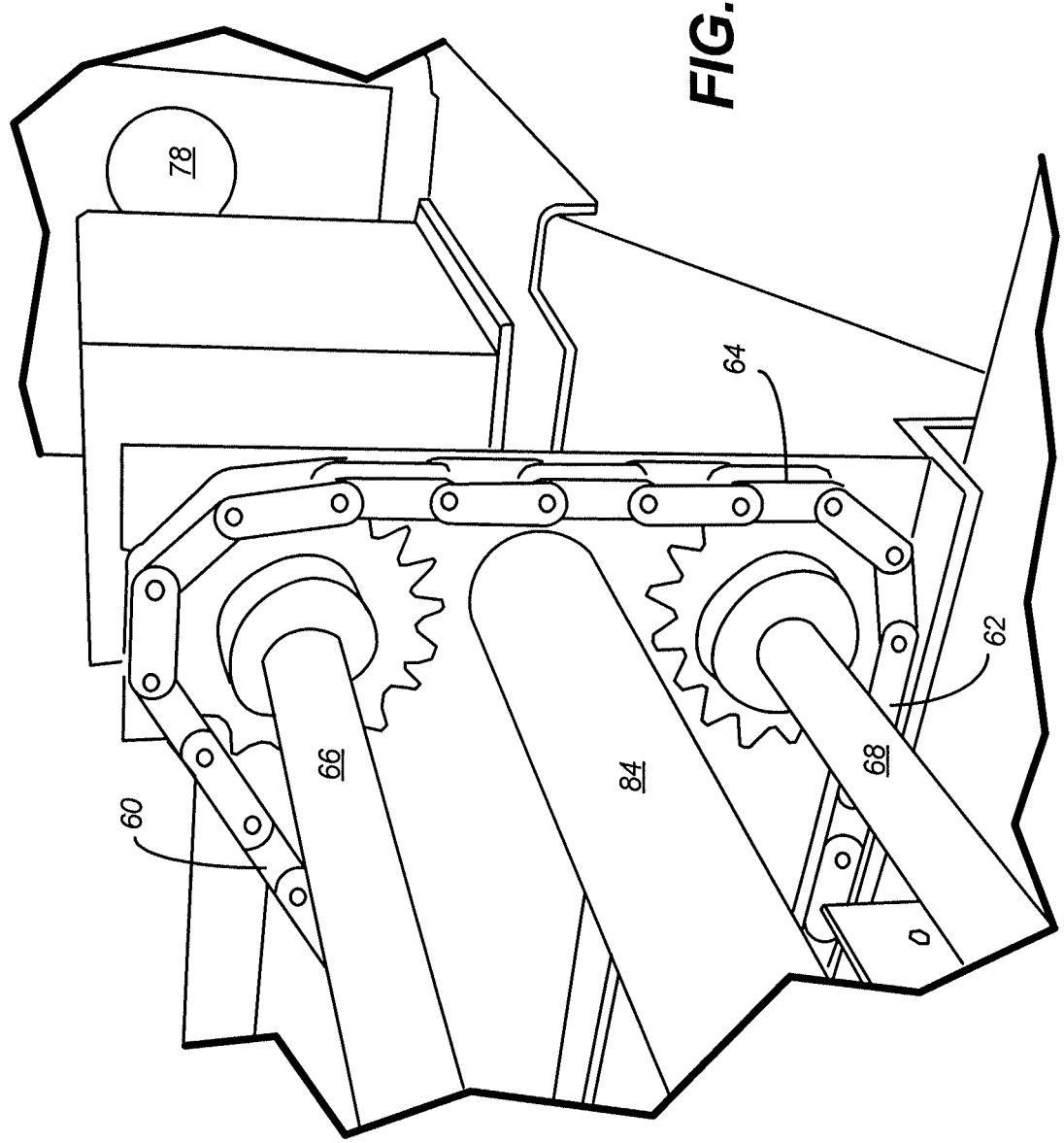
FIG. 16 is a view of the drive mechanism of the conveyor.
Figure 22:
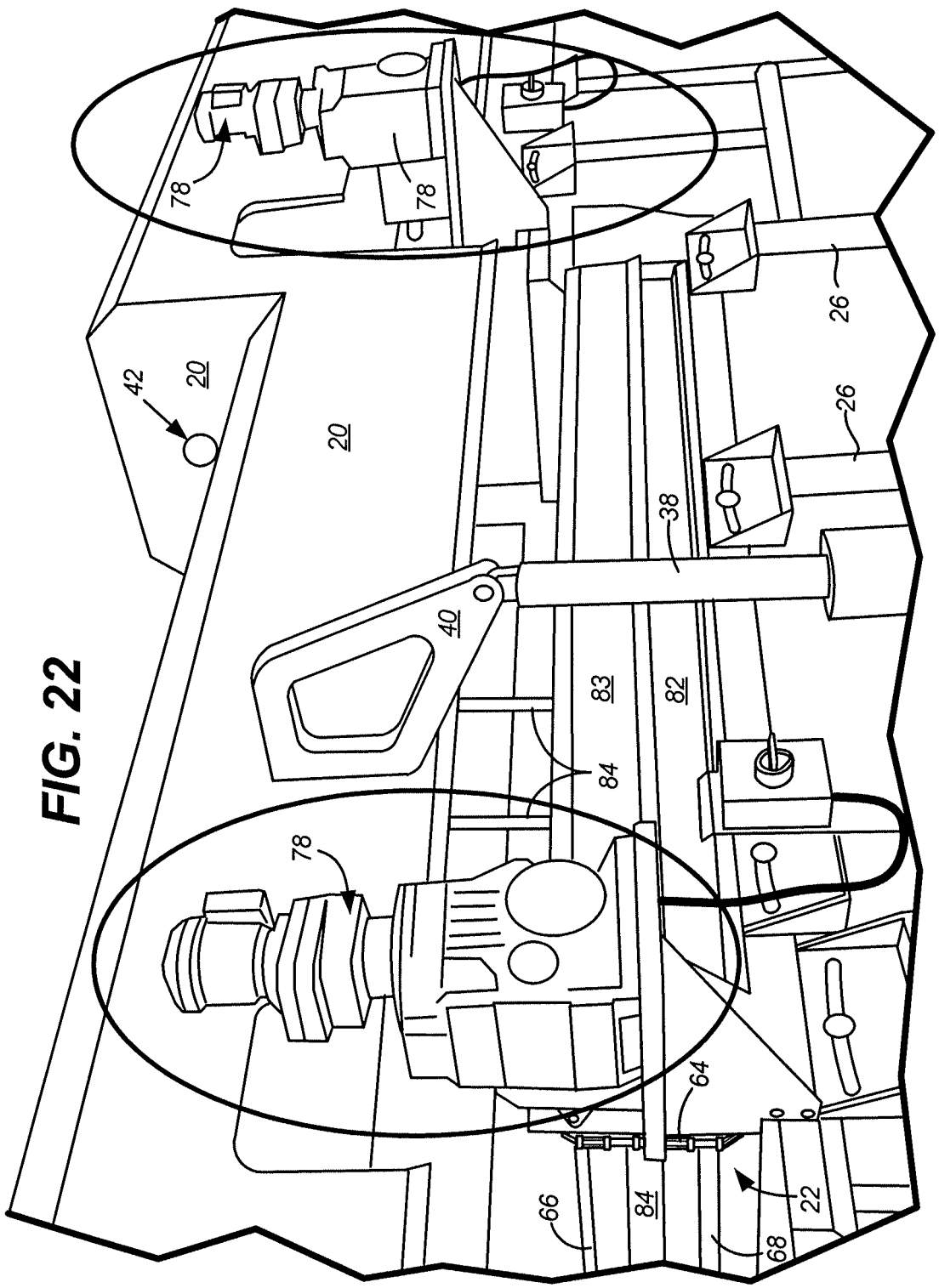
FIG. 22 is a side view of the dryer.

The drag conveyor 58 is located in the beds 22 of the Stage A dryer 12 and the Stage B dryer 14. The drag conveyor 58 (enlarged end cross-sectional view shown in FIG. 13) is propelled by a chain drive that comprises an upper chain track 60 and a lower return chain track 62 that provides for a continuous track for the chain 64 (see FIG. 16). Shafts are located at either end of the conveyor 58, and include an upper shaft 66 and a lower shaft 68 at the exit end of the conveyor 58, and a single shaft 70 on the input end of the conveyor 58 (see FIG. 29). The upper shaft 66 attaches to a drive motor 78 (FIG. 16), which turns the shaft 66 engaging a gear that moves the chain 64 (FIG. 22).

Figure 17:
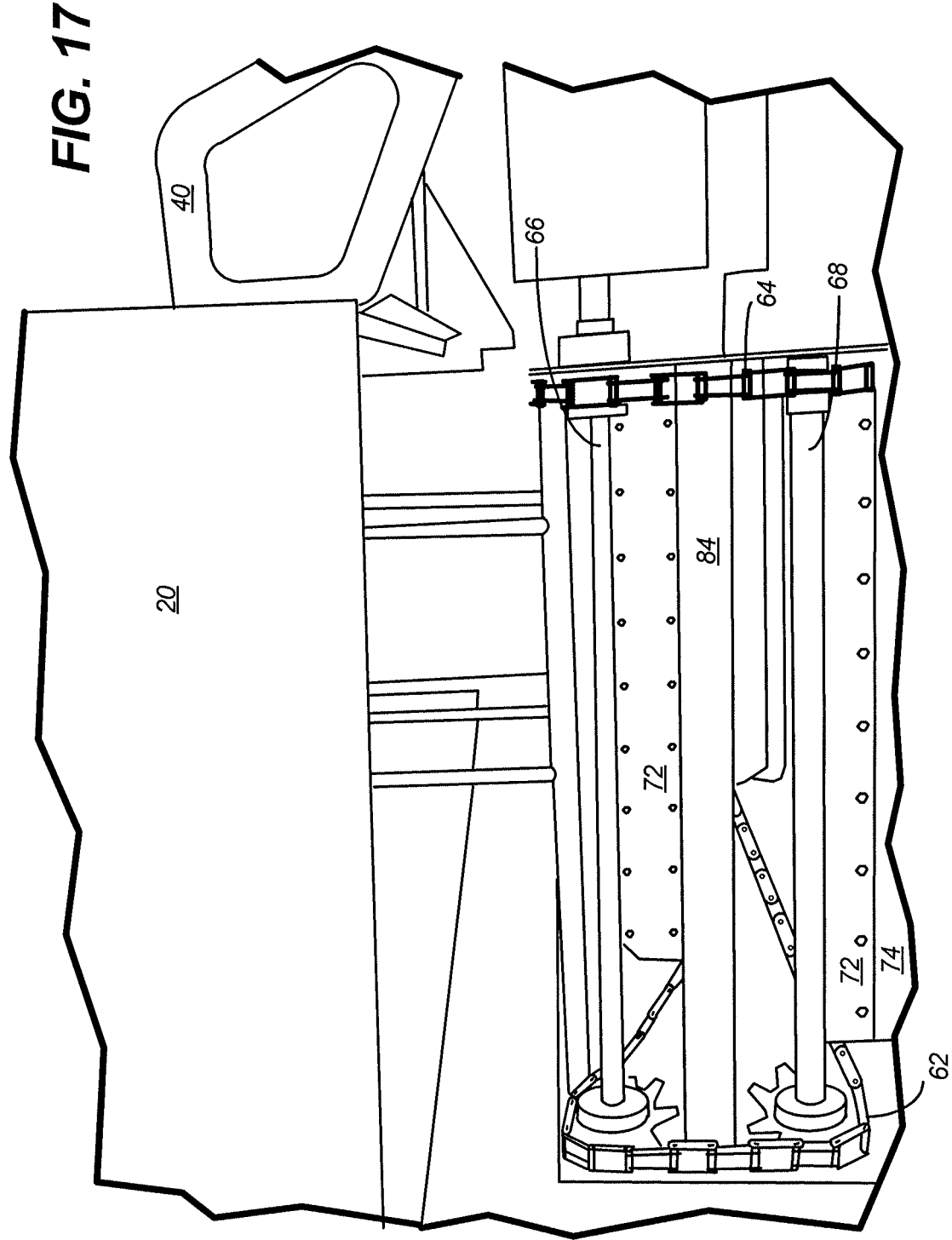
FIG. 17 is an end view of the drive mechanism of the conveyor.
Figure 19:
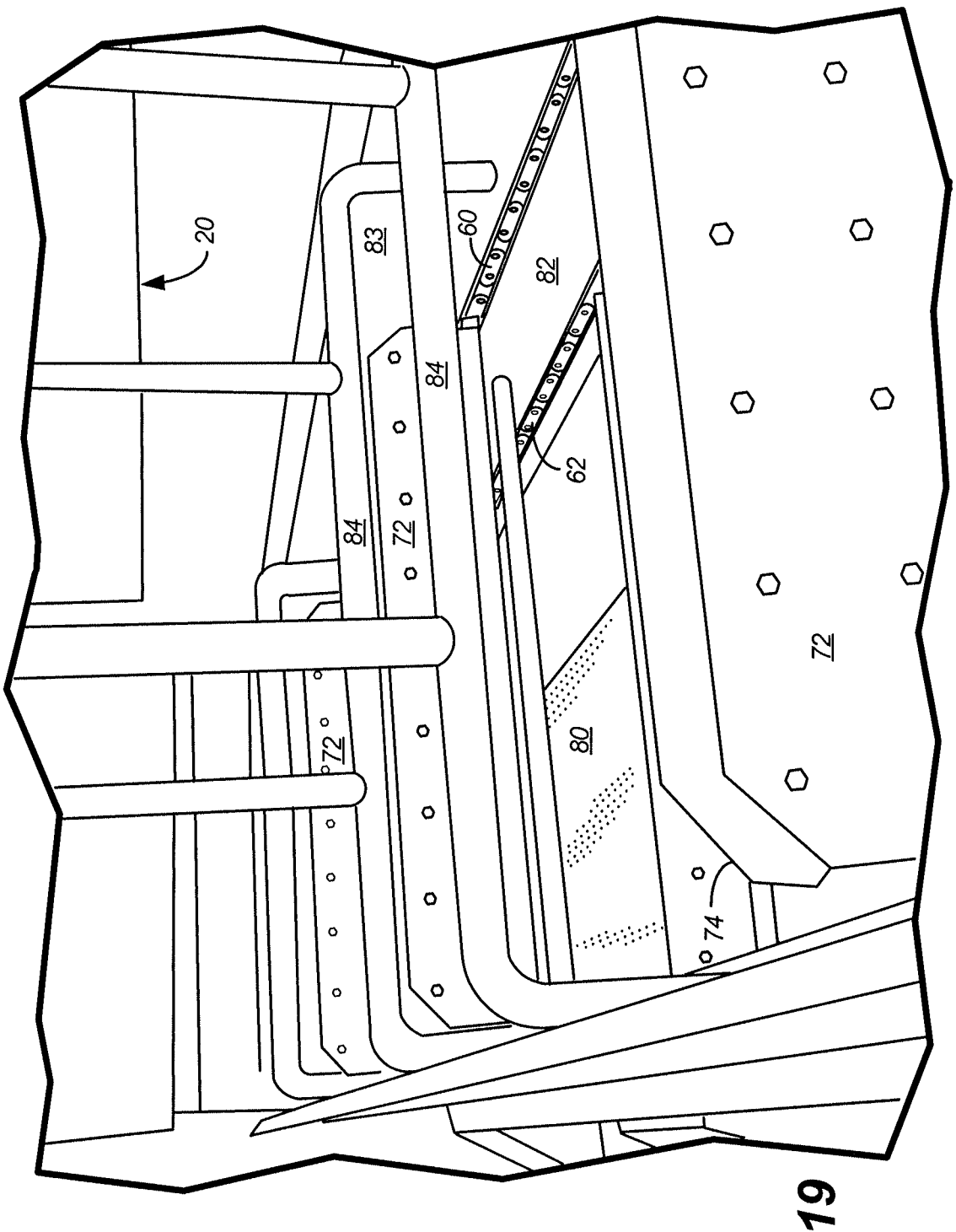
FIG. 19 is an end view of the inside of the dryer.

A plurality of paddle mounts 72 (FIG. 19) are spaced apart along the length of, and affixed to the chain 64 (FIG. 17). Paddles 74 preferably are made of a material such as polyetheretheketone (PEEK) are attached to the paddle mounts 72. Other suitable and similar materials can be used as well.

Figure 18:
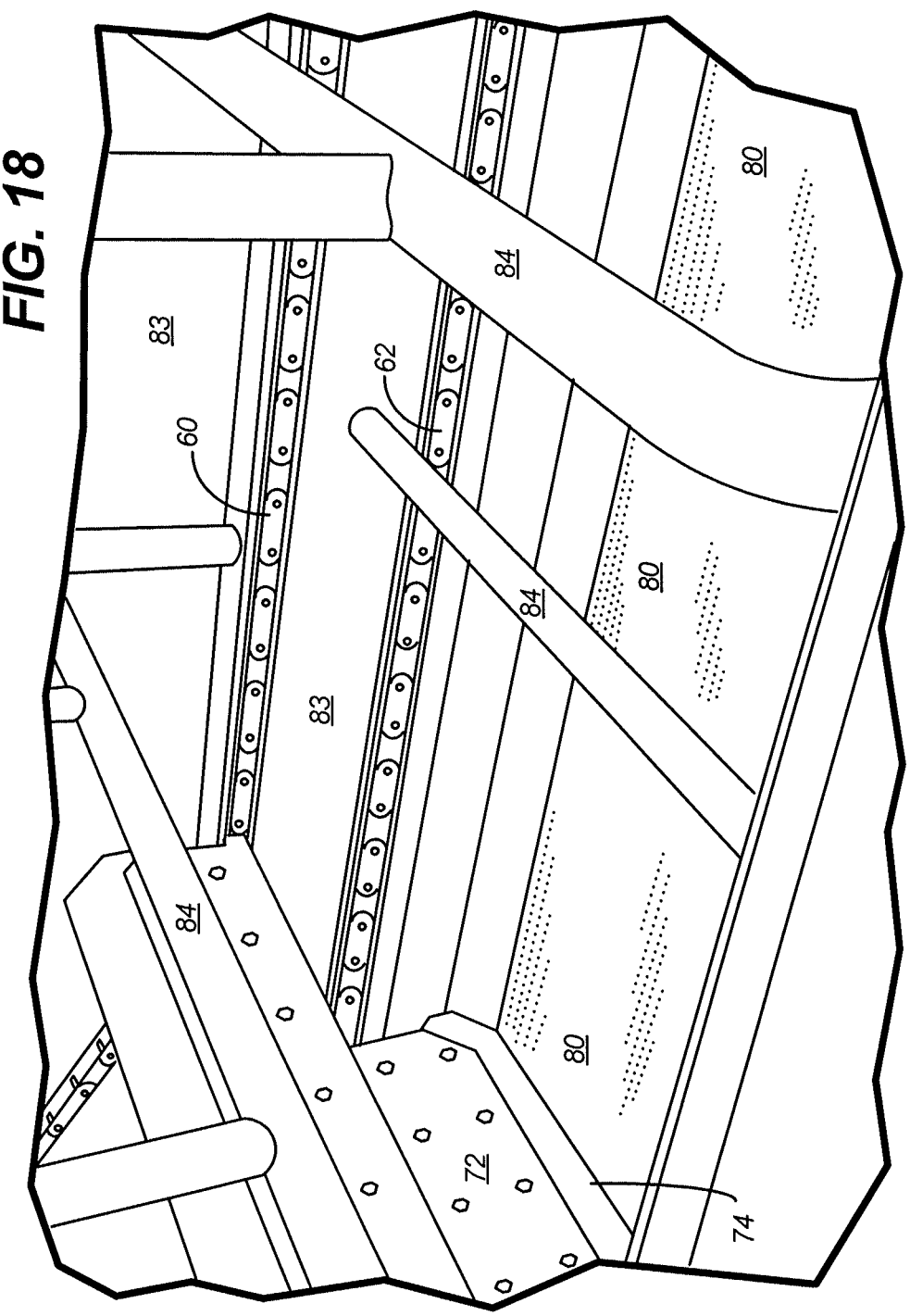
FIG. 18 is a side view of the interior of the dryer.
Figure 20:
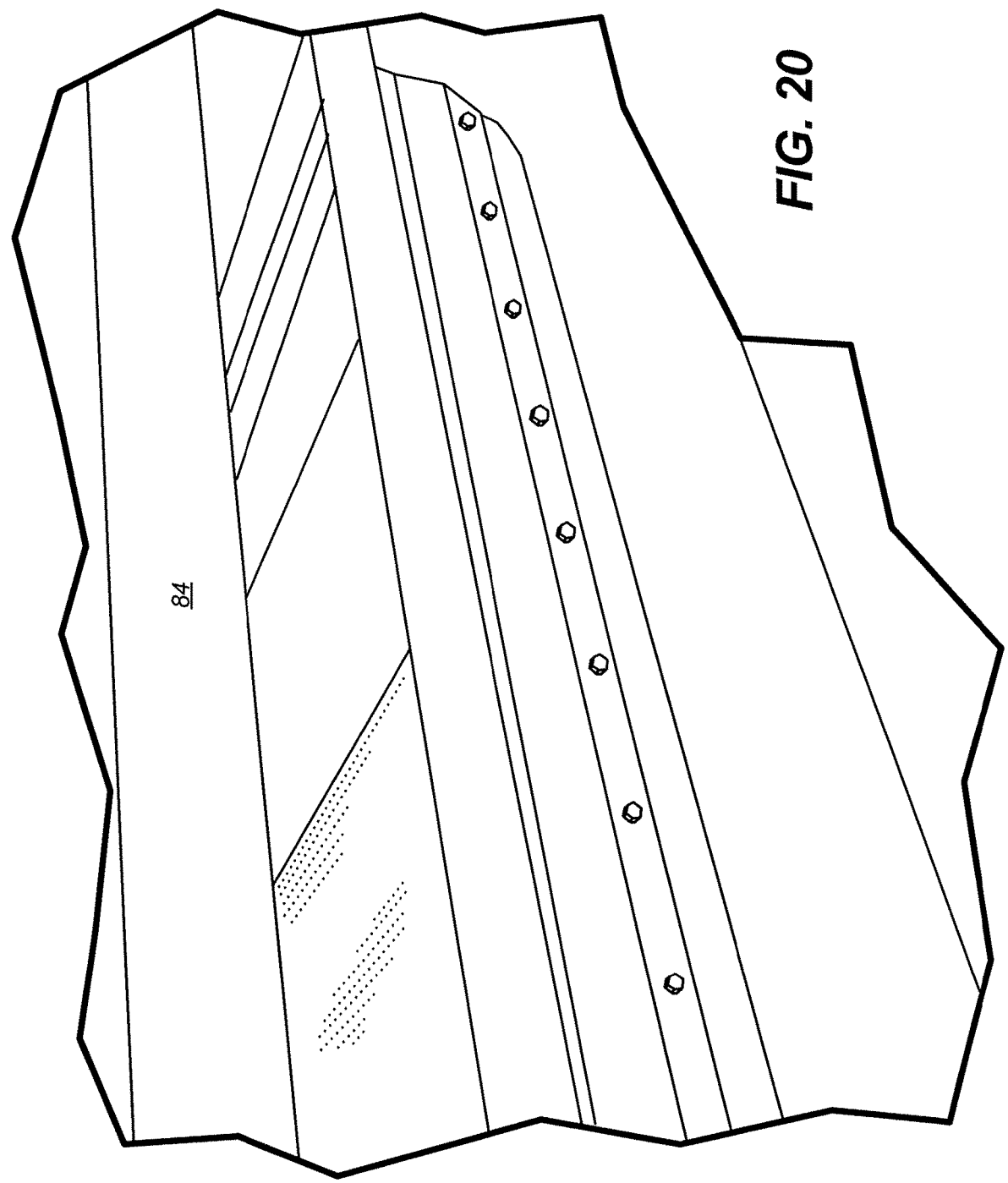
FIG. 20 is an end view of the inside of the dryer.
Figure 21:
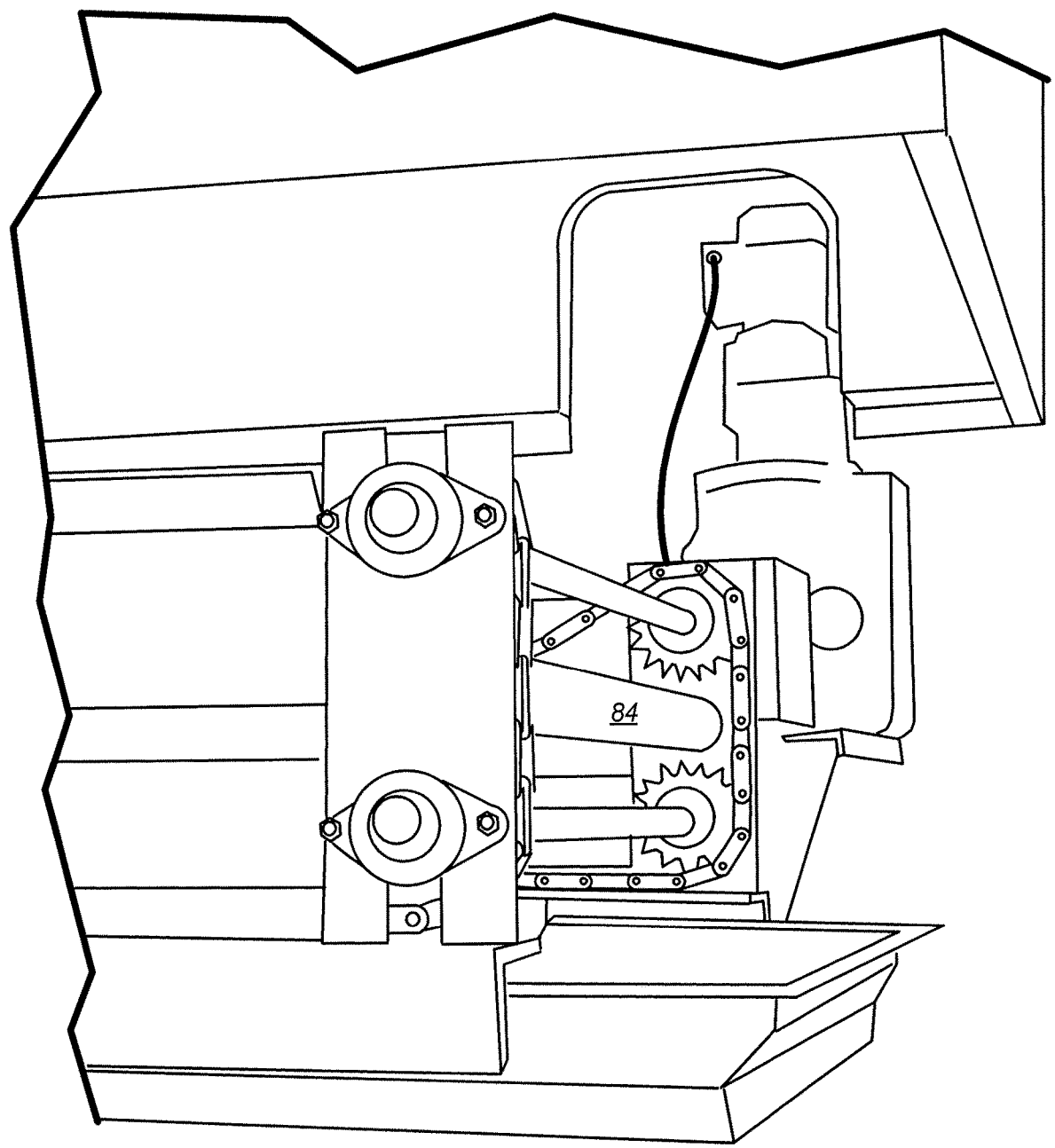
FIG. 21 is a view of the drive mechanism of the conveyor.

FIG. 18 shows the interior of bed 22, which comprises a perforated bottom 80. The perforations allow air moving through dryer 10 via the various ports 28, 30 to penetrate through the bottom 80 and directly impact the product therein, thereby fluidizing product traveling on the conveyor 58. Side panels 82 are attached to either side of the bed 22, and in combination with the perforated bottom 80 form a channel, which conforms to the shape of the paddles 74. An upper side panel 83 is located above the side panel 82. The interior of the bed 22 further comprises a plurality of support members 84, some of which are straight and extend between the sides of the bed 22 while others are generally U-shaped and connect above the upper chain track 60. The latter members 84 include an upright section that extends above the bed, but not to such an extent that they interfere with the travel of the hood 20 when it travels between the raised and lowered positions. The support members 84 attach to the side panels 82, 83. The U-shaped members extend far enough above the perforated bottom 80 to allow the paddles 74 to pass underneath on the return run back to the input end of the applicable dryer 12/14, without interference therewith. The straight support members 84 are located between upper and lower chain tracks 60, 62, which places the members 84 between the path of the paddles 74. Further support bars 84 are located between the shafts 66, 68 at the ends of the dryers 12, 14 (as shown in FIGS. 20-22). Further details of the conveyor 58 are shown in FIGS. 19-22, for reference purposes.

FIGS. 23 and 24 show the vibrational components of the dryer 10. Drive arms 34 extend upward from a platform located below the dryer to connect with the bed 22. Drive motors 32 connect to the arms 34 through coupling of the shafts 36. The shafts 36 extends under the dryer 10 and connect to the drive arms 34, which are located on both sides of the dryers. The drive arms 34 connect to the bed 22 with a circular plate 92 that is bolted to the bed 22. The drive arms 34 move the bed 22 back in forth, vertically back and forth (as shown in FIGS. 23, 24), whereby the drive motors 32 move the arms 34 rapidly from side to side as well correspondingly up and down.

Figure 25:
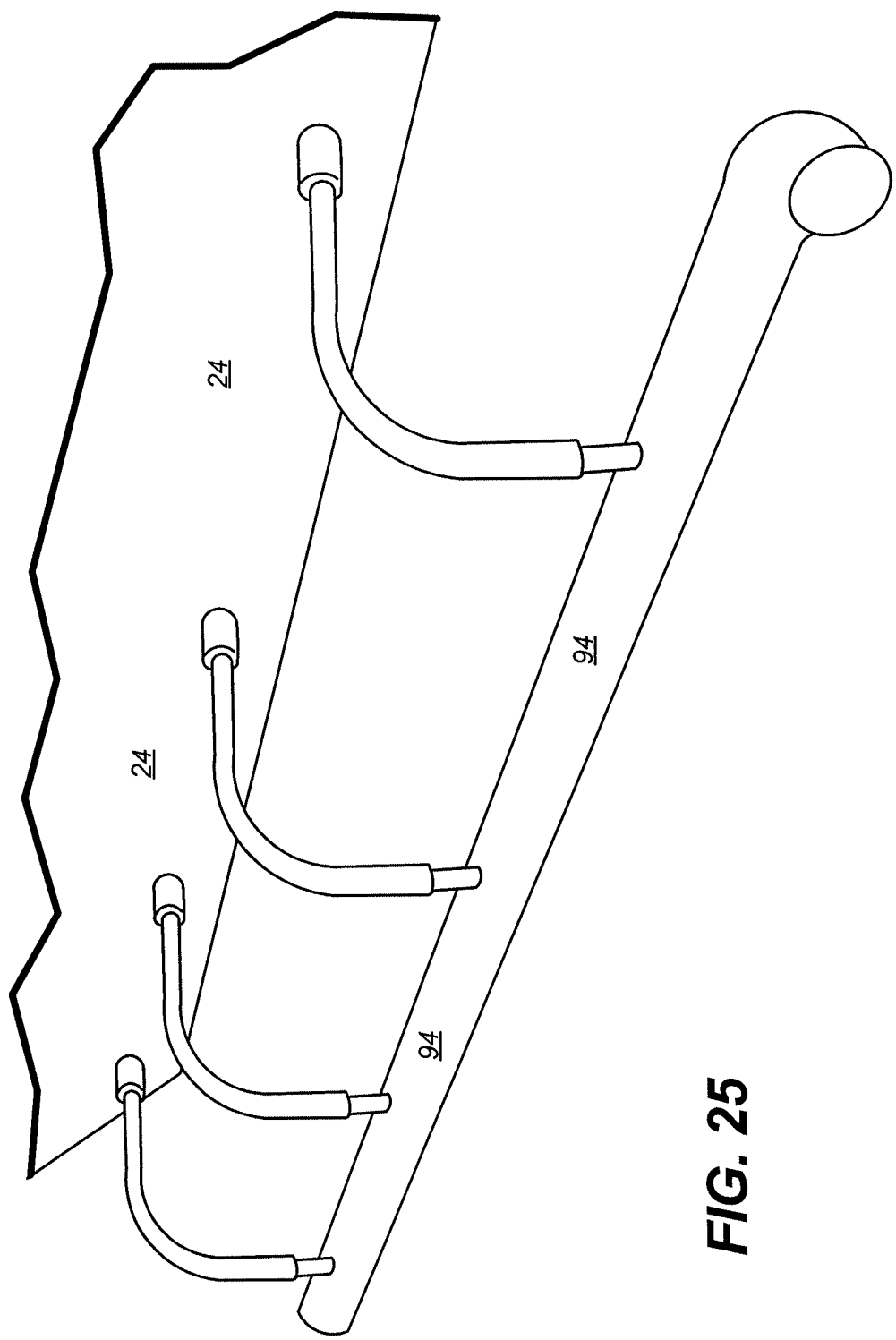
FIG. 25 is a view of the CIP system.

FIG. 25 shows housing 94 that connects to the pan 24, which is part of a clean-in-place system (CIP) used for cleaning and/or sterilizing internal components and surfaces of the dryer 10. The CIP system utilizes a plurality of pumps, storage tanks, valves, and interlocks (not shown) to introduce a suitable cleaning solution into the dryer 10, thereby eliminating the need for manual cleaning and/or disassembly of the dryers 10 in connection therewith. Additionally, FIG. 6 shows additional CIP connections 95 located on the hood 20 (showing flex hose as the hood 20 is in the open and closed position).

Figure 26A:
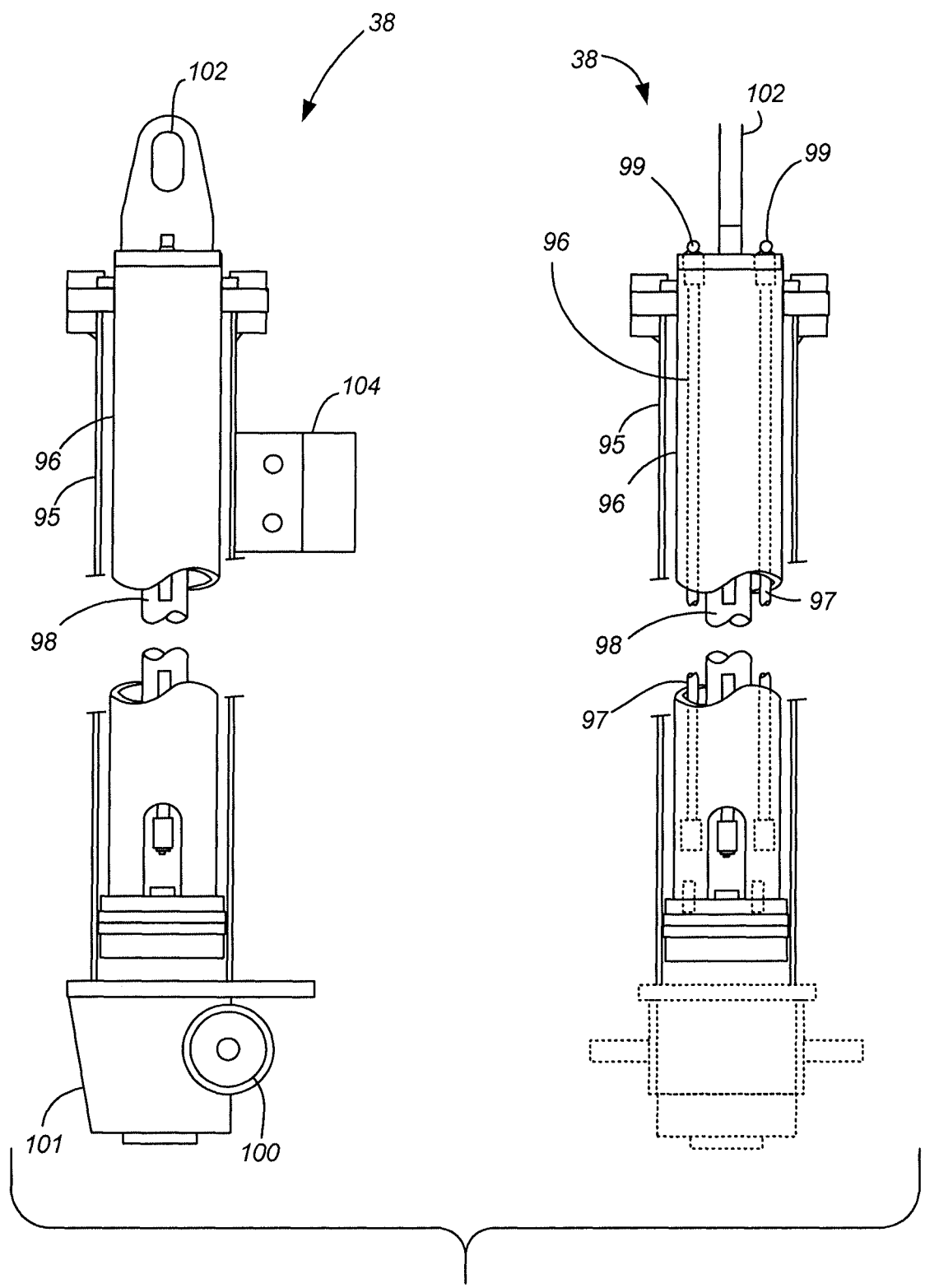
FIG. 26*a* is view of the lift mechanism.
Figure 26B:
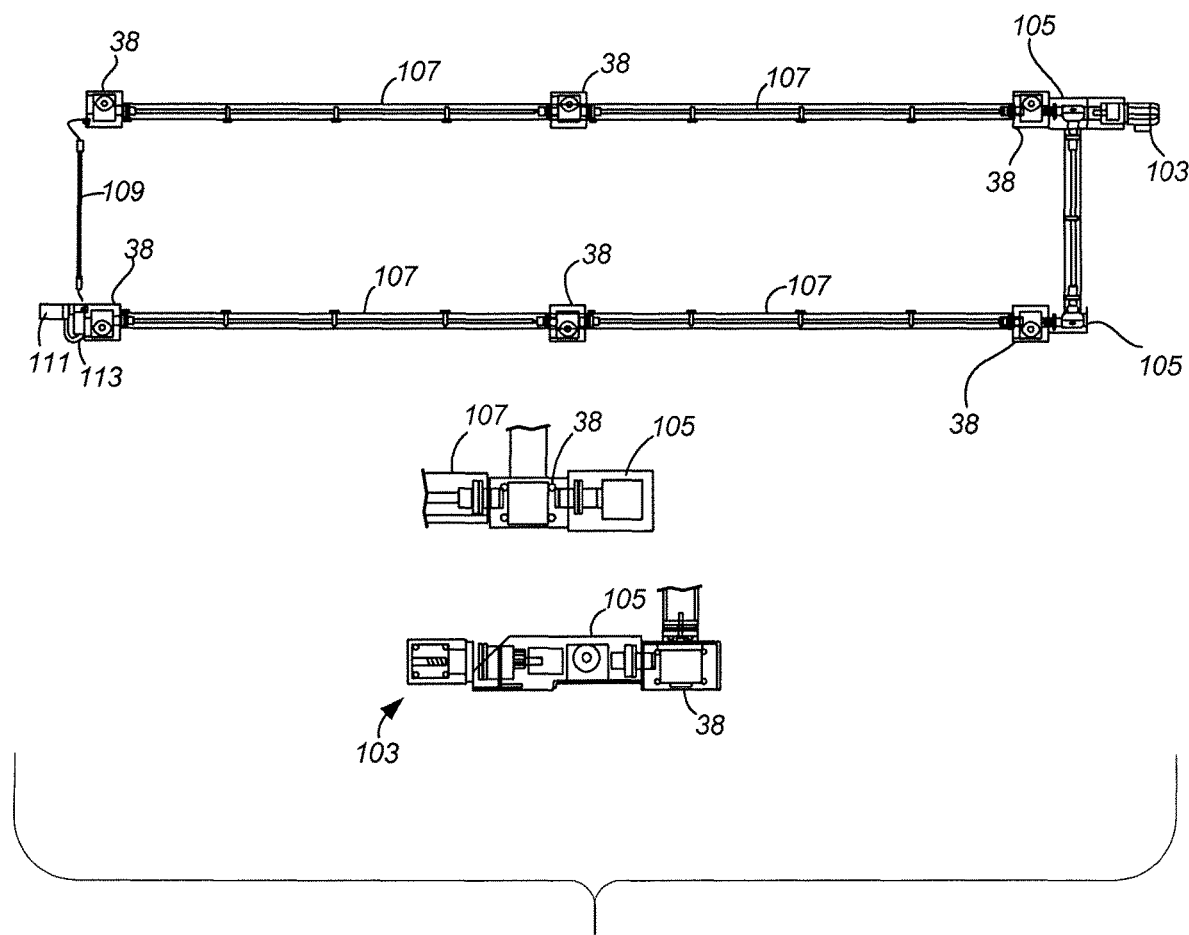
FIG. 26*b* is a view of the lift mechanism.

FIGS. 26A, 26B, and 26C show in detail the telescoping features of a screw jack 38 that raises and lowers the hood 20. The screw jacks 38 include a stationary outer arm 95, and a movable inner arm 96. The inner arm 96 is driven up and down by the action of a worm gear 100 acting on an internal lifting screw 98 (threads not shown). The threads of the lifting screw 98 engage with threads on the inside of the inner arm 96. Because the lifting screw 98 turns but does not move vertically, the inner arm 96 moves up or down depending on the direction of rotation of the lifting screw 98. Grease lines 97 are located inside the inner arm 96, to provide a means to lubricate the screw jack 38. Lubricant is introduced through ports 99 at the top of the screw jack 38. A collar 102 attaches to the bracket 40, which is in turn secured to the hood 20. In this manner, movement of the screw jack 38 operates to drive the hood 20 between the open and closed position. A bracket 104 is used to secure the housing 94.

A housing block 101 contains a worm gear 100 located within the housing block 101 that rotates the lifting screw 98. FIGS. 26B and 26C show the components that operatively link together the screw jack 38. In particular, at the base of the dryer 10, lies a drive motor 103 that provides power to the components the move the screw jack 38. The drive motor 103 is operatively connected to two drive gears 105, and a series of drive shafts that interconnect to the plurality of screw jacks 38. On the side opposite of the drive motor 103 (as seen in FIG. 26B), electrical connections between the left most screw jacks 38 travel through conduit 109. A power supply 111 connects to a limit switch 113 to monitor the position of the components that move the screw jacks 38 up and down.

FIG. 26C shows in operation that housing 115 covers and protects the components described above.

Figure 27:
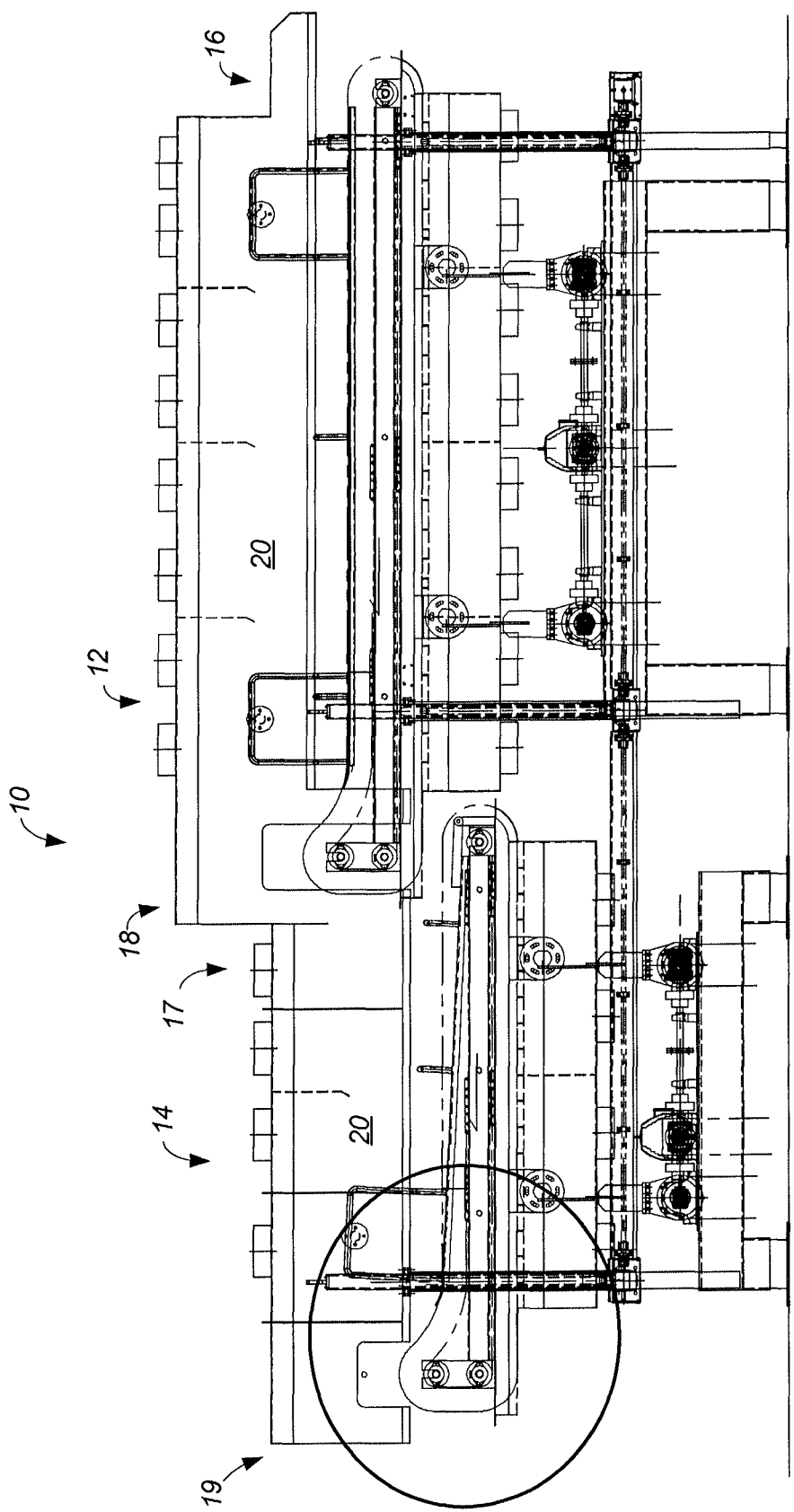
FIG. 27 is a side view of the dryer.
Figure 28:
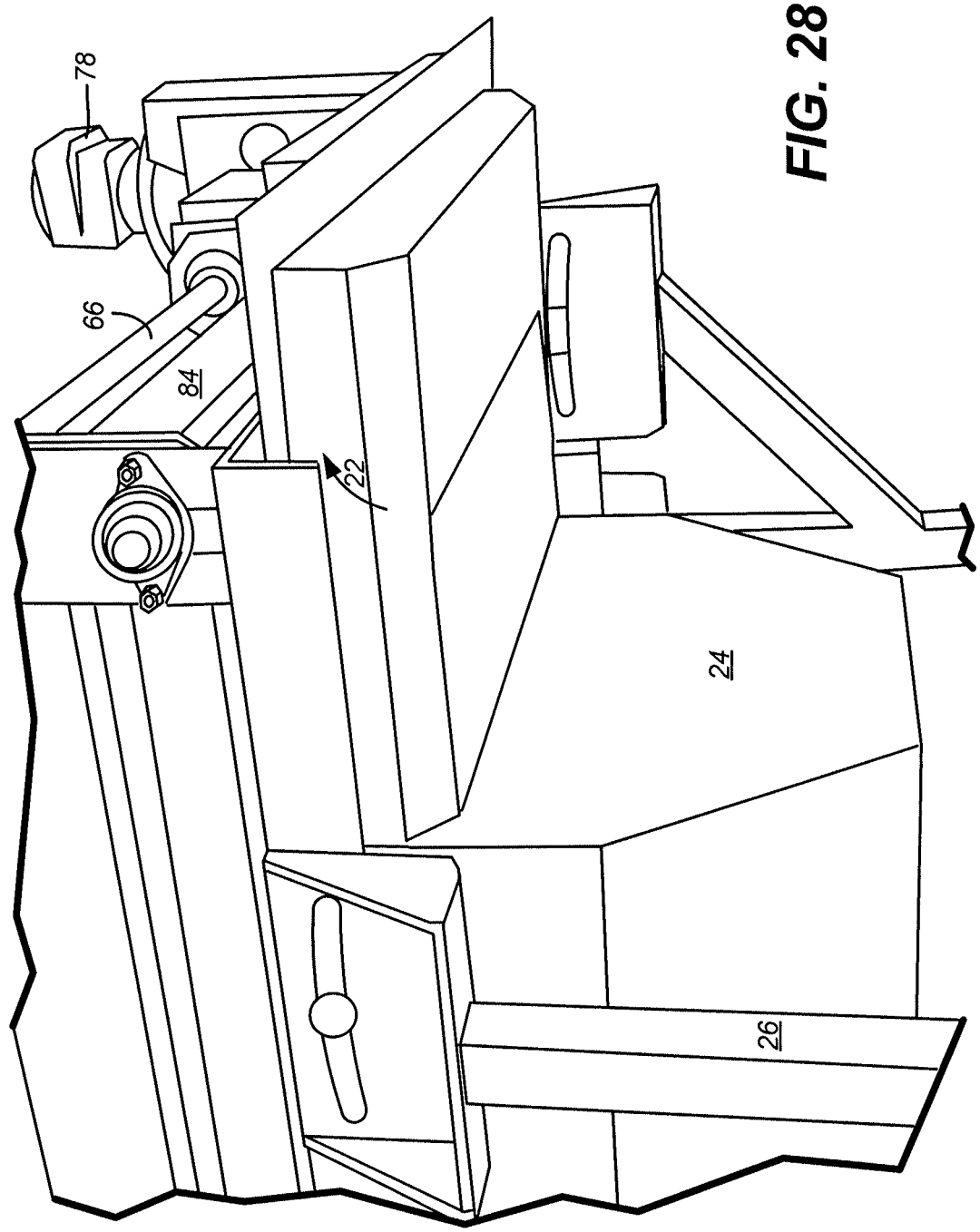
FIG. 28 is a view of the end of the dryer.

The following set of Figures show various views of the dryer 10 by first identifying a general area in a Figure showing the entire device, and then providing a close up view of the highlighted/circled area. In particular, FIG. 27 highlights the output end 19 of the Stage B dryer 14. FIG. 28 shows the same view, but from the other side as the side shown in FIG. 27. In this view, the pan 24 is visible as well as the interface between the bed 22 and the pan 24 located below. The pan 24 includes the perforated bottom 80 (which lies above and inside the pan 24), thereby allowing the vibrational components to move the pan 24 and bottom 80, without moving the drag conveyor 58 (FIG. 33) and its associated components.

Figure 29:
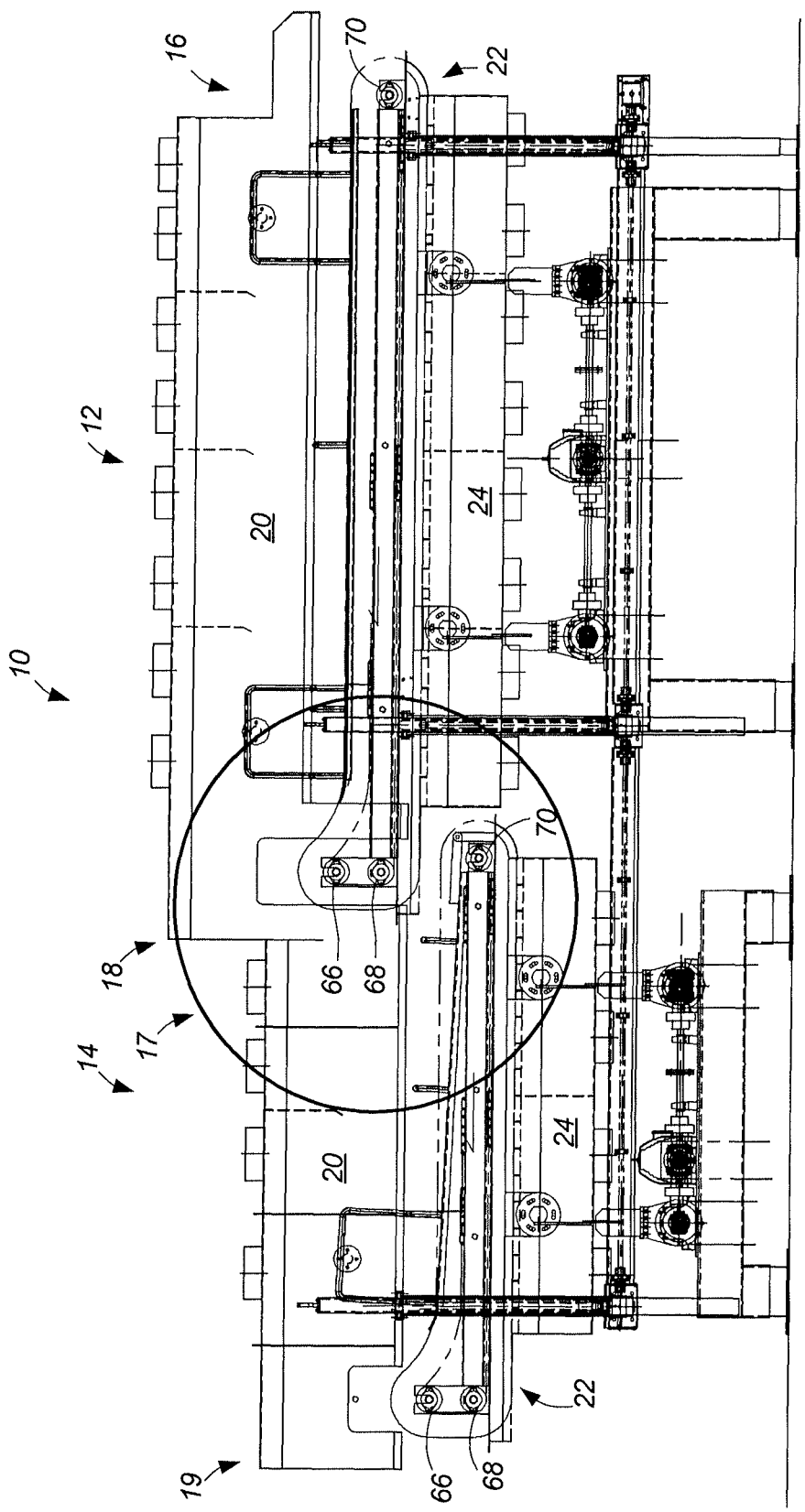
FIG. 29 is a side view of the dryer.
Figure 30:
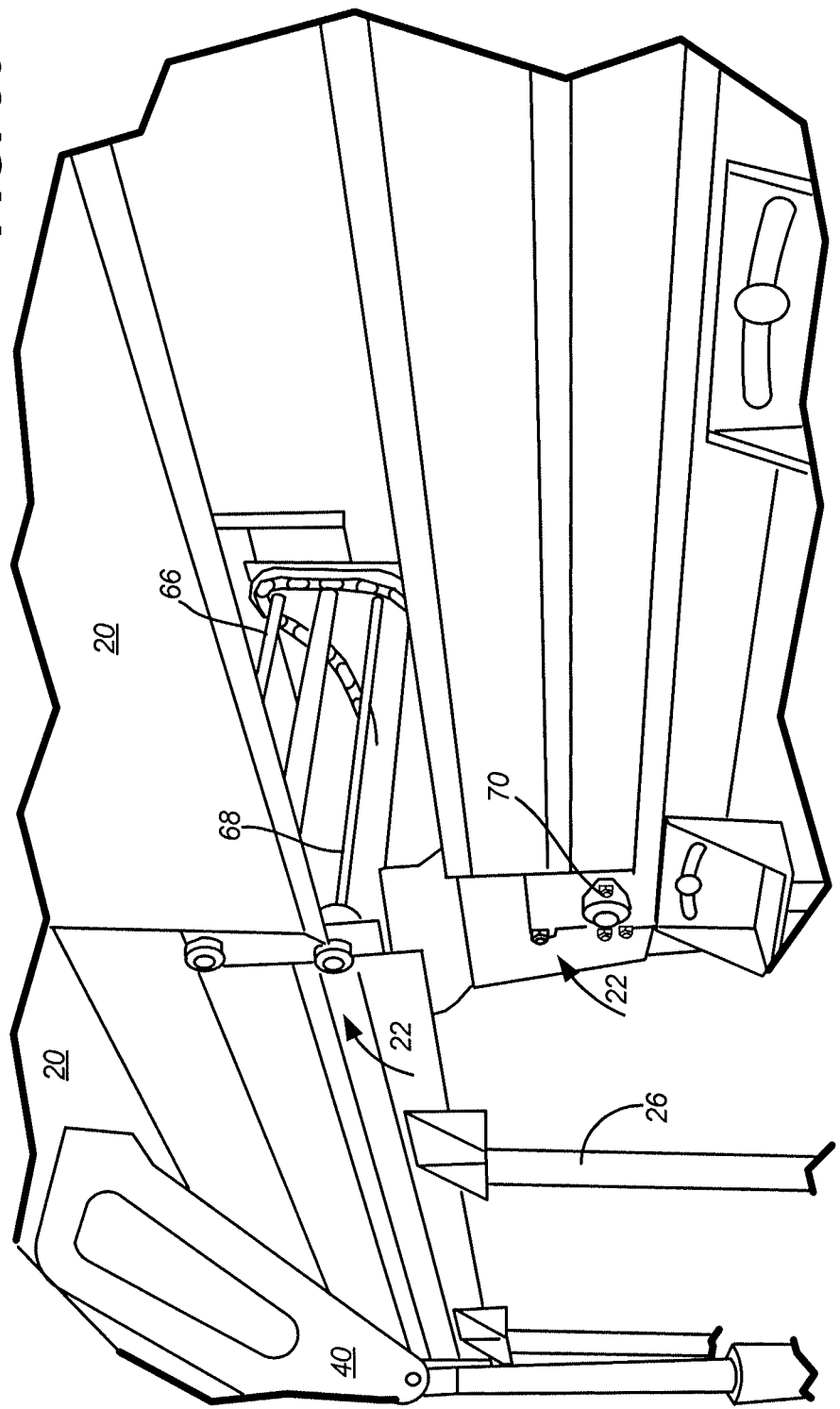
FIG. 30 is a view of the side of the dryer.

FIGS. 29 and 30 shows the interface between the Stage A 12 and Stage B 14 dryers (again FIG. 30 is oriented on the side opposite from the side shown in FIG. 29). As can be seen the Stage A dryer 12 is located above the Stage B dryer 14, wherein product drops from the Stage A dryer 12 to Stage B dryer 14 as the product reaches the end of the conveyor 58 on the Stage A dryer 12.

Figure 31:
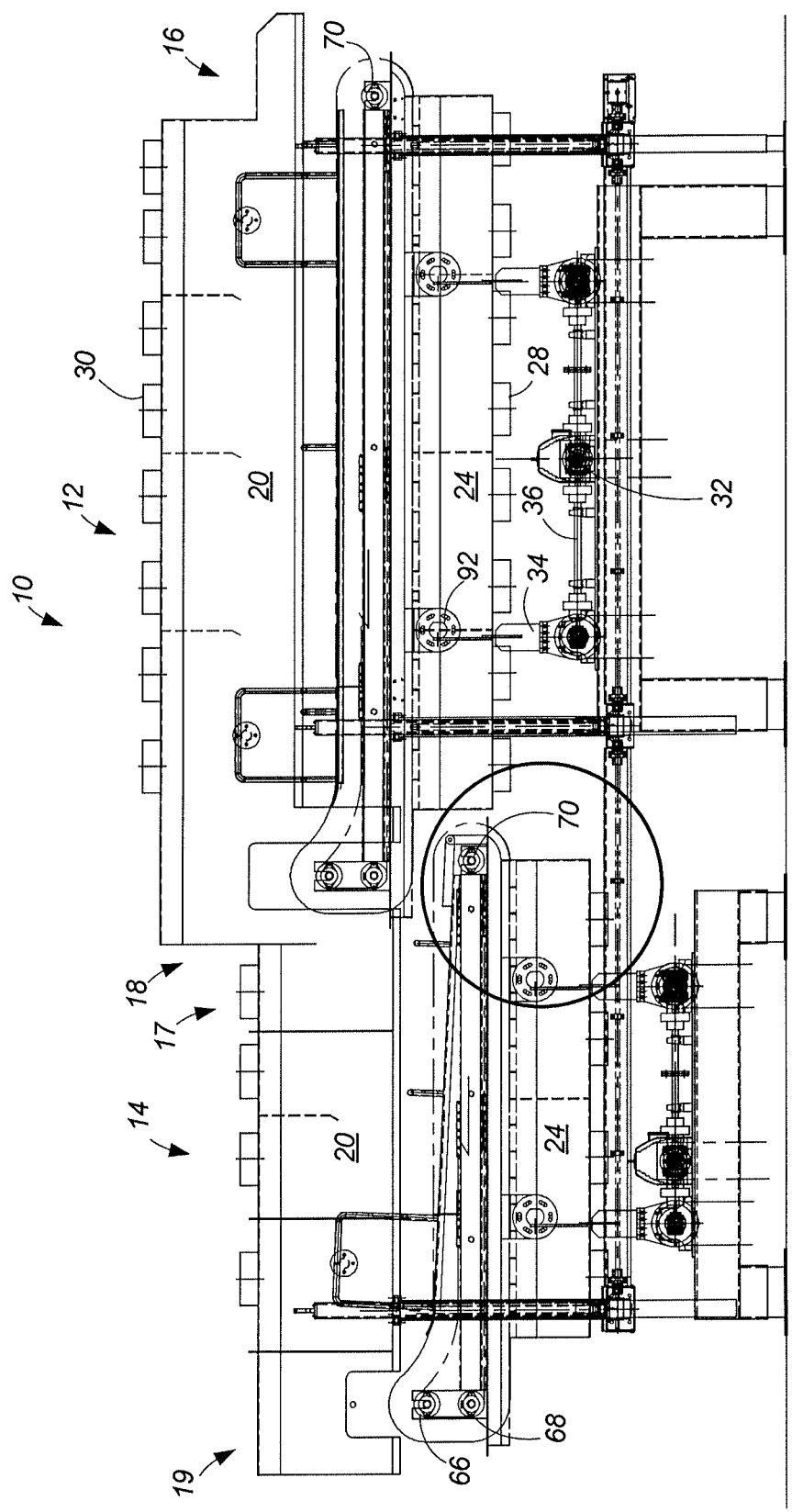
FIG. 31 is a side view of the dryer.
Figure 32:
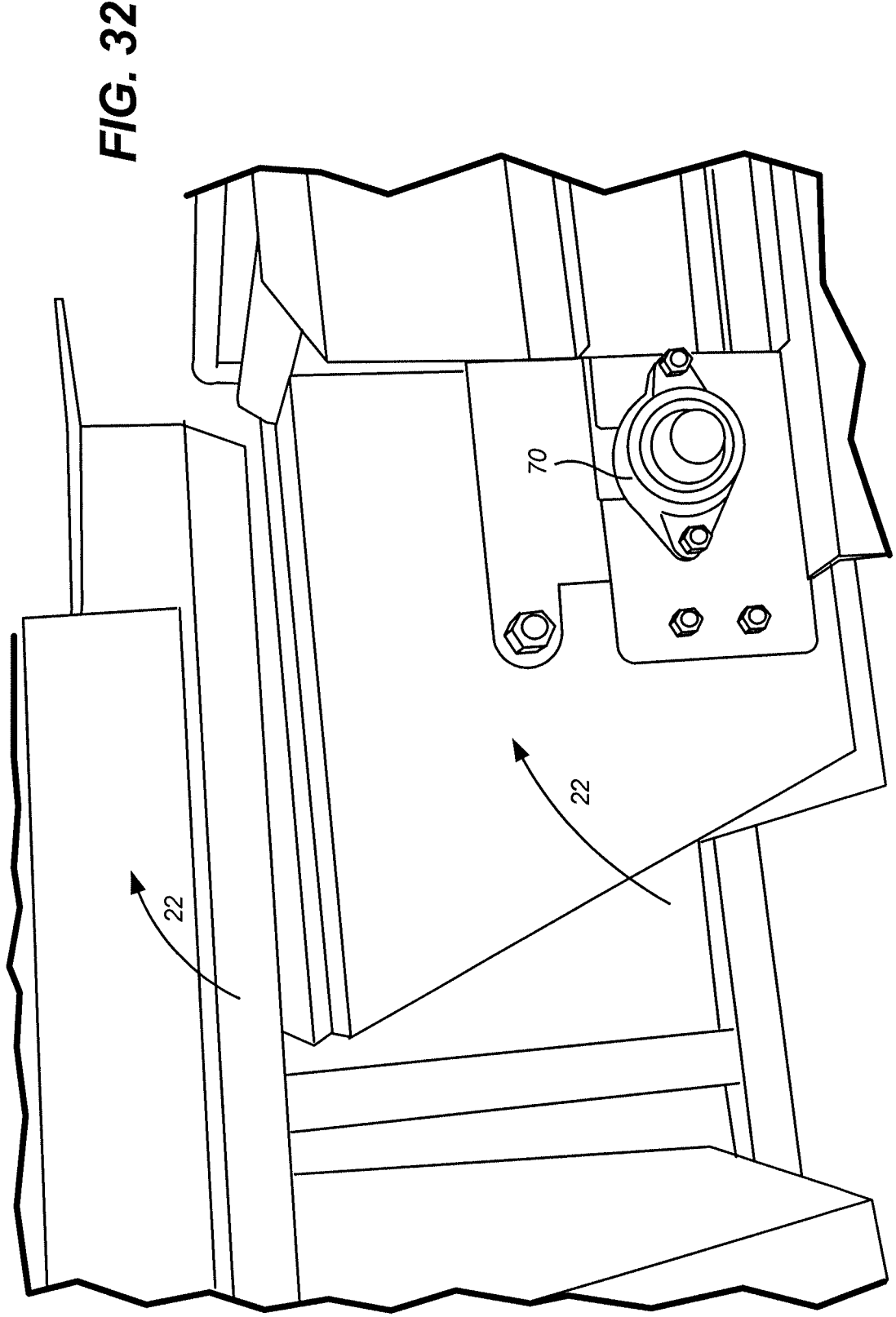
FIG. 32 is a view of the side of the dryer.

FIGS. 31 and 32 show a close up view of the intersection of the beds 22 of the Stage A and B dryers 12, 14 (FIG. 32 is from the opposite side from that shown in FIG. 31). The single shaft 70 of the drag conveyor 58 is shown.

Figure 33:
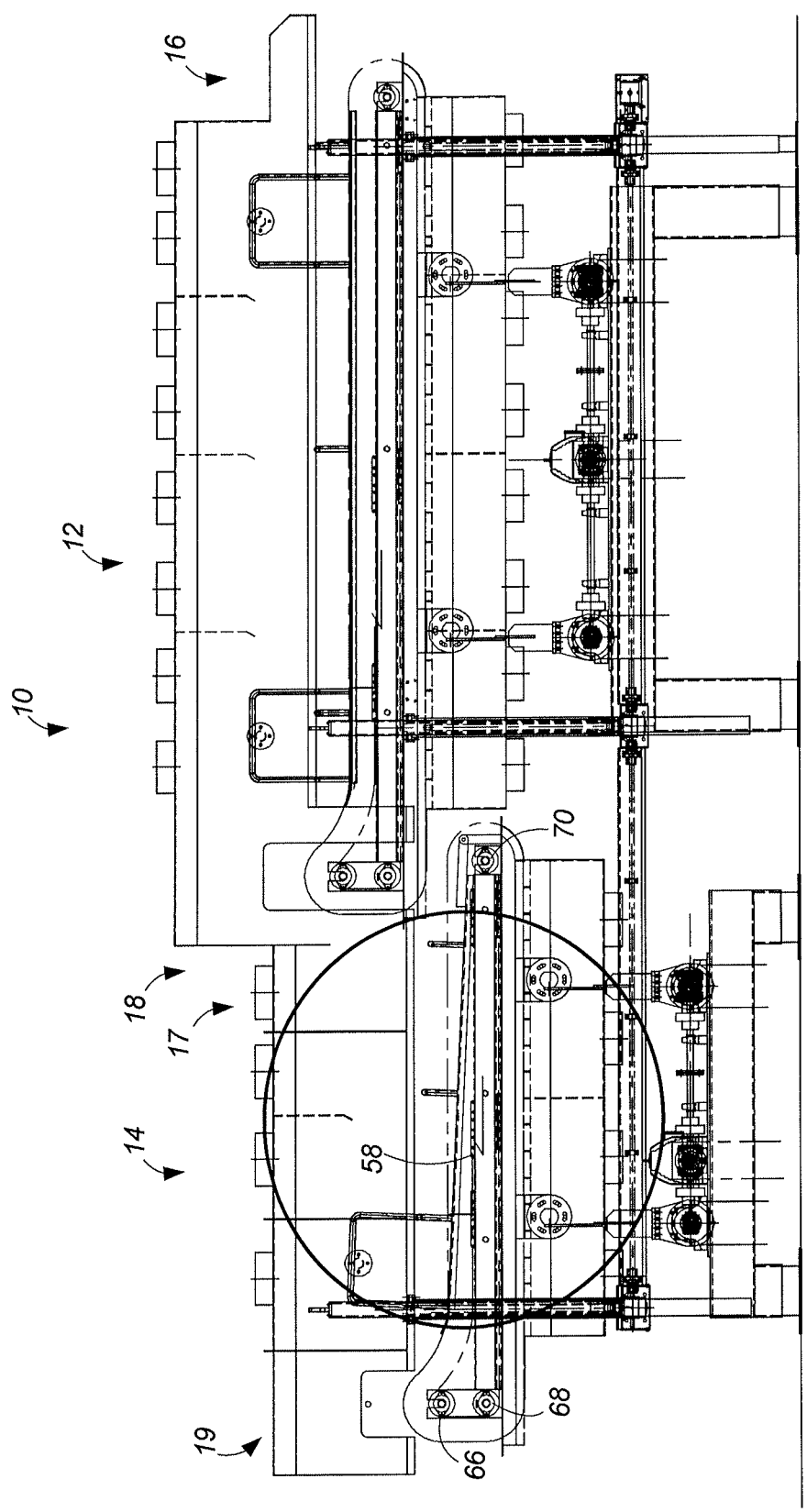
FIG. 33 is a side view of the dryer.
Figure 34:
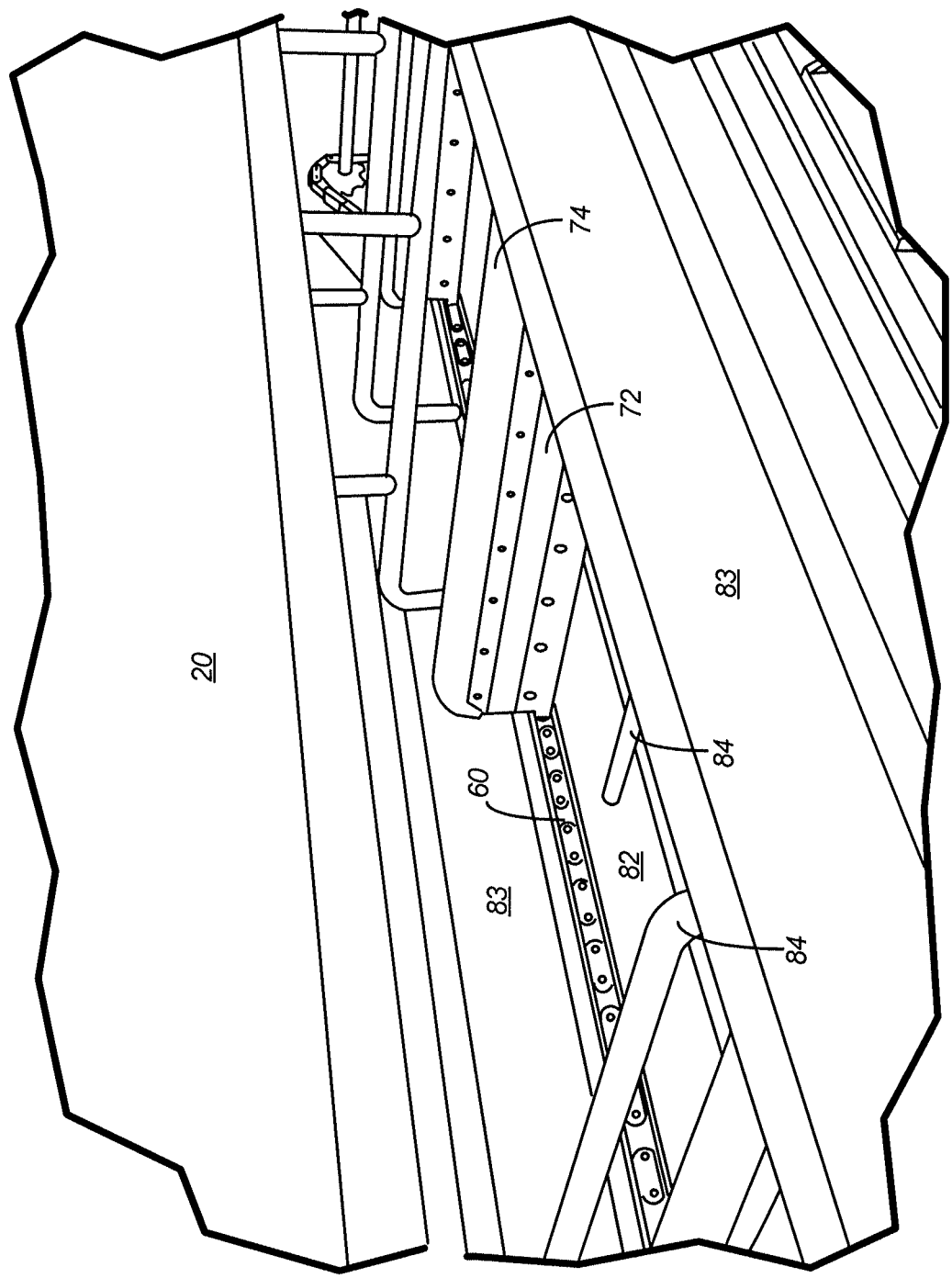
FIG. 34 is a view of the interior of the dryer.

FIGS. 33 and 34 show the inside of the bed 22 of the Stage B dryer 14, which includes a view of the paddles 74 traveling along the upper chain track 60. The support members 84 located inside the bed 22 are also shown.

Figure 35:
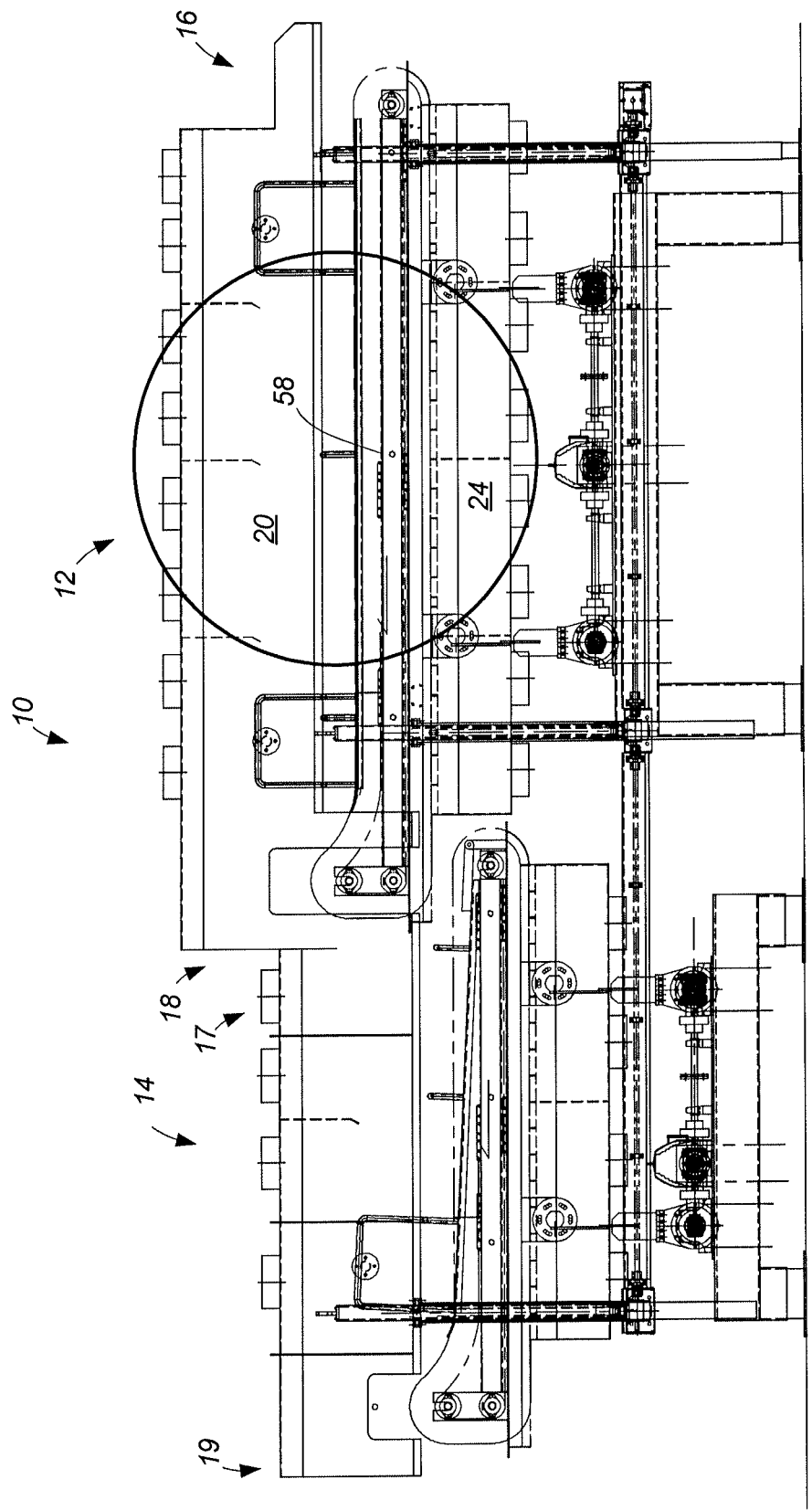
FIG. 35 is a side view of the dryer.
Figure 36:
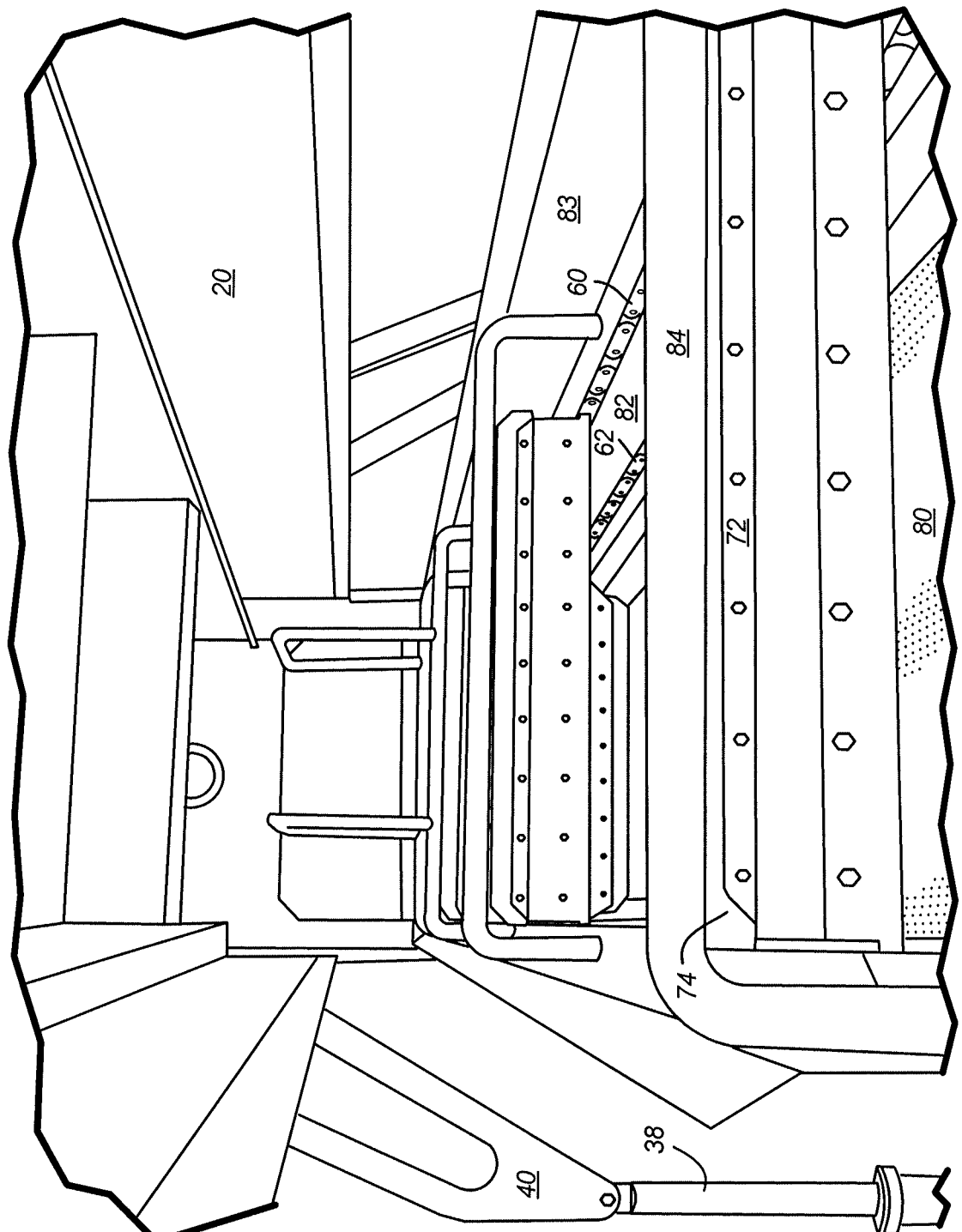
FIG. 36 is an end view of the interior of the dryer.

FIGS. 35 and 36 show the inside of the bed 22 of the Stage A dryer 12 (FIG. 35 a side view and FIG. 36 an end view of the same portion). Support members 84 are spaced apart along the bed 22, and above the paddles 74, which are traveling along the upper chain track 60. The perforated bottom 80 can also be seen below the paddles 74.

Figure 37:
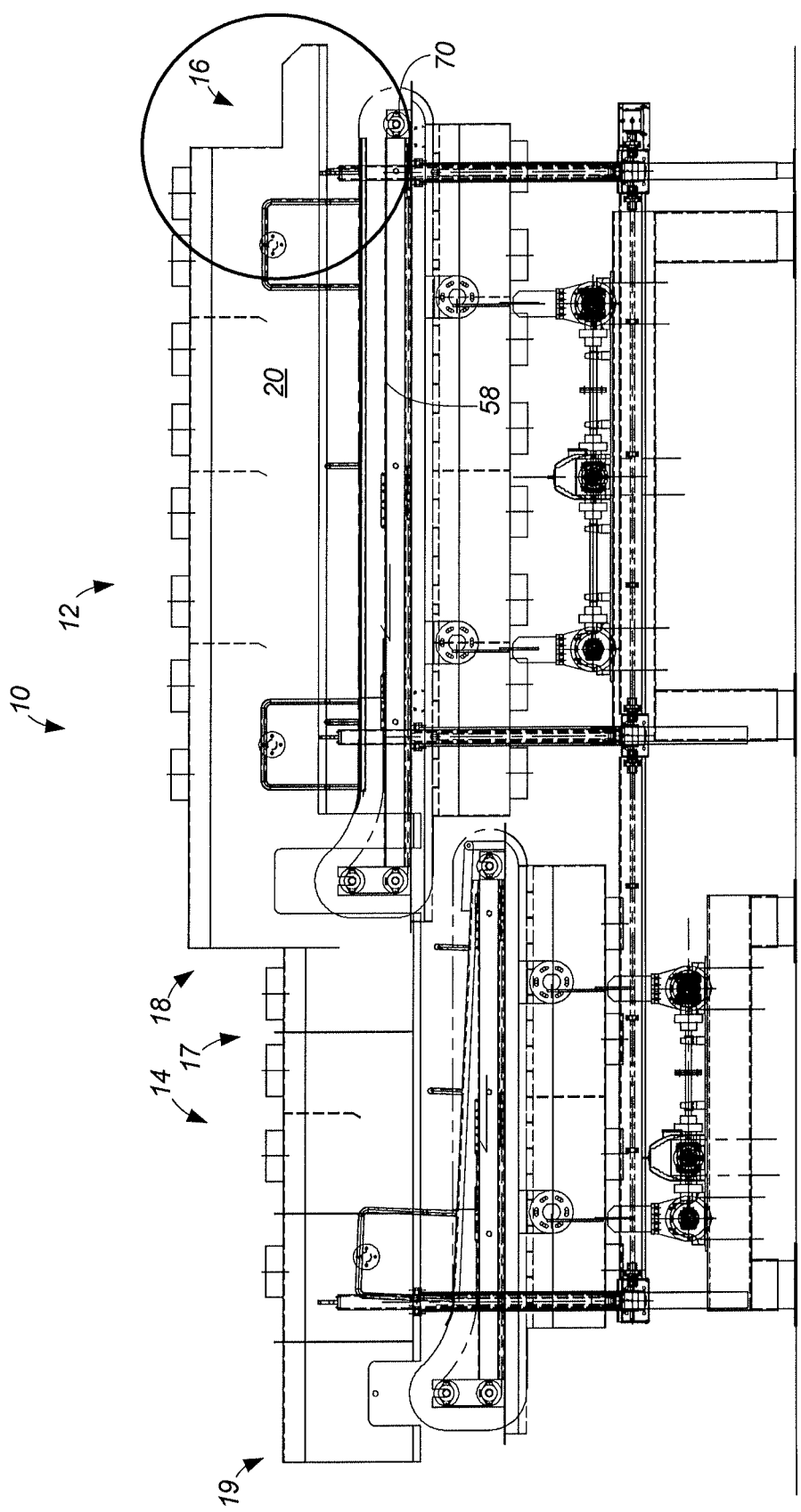
FIG. 37 is a side view of the dryer.
Figure 38:
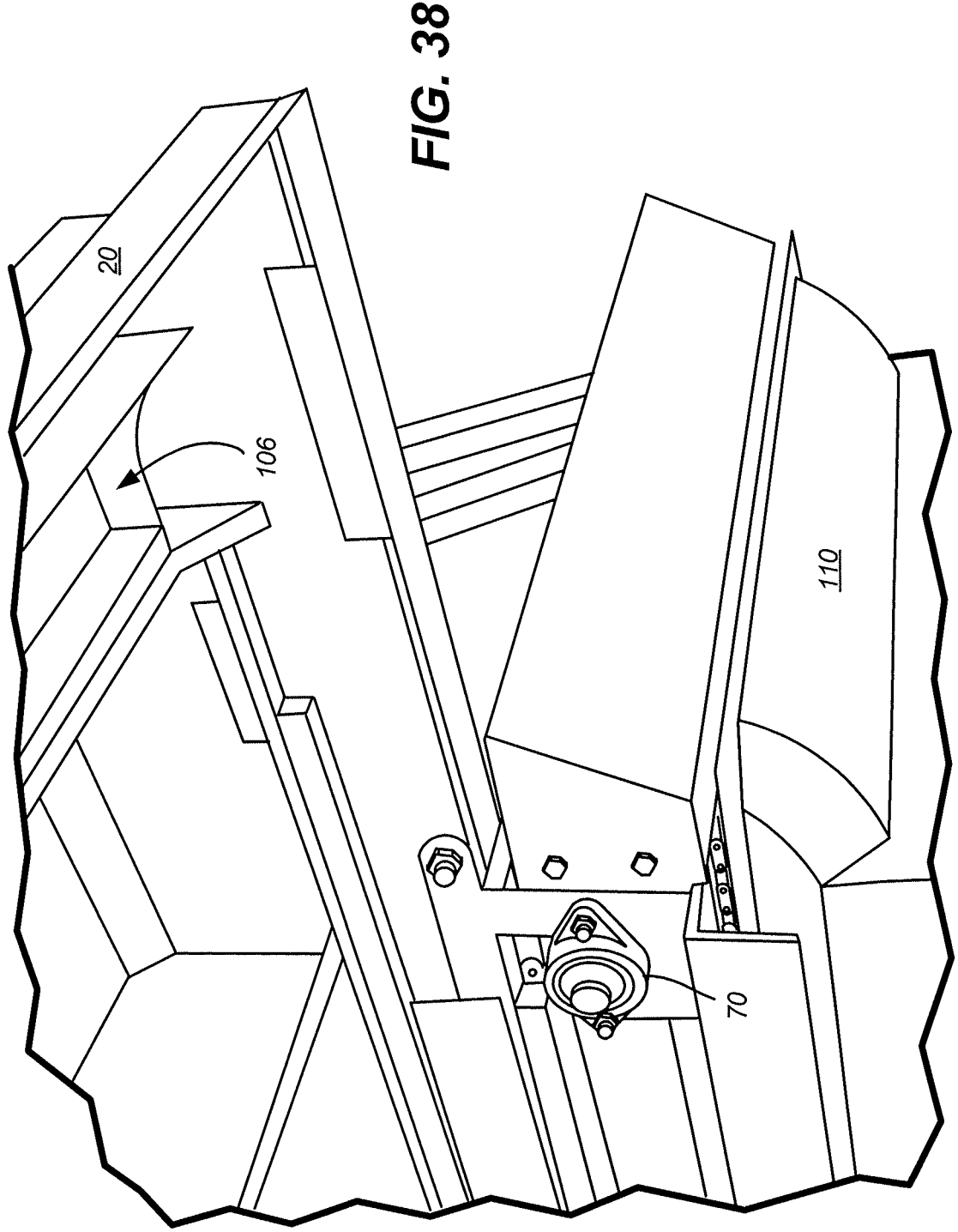
FIG. 38 is a view of the end of the dryer.

FIGS. 37 and 38 show the input end 16 of the Stage A dryer 12. An input chute 106 is located at the top end of the hood 20. Product is introduced through the feed port 106 above. The product then falls down onto the perforated bottom 80 for contact with the paddles 74 of the drag conveyor 58 and movement therethrough. The single shaft 70 at the input end 16 of the Stage A dryer 12 is also shown.

Figure 39:
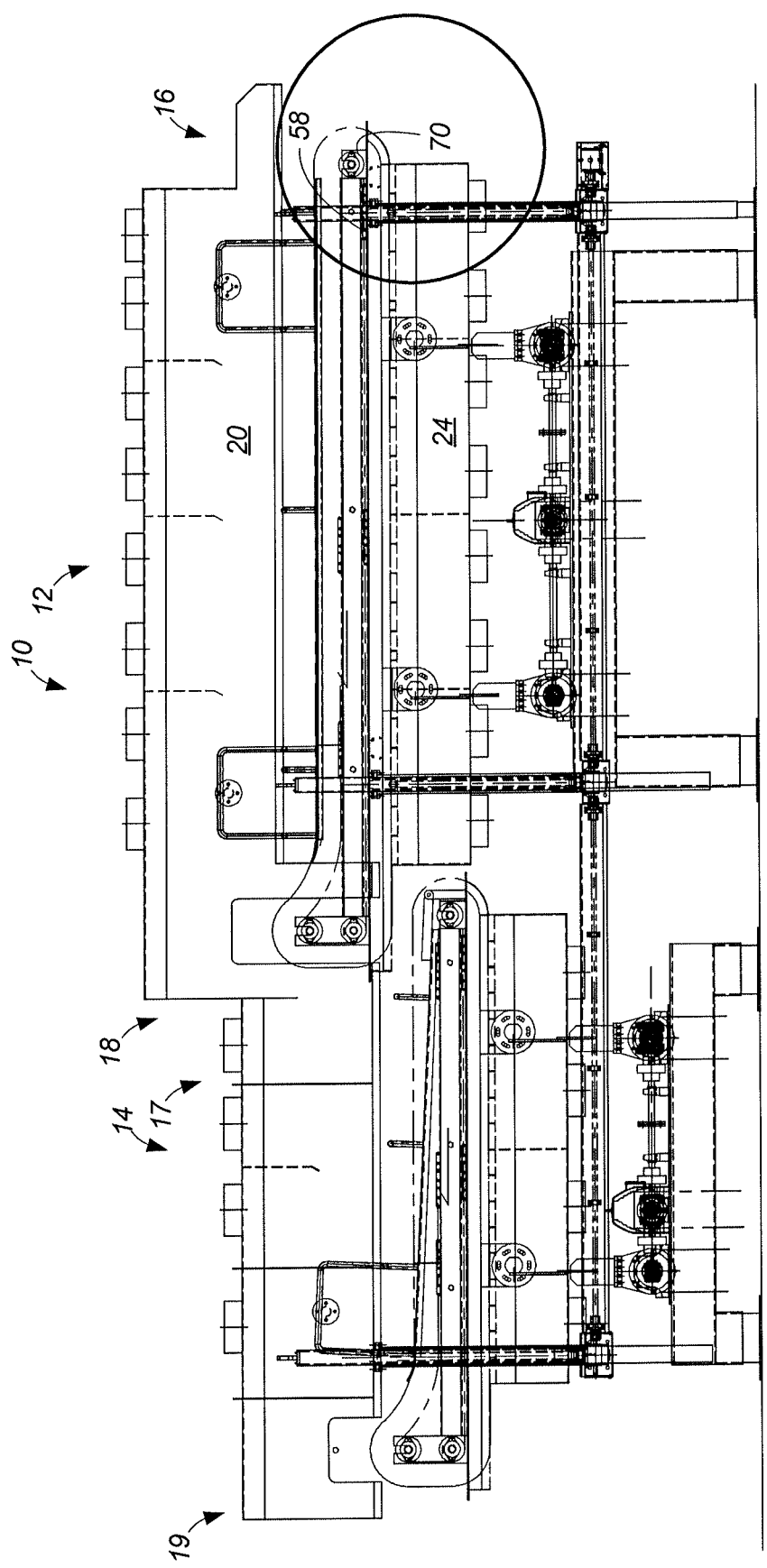
FIG. 39 is a side view of the dryer.
Figure 40:
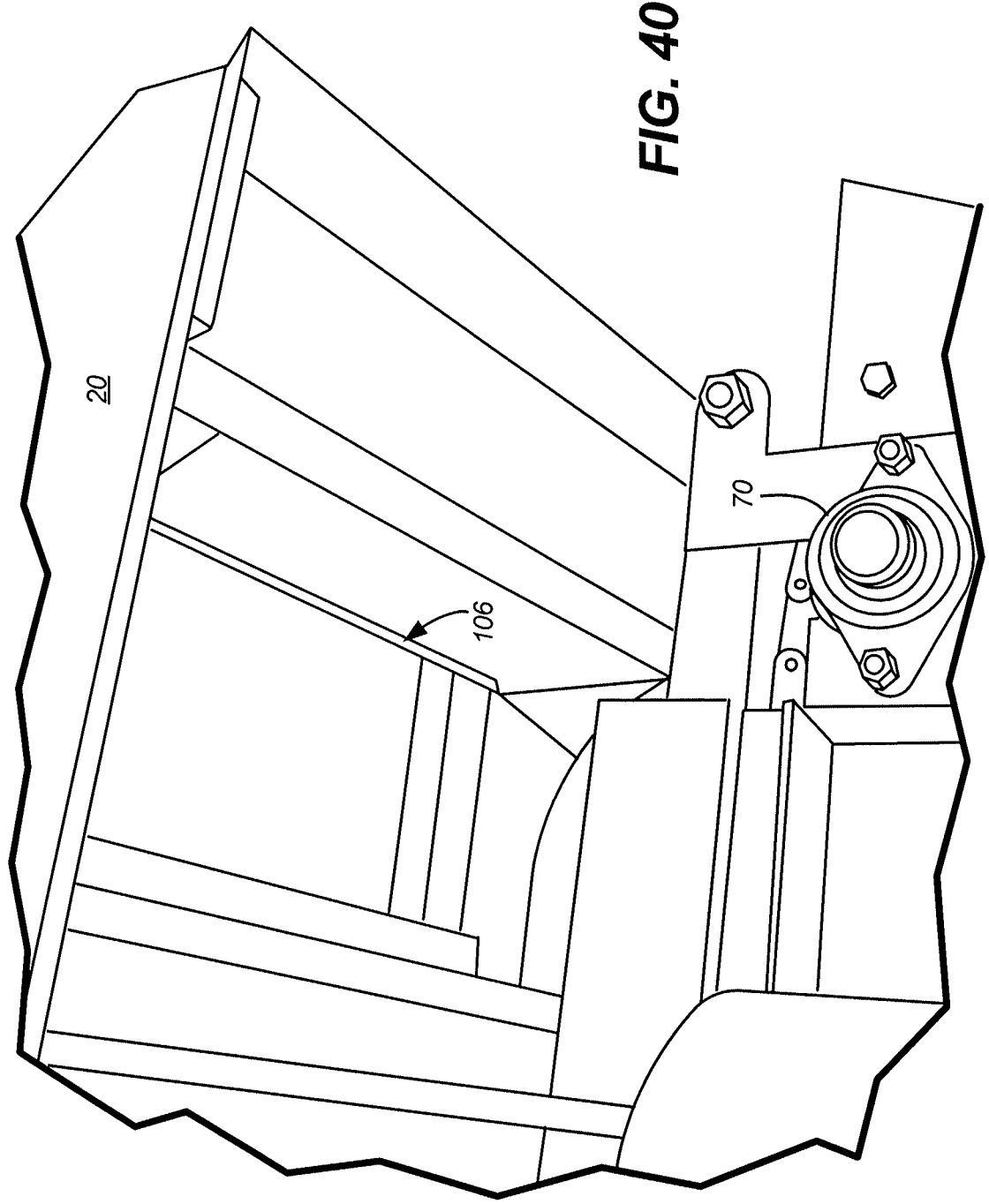
FIG. 40 is a view of the end of the dryer.

FIGS. 39 and 40 show a view similar to that shown in FIGS. 37 and 38. The feed port 106 is more clearly shown from below.

Figure 41:
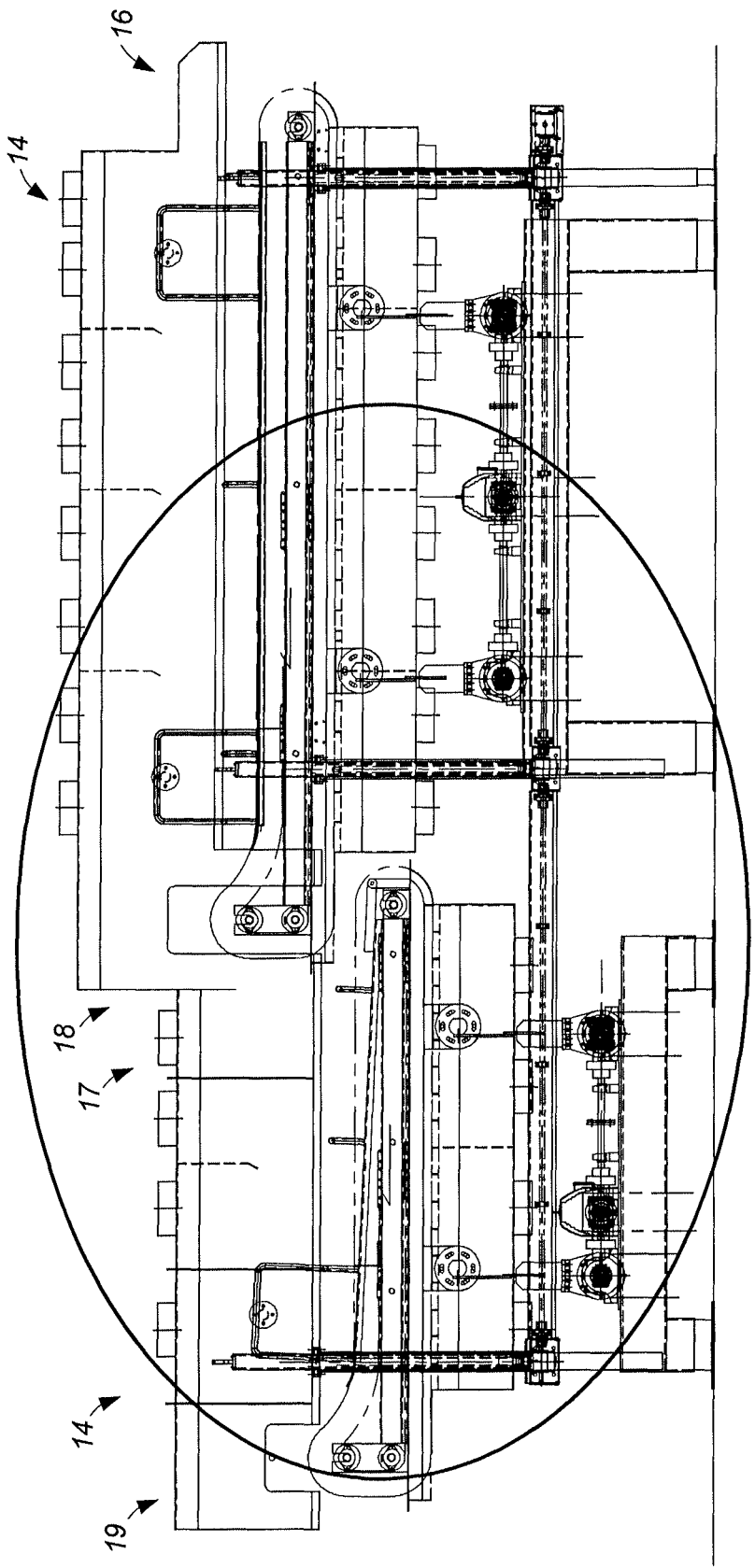
FIG. 41 is a side view of the dryer.
Figure 42:
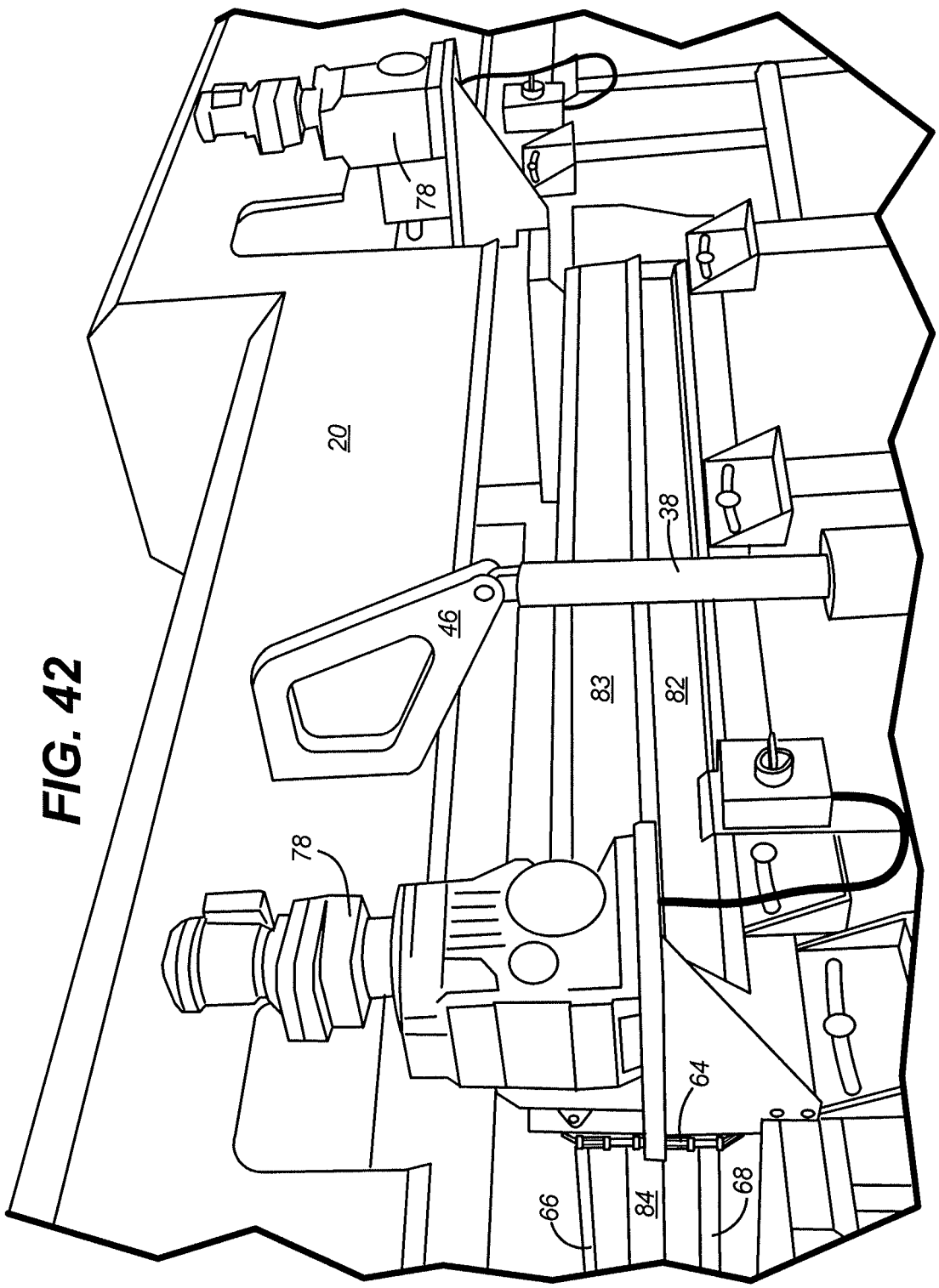
FIG. 42 is a side view of the dryer.

FIGS. 41 and 42 show a side view of the Stage B dryer 14. The drive motor 78 is shown, which connects to the upper shaft 66, and provides power to the chain tracks 60, 62 which move the paddles 74. Also, shown are the telescoping arms and connecting brackets 40 that raise and lower the hood 20.

Figure 43:
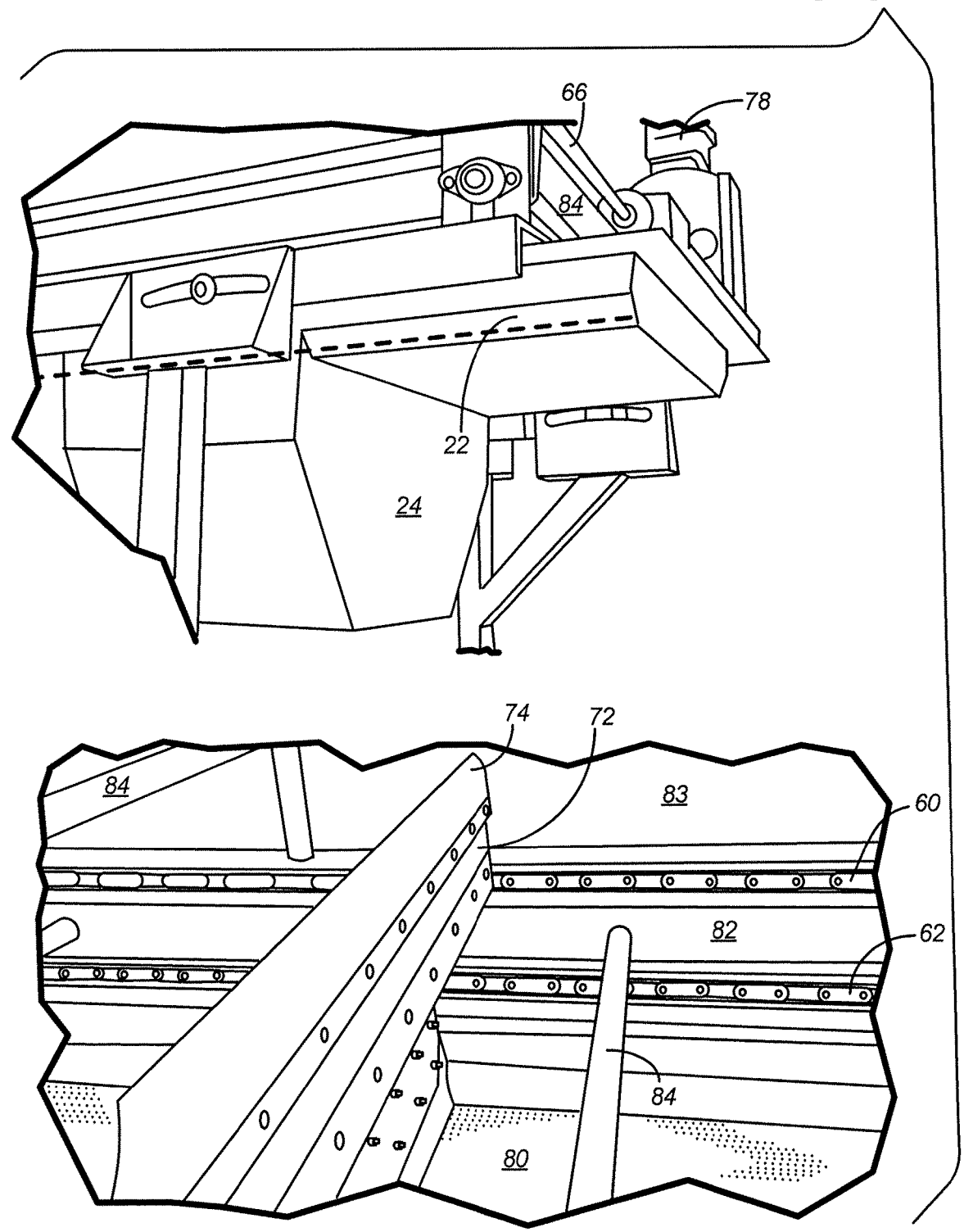
FIG. 43 is a view of the end of the dryer and of the interior of the dryer.

FIG. 43 includes two views that show the location of the perforated bottom 80, which lies above and inside the bottom of the bed 22. As noted, the vibrational elements move the pan 24 along with bed 22, which includes the perforated bottom 80, but the elements above the perforated bottom 80 (such as the conveyor 58) do not move in response to the vibrational elements.

Figure 44:
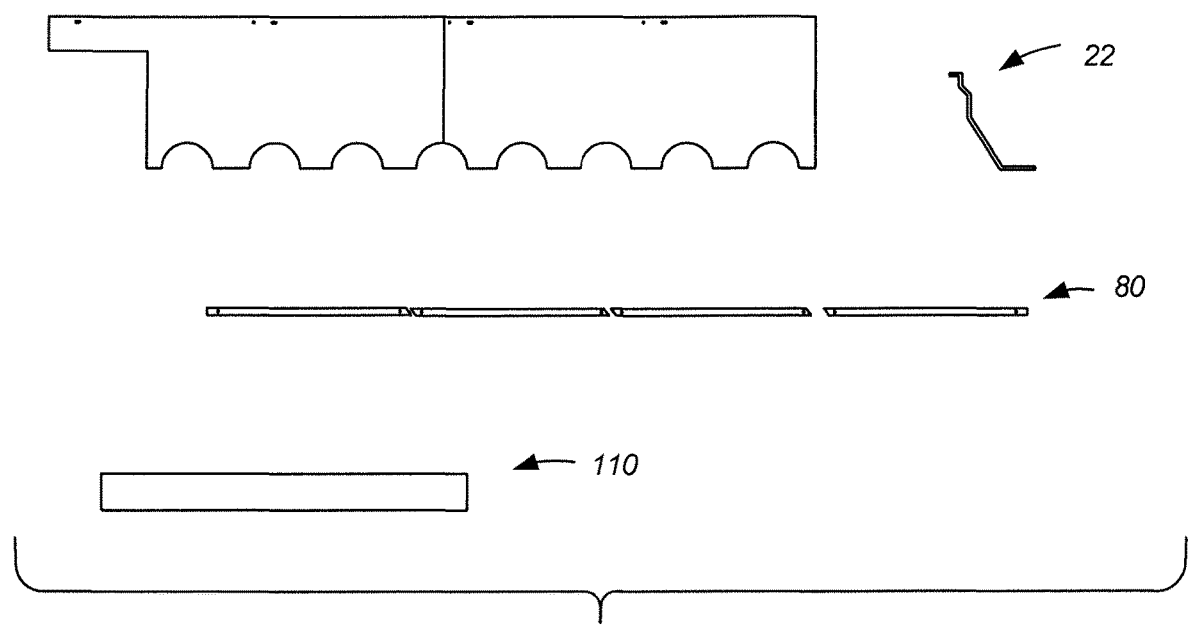
FIG. 44 is an unfolded view of side panels of the dryer.

FIG. 44 shows views of portions of the Stage A dryer 12. The top Figure shows an unfolded view of the bed 22, which is comprised of sheet metal that is folded along the lines shown in the Figure. A cross-sectional view is shown at the right of the top Figure. The bed 22 is comprised of two sides that are mated together to form the complete bed 22. The middle Figure shows a side view of the perforated bottom 80 of the Stage A dryer 12 (in particular how the bottom 80 is comprised of aligned panel segments). The bottom Figure shows the curved bottom 110, which can also be seen in FIG. 38.

Figure 45:
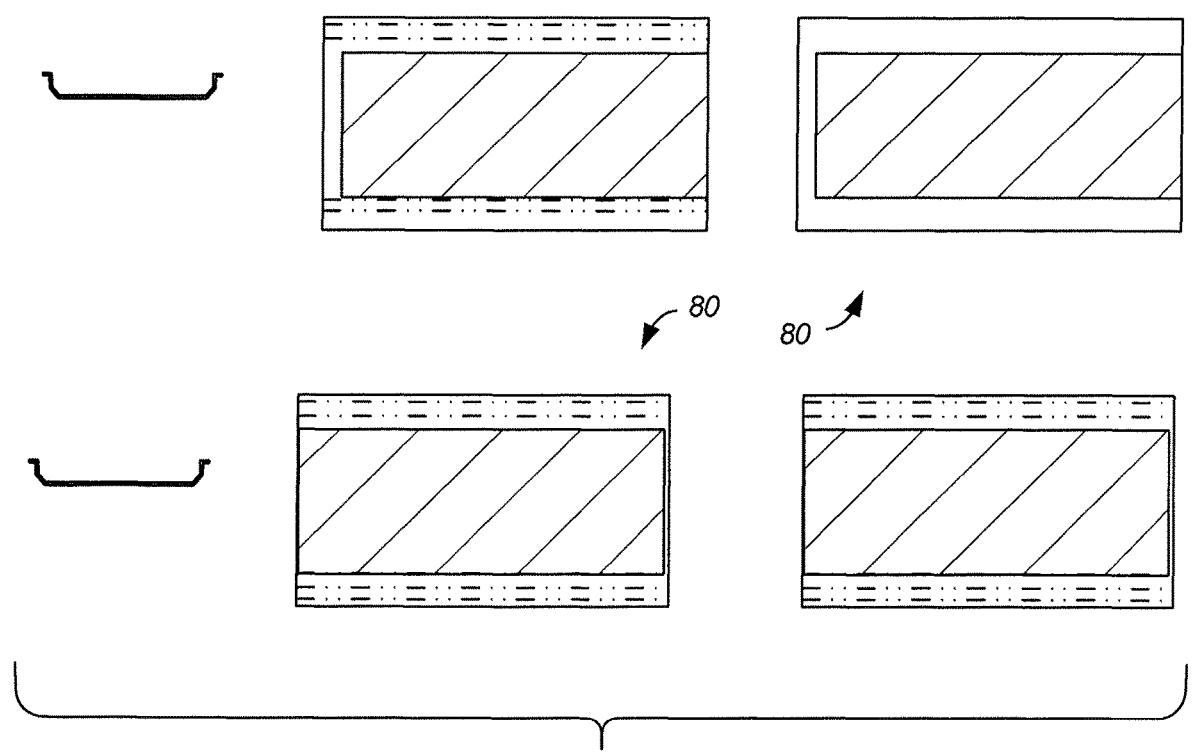
FIG. 45 is a view of the conveyor bottom.

FIG. 45 shows the perforated bottom 80 from the side and top views. The Figure on the left shows a side view of the bottom 80. The Figure in the middle shows the bottom 80 prior to being folded into its completed shape. The Figure on the right shows the perforated area (the folded sides of the bottom 80 are not perforated). The top and bottom Figures show different panels segments that join together to form bottom 80, and which are of differing lengths.

Figure 46:
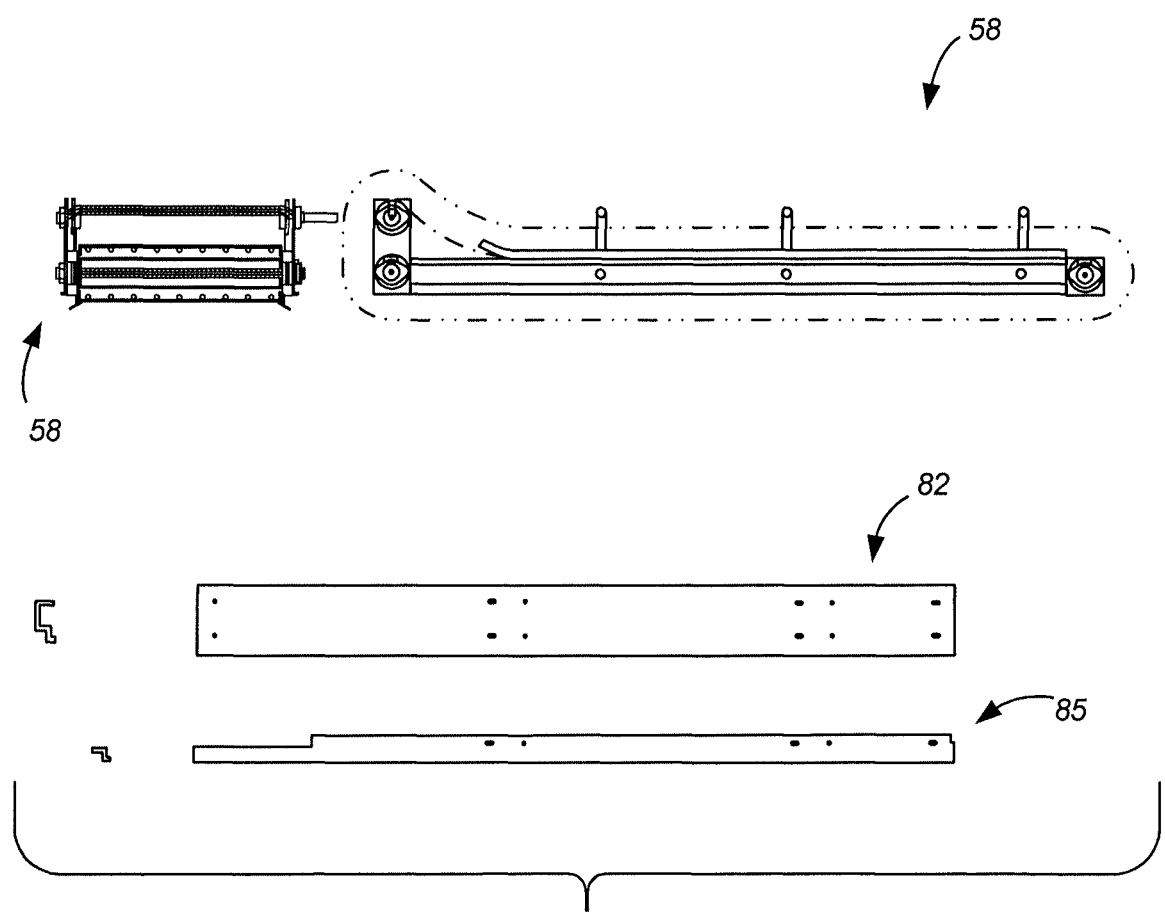
FIG. 46 is an end and side view of the conveyor, and an unfolded view of a side panel.

FIG. 46 shows the conveyor 58 in the upper Figure. The lower portion of FIG. 46 shows the side panels 82, 85 which are proximate to the conveyor 58. The side panel 82 is located between the upper and lower chain tracks 60, 62 and provides structural support to hold the conveyor together. The side panels are also the surface to which the support members 84 are affixed. The lower portion of lower panel of FIG. 46 shows unfolded side views of the side panels 82, and a lower portion of the side panel 85 which extends all the way to the output ends 18/19 of the dryers 12, 14 to accommodate the exit of product from the conveyors 58.

Figure 47:
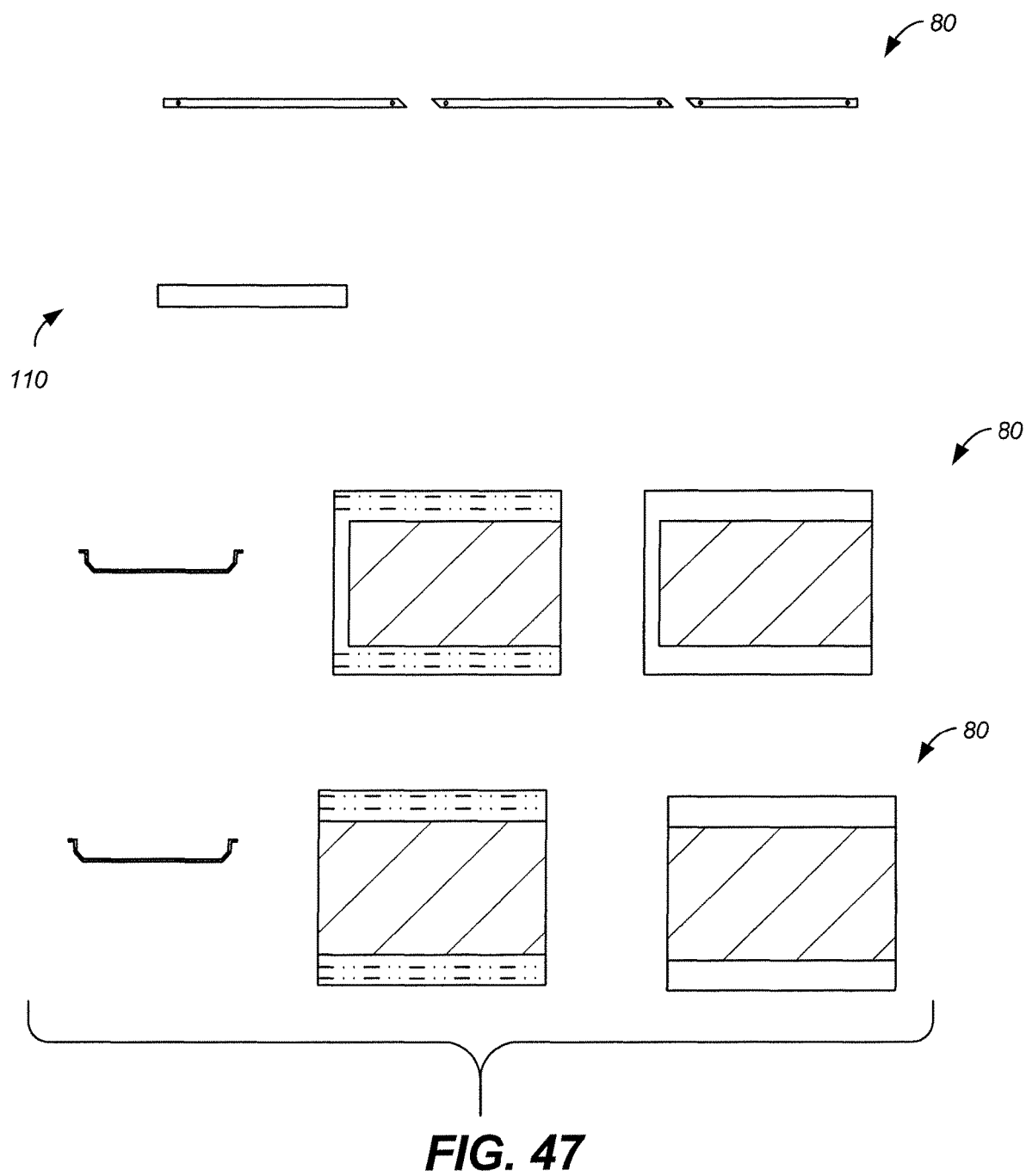
FIG. 47 shows multiple view of components of the dryer.

FIG. 47 shows in the upper panel a side view of the perforated bottom 80 (in particular how the bottom 80 panels align) for the Stage B dryer 14 (essentially the same as Stage A parts shown in FIG. 44). The lower panel of FIG. 47 shows the perforated bottom 80 of the Stage B dryer 14, which is essentially the same as that of the Stage A dryer 12.

Figure 48:
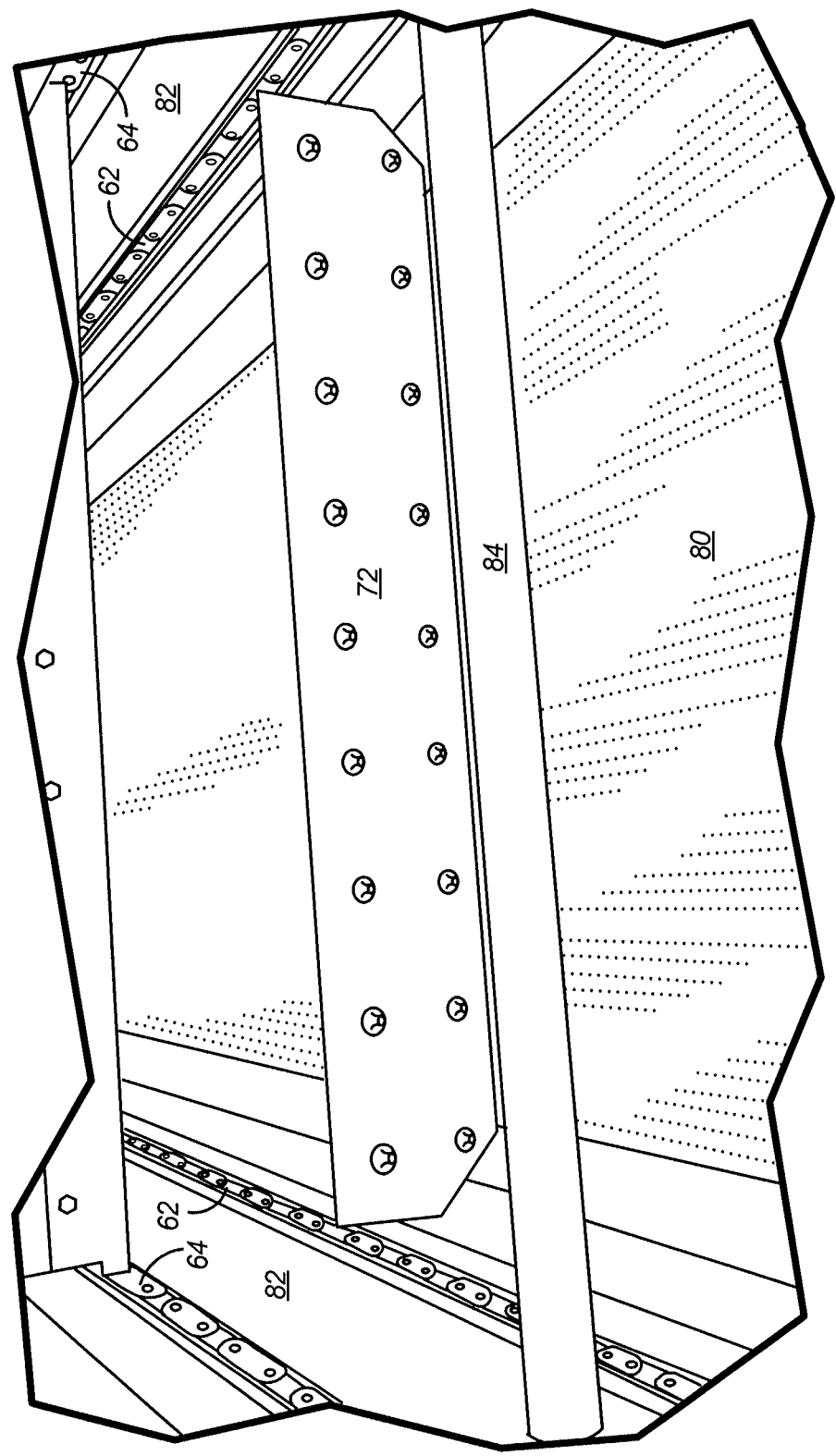
FIG. 48 is an end view of the interior of the dryer.

FIG. 48 shows the Stage B dryer 14 perforated bottom 80.

Figure 49:
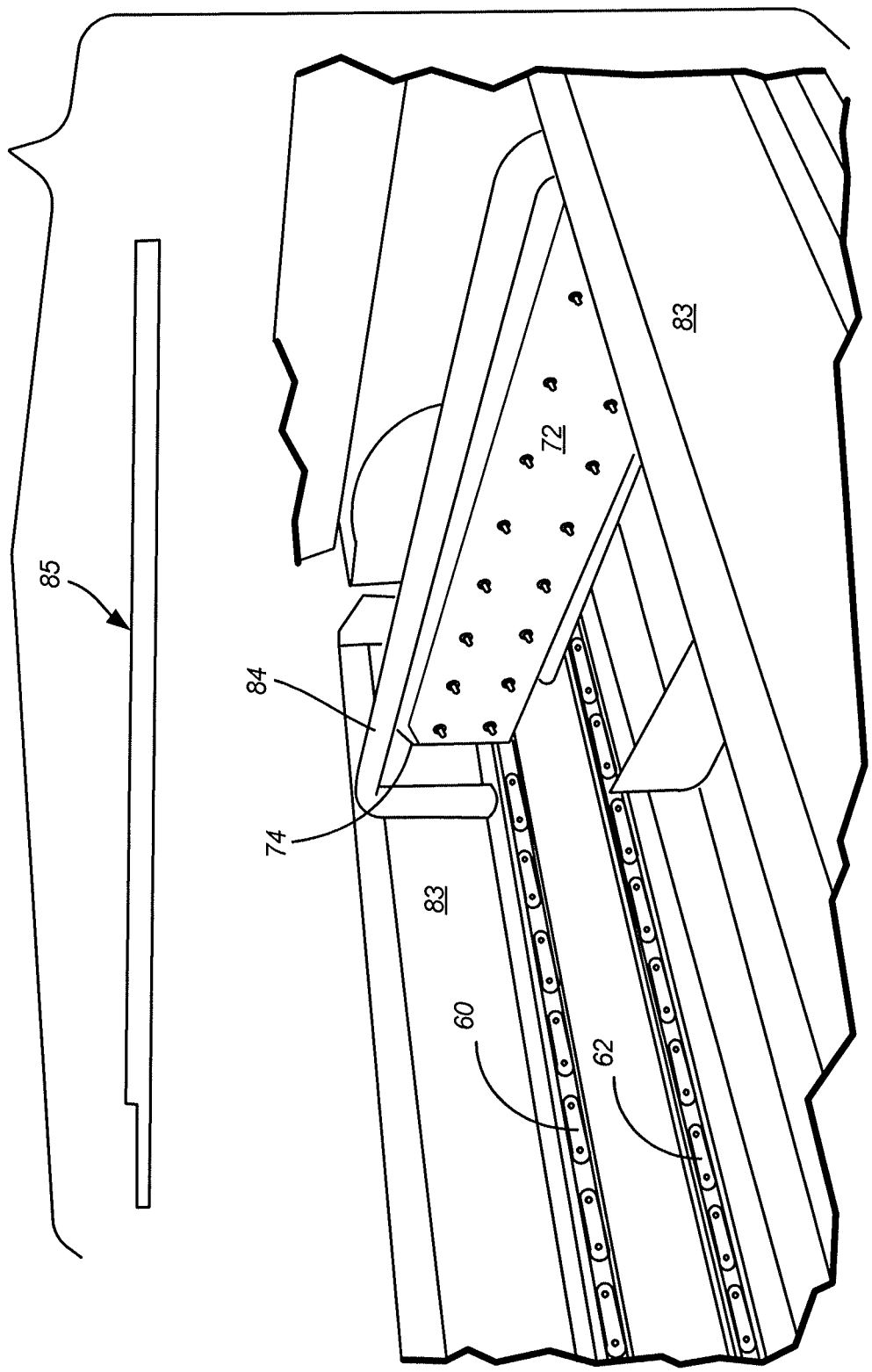
FIG. 49 is a view of the interior of the dryer.

FIG. 49 shows the location of the side panel 83, which lies between the upper and lower chain tracks 60, 62. Also shown are unfolded side views of the side panels 82, and a lower portion of the side panel 85 which extends all the way to the output ends 18/19 of the dryers 12, 14 to accommodate the exit of product from the conveyors 58 (essentially the same as Stage A parts shown in FIG. 46).

Figure 51:
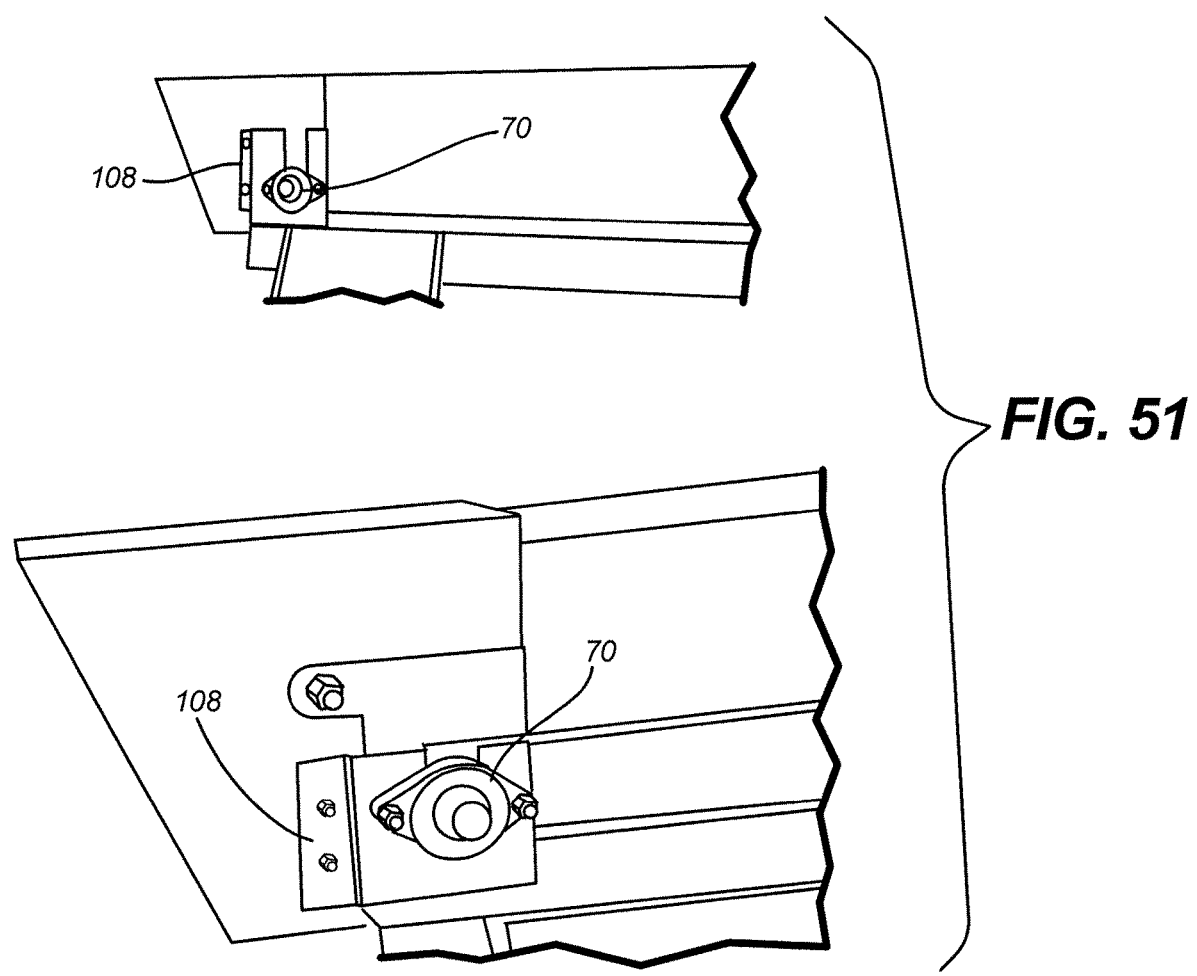
FIG. 51 is a view of the end of the dryer.

FIGS. 50 and 51 shows the location of various support brackets 108, as well as a curved bottom panel 110 that is located at the input ends 16 of the Stage A dryer 12 which helps to channel product onto the conveyor 58.

Now the operation of the dryer will be described in reference to the Figures and description set forth above. The dryer comprises a mechanical apparatus to convey a workpiece or product through a fluidized bed dryer. The product can include food products, minerals such as coal/coal fines, sand, nutraceuticals, medicines, biological waste, municipal and domestic waste, biomass or so-called "green waste," and/or a variety of other industrial, agricultural, or construction materials. In particular, with reference to food products, the dryer can be used in combination with other equipment to process food products such as potatoes used to make snack foods—in which case the dryer would be used with such other equipment as an emulsifier, blancher, enzyme treatment unit and the like. The invention can process other types of foods as well, and can be used to dry foods processed as described above, or simply to dehydrate of dry foods that have not been subsequently processed.

A drag conveyor is employed with evenly spaced conveyor paddles attached to a continuous chain driven by a variable frequency motor drive. The invention is of particular applicability in the case of low-density workpieces where chaotic motion of air may disrupt or reverse the orderly flow of workpieces through the dryer.

A drag conveyor is mounted within the bed of a fluidized bed dryer such that the chain-mounted drag paddles circle continuously, spending half the time in contact with the vibrating bed and the other half of the time in a return cycle over the bed. The apparatus can be mounted on the vibrating bed itself, in which case the paddles along with the chain assembly and related support structures and sprockets move coherently with the bed. Alternatively it can be mounted in a manner that most components of the conveyor are vibrationally isolated from the vibrating bed, in which case the paddles must ride above the bed without touching it at an elevation at least a little bit greater than the vibrational stroke amplitude but close enough that a substantial gap does not form underneath which product can slip under the paddles. In either case it is desirable that the conveyor drive motor be fixed to a non-vibrating support, to extend the life of the motor.

Spacing between the two chains at either side of the conveyor can be maintained and stabilized by the use of cross-bars. In an alternative design, spacing can be maintained by the rigid paddles themselves, thus increasing capacity and simplifying cleaning by eliminating the need for cross-bars.

The optimum spacing between paddles as they proceed through the dryer is an important parameter to optimize based on the nature of the product. If the paddles are too close together then any variance in flow density will be magnified within the cells created between paddles, which can create uneven drying. If the paddles are too far apart then the paddles are ineffective in conveying product. In the preferred embodiment of the invention, for conveyors of 8 feet in length and 1 foot in width, three evenly spaced paddles produced the preferred results (in this manner at least one paddle is engaging the product at any given time).

The design of the invention also has the advantage of effectively drying product that tends to clump together during the drying process. In particular, some products in the dryer tend to separate which promotes efficient drying; however, for wet product types that are inclined to clump together, the present invention however allows clumped product to move more slowly on the conveyor thereby giving the clumps more time to dry and separate and then move forward at a conventional rate.

An additional variable is the capacity of the dryer for the given product. Further, changes to the paddle cell spacing based on differences in the nature of the product can be minimized by manipulating the drying times and temperature, which act as compensating factors.

Paddle height is also an important variable. If the paddles are too short, then product can jump forwards or backwards over a paddle, leading to inconsistent product drying. Conversely, the need for the paddles to be attached to a closed circuit in which half the paddles at any moment are in a return cycle places a functional limit on their maximum height.

In the preferred embodiment of the invention, and as shown in the Figures, the paddles are shaped to match the contour of the perforated bottom and unperforated sides so as to scrape the bottom and sides of the channel there between, thus creating a self-cleaning system.

The paddles can be constructed from various materials, depending on dryer temperature, which includes Teflon, stainless steel, and other materials which are able to sustain the temperature and vibrational stresses. In the one embodiment of the invention, the paddles are made or Polyetheretherketone (PEEK).

In other embodiments the paddles made of stainless steel and are then coated with a substance such as Teflon or ceramic coating to properly interact with the product, and having a ¾-1" Viton scraper on the end touching the dryer bed (to act like a squeegee and to prevent metal on metal as the dryer bed moves), and a backing plate for securing the Viton to the paddle. In yet another embodiment the paddles are made of stainless steel paddle (Teflon or ceramic coated) with a scraper 204 made of PEEK at the bottom, installed on 2 or 3 bolts, or as many as desired, with slots in the paddle mounts 72 that allow the scraper 204 to move up and down with the vibrational stroke of the dryer bed, while the paddle mounts 72 remains fixed.

In operation, product is fed into the Stage A dryer through the feed port. The product falls onto the perforated bottom and is conveyed from the input end of the Stage A dryer to the output end in the direction indicated in FIG. 1. The paddles, vibrational components, and the fluidized air flow combine to move the product in such direction. The product exits the Stage A dryer at the output end and then falls onto the input end of the Stage B dryer, where it is similarly conveyed to the output end of the Stage B dryer at which point the drying process is complete.

The Stage A and B dryers are divided into a number of zones through which air is directed from below upward through the dryer. Separate zonal flows can be created depending on conditions and circumstance by manipulating the air blowers and heating units. This can be used to ensure that the product is in a stable fluidized condition throughout processing. In operation, heated air flows between the ports, but air is also drawn into the dryer from the gap between the hood and the bed, which also serves to create a stable fluidized effect. Temperature sensors are placed in various locations to ensure proper heating conditions. For example, sensors can be placed in the bed, in the return, and input air streams, to provide real-time feedback and control of temperature.

Figure 52:
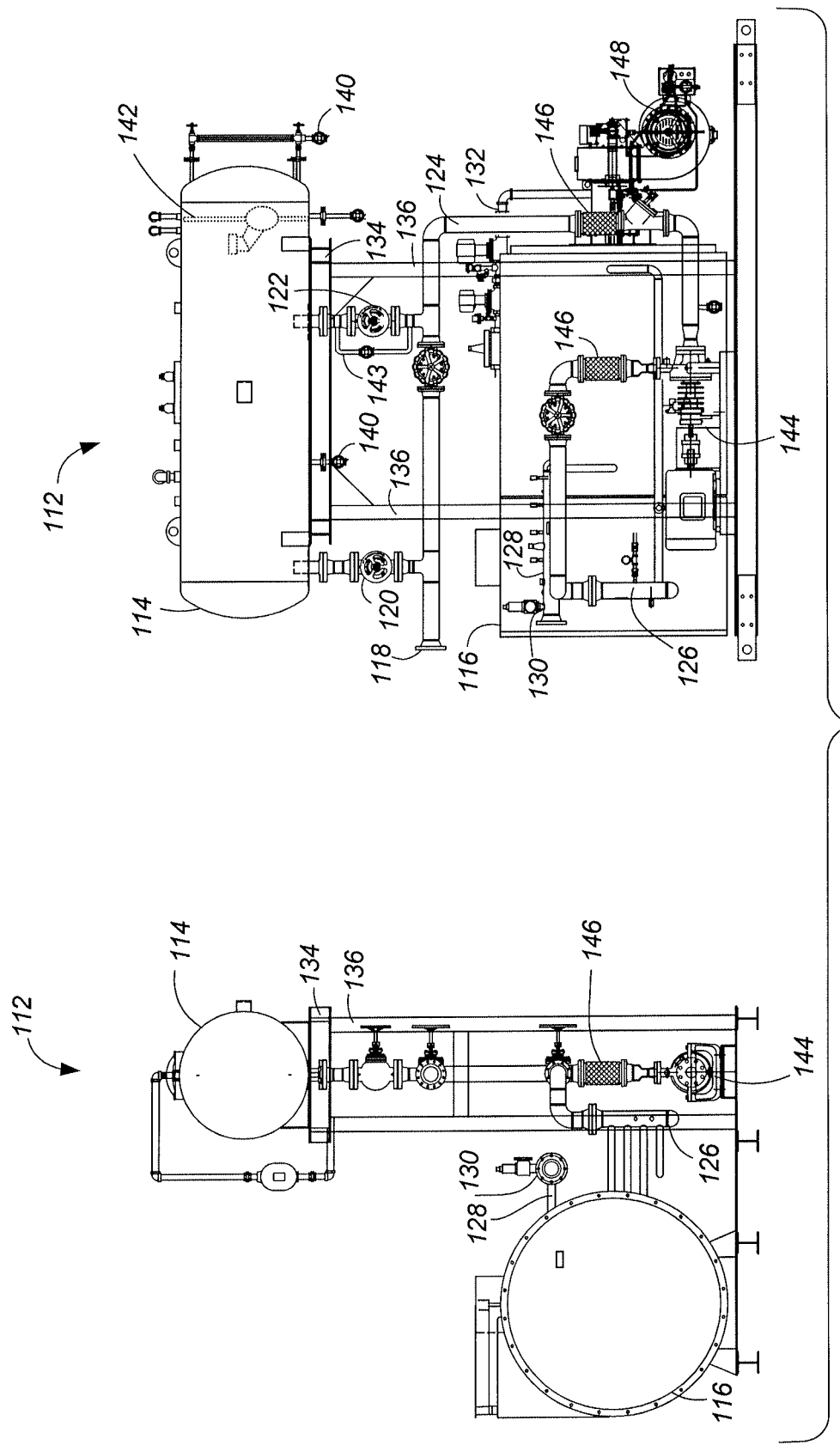
FIG. 52 is a view of the heating system.

FIG. 52 shows the thermal fluid heating system 112 of the present invention. The system 112 provides for an indirect method of heating the air used in the dryer 10, by heating a thermal fluid that is then conveyed through pipes to the heating coils 50 contained in the heating units 48. In this manner, any particulates, contaminants, pollutants associated with the heating step are remote from the dryer 10 and the air stream used therein. Thus, such elements cannot contaminate any product processed in the dryer 10, which is especially important when the product is food. Other advantages of the use or remote heat is that the heating elements, can be separately housed making it easier to filter out pollutants, particles, or harmful gasses resulting from the use thereof.

In particular, the system 112 comprises a thermal fluid reservoir 114 that stores the thermal fluid used by the system 112, and a burner 116 where the fluid is heated. The reservoir 114 sits on a platform 134 which is held in place by supports 136. Elevating the reservoir 114 and maintaining fluid therein assists in maintaining pressure in the system 112, however, a fan cooled thermal fluid pump 144 is also provided and is the principle source of pressure in the system 112.

The reservoir 114, in the preferred embodiment of the invention, comprises a pressurized tank. External pressure tanks (not shown), preferably containing nitrogen, are used to blanket the thermal fluid with an inert gas and thus prevent condensation and oxidation (also prevents moisture from entering the tank). The external tanks connect to valves at the top of the reservoir 114. Relief valves are provided on the pressurized tank lines as well.

The fluid circulates to the heating coils 50 though a fluid system return line 118, and a fluid system input line 130. Additionally, a pump 113 (shown in FIG. 6) assists with moving the thermal fluid between the heating coils 50 and the system 112. The return line 118 receives fluid from the coils 50 via piping, and fluid is sent to the coils 50 through the input line 130. Fluid travels to and from the reservoir 114 and into a burner input line 124 through reservoir input line 120 and a reservoir output line 122, both lines include valves located below the reservoir 114 that can be opened and closed as needed.

The burner 116 is preferably powered by natural gas which is fed into the system through natural gas inlet 132 (alternatively, fuel oil, LPG or other sources power can be used; further air can be fed into the burner 116 to enhance combustion). The burner 116 includes (internally) a series of gas fired combustion coils that ignite and transfer heat to a series of fluid coils through which the thermal fluid is moved allowing heated air to transfer heat to the thermal fluid. A forced air blower 148 provides combustion air to the burner 116. The burner 116 includes an exhaust stack 138, through which hot air and combustion gases are vented. Because the system 112, including the burner 116, is remotely located from the dryer 10 the byproducts of the exhaust cannot contaminate any product being processed in the dryer. This also helps provide access for filtering and removal of harmful elements from the exhaust stream, again without interference with the dryer.

Additionally, the reservoir includes a drain 140, a fluid level control mechanism 142 (located partially in the tank), a fire protection valve 143, and expansion joints 146 are located at various points to allow for expansion and contraction of the connecting pipes and tubing that result during operation.

Figure 53:
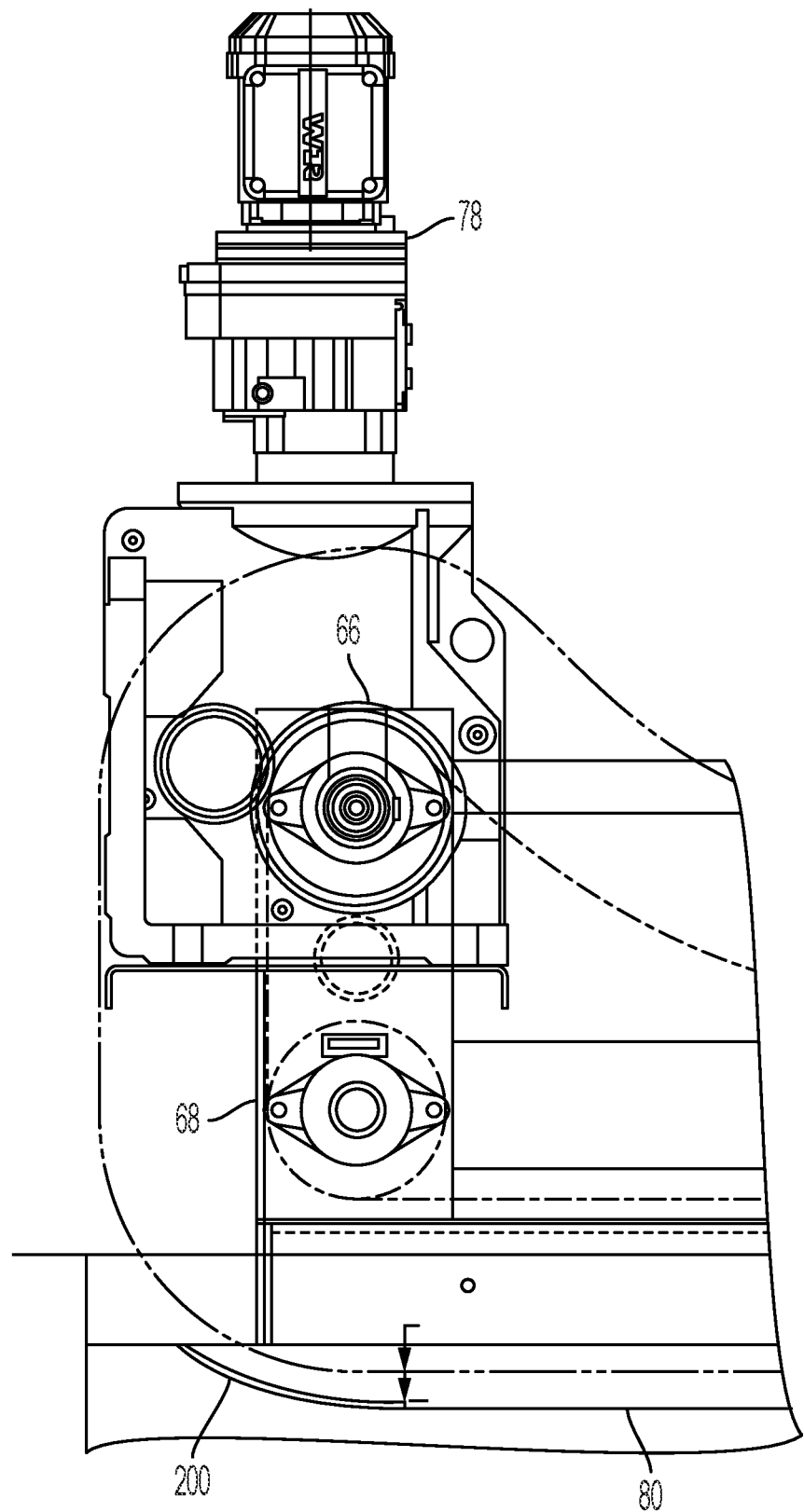
FIG. 53 is a side view of the output end of the dryer.

Still further embodiments of the present invention include, product dam 200 (see FIG. 53). The dam 200 comprises a planer, and preferably curved, surface placed near the output end of one or both of the conveyors. The dam 200 would be inclined at an angle above the conveyor of between 0 and near 90 degrees, but preferably somewhere in the midrange thereof. Product traveling down the conveyor would be moved up the dam 200 and falling over the edge by being pushed by incoming product or more preferably swept off the dam 200 by the paddle as it completes its travel along the conveyor and begins its return cycle. For this reason, preferably, the dam 200 is curved to match the path of the paddle. The dam 200 can vary in both width and height, where the dam may extend across the entire width of the conveyor (from side to side), or have a width less than the full width of the conveyor such that only a portion of the product would encounter the dam 200. The dam 200 provides additional control over the product existing the dryer, and be configured as described herein based on the type of product and the processing requirements. The angle of the product dam may be predetermined as installed or the product dam 200 can be constructed so that it's angle can be manually or electronically adjusted, as needed.

Another embodiment of the present invention comprises the use of air nozzles to address the problem of product clumping. Rods can be installed between the side walls of the dryer and above the conveyor, and one or more air nozzles attached to the rod or rods. The air nozzles can be activated to declump product as needed. The air nozzles may be installed with or without a rod and/or in any manner feasible. They can be installed in rows or in circles or in a random manner or any combination thereof. The air nozzles can also be installed on the walls on each side of each dryer. The nozzles may be installed in any dryer or any cooking stage of a dryer or in all of the dryers in a multiple dryer systems and in all of the drying zones or in any combination thereof. The combination of the air discharged from the nozzles and that moving both up and down through the dryer can effectively remove clumps as well as help with a more efficient drying of the product. The nozzles can tilt at any angle forward, backward, to the sides or in any combination thereof, and multiple rods or alternative installation methods can be installed within the dryer bed. The air (or other gas) discharged from the nozzles can be varied in temperature as well, either cooled, ambient, or heated. The temperature of the air discharged from the nozzles can be regulated and controlled automatically, electronically, or manually. Any available heat source or device can be used to heat up or cool down the temperature of the air discharged from the nozzles. In preferred embodiments when the discharge of heated air is desired preferable at desired temperatures, the same heat source providing the necessary heated air to the dryers may be used to heat up the air discharged from the nuzzles. Further, the air nozzles can be operated at a steady, varied, or pulsed pressure depending on the nature of the product and its tendency to clump or the desired drying conditions. The clash of the discharged air from the nuzzles in any combination of desired pressure, angle, direction, temperature, and coordination among nozzles with the air discharged from the dryer or oven bed or walls, or in certain embodiments the dryer or oven ceiling, will cause a disruptive commotion. This disruptive commotion created in the manner described herein or by any feasible means inside the dryer or oven will break up the clumps or coagulations, and helps with achieving better drying conditions. The disruptive commotion has many additional benefits. For instance, the disruptive commotion may reduce the drying time (the dwell time) for any substance being dried or cooked due to creating more efficient drying condition inside the dryer/oven. The heated air inside the dryer/oven is more efficiently utilized as a result of the disruptive commotion since the heated air in more abundant and/or more rapidly comes in contact with the surface of the material being cooked or dried prior to discharging the dryer/oven.

While the various embodiments of the invention have been described in reference to the Figures, the invention is not so limited. Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods, and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention. For example, the direction of flow of the air moving between the upper and lower ports can be reversed from the flow described above. The direction of flow can go from the lower ports to the upper ports, or in the opposite direction. The flow can be altered from zone to zone, for example every other zone can be up and the others down.

Furthermore, other variations within the scope of the present invention the use of direct heating instead of indirect heating. A furnace, or similar device can be included in the dryer, thereby eliminating the indirect heating elements and components. The furnace can be powered by electricity, natural gas, fuel oil, or any other suitable heating source.

The number of heating zones can and will vary. The dyer could have one zone, or many zones, in which case the number of ports can and will vary as well. The size and shape of the ports would similarly vary. There could be one port or dozens. The ports can be round, square, or any other shape, and can run in series or in parallel.

The cyclones can augmented by adding additional filtering apparatus such as HEPA filters, either one or multiple filters. Other particular filters can also be used. The filters can be added at any point in the air cycle (i.e. at the input ports, output ports, and part of the cyclones, or at any other point in the air flow loop).

The size and dimensional shape of the dryers can and will vary. The invention is not limited to any particular size or shape. The dryers can vary in length. Also, the invention can comprise a single dryer, or multiple dyers configured in stages serially, where one dyer feeds another; or, the dryers can be set up on parallel having one or more dryers in a series of parallel lines.

While the direction of vibration of the present invention is described as being in-line with the movement of the conveyor, the invention is not so limited. Vibration can be in any direction, including circular, angular, or some combination of the foregoing. In particular, the vibration if helpful in breaking up clumps and can be used to slow down, regress, or reverse the movement of clumps in order to allow for additional drying and dissolving of the clumps.

Additionally, product can be fed into the dryer in a variety of manners. The product can be hand fed, or fed with a conveyor, or vibrating or shaking device to help break up clumps of product.

Still further, the dryer can be run in a continuous feed mode or a batch mode. In continuous feed mode, the conveyor and paddles are constantly moving and convey product from the input end to the output end. Alternatively, the dryer can be run in a batch mode where the conveyor moves during a feed cycle to allow for filling the conveyor with product. Then the conveyor would stop, as would feeding, to allow for processing the product. Then when processing is complete the conveyor then moves product to the output end and the next batch cycle commences.

The numerous elements and inventions disclosed herein in this application may be used and/or implemented severally or collectively in any dryer/oven selected from the group consisting of forced air convection ovens, fluidized bed dryer/ovens, vibrating fluidized bed dryer/ovens, impingement dryer/ovens, Aero Pulse dryers/ovens, rotary dryers/ovens, rotary drum dryers/ovens, tray ovens, stationary dryer/ovens, spiral roasters/dryers, microwave dryer/ovens, infrared dryer/ovens, super heat airless driers, vacuum driers, Ohmic dryers and any similar cooking/drying apparatus or any combination thereof in any feasible order of use. The temperature of each zone may range from about 15 degrees C. to about 300 degrees C. (about 59 degrees F. to about 572 degrees F.), with an air velocity of from about 500 to about 15,000 feet per minute. In some procedures, using temperature above or under this range may be useful.

All measurements, size considerations, airflow conditions, and other relevant criteria reflected in the enclosed figures, drawings, pictures, and specifications are for demonstration purposes only and can be adjusted and/or changed based on many conditions including but not limited to the desired capacity, dwell time, airflow, or input and/or output levels of a single dryer or oven, and/or a dryer or oven system.

The invention claimed is:

1. Fluidized bed dryers for drying product moving through the dryers, comprising:
    a first dryer having an input end for receiving product and an output end for outputting product;
    a second dryer located adjacent to and slightly below the first dryer, the second dryer having an input end for receiving product from the output end of the first dryer, and an output end for outputting product;
    a first perforated bed in the first dryer, and a second perforated bed in the second dryer, upon which product moves;
    a first conveyor in the first dryer and a second conveyor in the second dryer for moving the product along the bed from the respective input ends to the output ends, wherein the conveyors comprises at a plurality of paddles for segmenting the conveyors and moving product along a length of the beds;
    a first pan of the first dyer for supporting the first bed and a second pan of the second dryer for supporting the second bed;
    a first hood of the first dryer above the first bed and a second hood of the second dryer above the second bed, the hoods adapted to move between a closed position and an open position where a stream of air can flow into the dryer between the hoods and the beds for contact with the product;
    a plurality of aligned ports in the pans and the hoods creating a plurality of zones within the dryers;
    a plurality of blowers for introducing a heated stream of gas for fluidizing and drying the product through the ports in the pans and exiting through ports in the hoods, such that each blower can independently control the flow and temperature of the stream of gas through the ports in the blower zone;
    a first heating system for heating the stream of gas in the blowers, and a second heating system for providing heat to the first heating system; and
    a plurality of drive arms in operative communication with the pans for vibrating the pans and bed to create particle movement.

2. The dryers of claim 1 where the paddles conform to the shape of the bed.

3. The dryers of claim 2 where the paddles have inserts that connect the conveyor, and moveable mount to the paddles such that the inserts move in response to the vibration while the remainder of the paddle is not responsive to such vibration.

4. The dryers of claim 1 further comprising cyclonic separators for removing particulate matter from the stream of gas upon exit of the stream of gas from the dryers.

5. The dryers of claim 1 further comprising a curved product dam at the output end of the first dryer to conform to the sweep of the paddles to move product to the input end of the second dryer.

6. The dryers of claim 1 where the hoods move between positions under the control of a screw jack to selectively place the hoods in at least three positions: closed, partially open to allow air to enter during processing; and fully open.

7. The dyers of claim 1 further comprising rings inserted into the ports to allow to isolate the vibrational movement of the dryers from the duct work through which the stream of gas travels.

8. The dryers of claim 1 further comprising air nozzles for introducing heated or cooled air into the dyers to declump product.

9. The dryers of claim 1 further comprising conduits to introduce cleaning solution into the pans and hoods to clean the foregoing in place.

10. The dryers of claim 1 where each of the plurality of blowers provides an independent stream of gas to two ports in the pan and two aligned ports in the hood.

11. The dryers of claim 1 where the first heating system comprises heating coils that heat the stream of gas, and the second heating system comprises a thermal oil heating system where the fluid heats the coils.

12. The dryers of claim 11 where the heating coils are located in duct work of the blowers.

* * * * *